US012069562B2

(12) United States Patent
Ishii et al.

(10) Patent No.: US 12,069,562 B2
(45) Date of Patent: Aug. 20, 2024

(54) APPARATUS AND METHOD FOR ACQUISITION OF ON-DEMAND SYSTEM INFORMATION IN CONNECTED STATE

(71) Applicant: SHARP KABUSHIKI KAISHA, Sakai (JP)

(72) Inventors: Atsushi Ishii, Vancouver, WA (US); Tatsushi Aiba, Sakai (JP); Kazunari Yokomakura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/630,364

(22) PCT Filed: Aug. 4, 2020

(86) PCT No.: PCT/JP2020/029892
§ 371 (c)(1),
(2) Date: Jan. 26, 2022

(87) PCT Pub. No.: WO2021/029288
PCT Pub. Date: Feb. 18, 2021

(65) Prior Publication Data
US 2024/0049117 A1 Feb. 8, 2024

Related U.S. Application Data

(60) Provisional application No. 62/886,042, filed on Aug. 13, 2019.

(51) Int. Cl.
*H04W 48/12* (2009.01)
*H04L 5/00* (2006.01)
*H04W 72/232* (2023.01)

(52) U.S. Cl.
CPC ........... *H04W 48/12* (2013.01); *H04L 5/0053* (2013.01); *H04W 72/232* (2023.01)

(58) Field of Classification Search
CPC .... H04L 5/0053; H04W 48/12; H04W 72/232
(Continued)

(56) References Cited

U.S. PATENT DOCUMENTS

2017/0295565 A1* 10/2017 Golitschek Edler von Elbwart ... H04W 72/23
2021/0105852 A1* 4/2021 Shih ...................... H04W 76/10

OTHER PUBLICATIONS

ZTE Corporation, "Offline Discussion #67—RA resources for MSG1 on demand request", R2-1809110, 3GPP TSG-RAN2 102, Busan, South Korea, May 21-May 25, 2018.
(Continued)

*Primary Examiner* — Sibte H Bukhari
(74) *Attorney, Agent, or Firm* — ScienBiziP, P.C.

(57) ABSTRACT

A wireless terminal that communicates over a radio interface with a radio access node of a radio access network (RAN). The wireless terminal comprises receiver circuitry, transmitter circuitry, and processor circuitry. The receiver circuitry is configured to receive, in a radio resource control (RRC) connected state, one or more configuration messages via dedicated signaling(s). The one or more configuration messages may comprise a timer configuration for a timer and a configuration for Physical Downlink Control Channel (PDCCH) monitoring. The transmitter circuitry is configured to transmit, in the RRC connected state, a system information (SI) request message to request at least one system information block (SIB). The processor circuitry is configured to start the timer based on the timer configuration and to perform an SI acquisition process. In an example embodiment and mode, the SI acquisition process comprises reception of Downlink Control Information (DCI) on PDCCH based on the configuration for PDCCH monitoring, and reception of Physical Downlink Shared Channel (PDSCH) scheduled by using the DCI. The SI acquisition process continues until the at least one SIB is successfully
(Continued)

received or until the timer expires. Methods for operating such wireless terminal and the access node are also provided.

9 Claims, 42 Drawing Sheets

(58) Field of Classification Search
USPC .......................................................... 370/329
See application file for complete search history.

(56) References Cited

OTHER PUBLICATIONS

LG Electronics Inc., "Acknowledgement for MSG3 based SI request from MAC layer", R2-1808438, 3GPP TSG-RAN WG2 Meeting #102, Busan, South Korea, May 21-25, 2018.
LG Electronics Inc., "Clarification of broadcast indicator in SIB1", R2-1808437, 3GPP TSG-RAN WG2 Meeting #102, Busan, South Korea, May 21-25, 2018.
LG Electronics Inc., "When to start SI monitoring after SI request", R2-1808433, 3GPP TSG-RAN WG2 Meeting #102, Busan, Korea, May 21-25, 2018.
Huawei et al., "Consideration on Indication for On-demand SI Broadcast", R2-1808198, 3GPP TSG-RAN WG2 Meeting #102, Busan, Korea, May 21-25, 2018.
Samsung (Email Rapporteur), "Email Discussion [101bis#43] [NR]—RA resources for MSG1 on demand request", R2-1807690, 3GPP TSG-RAN2 102, Busan, South Korea, May 21-May 25, 2018.
Xiaomi Communications, "Further issues relates to on-demand SI", R2-1807673, 3GPP TSG-RAN2 #102, Busan, Korea, May 21-25, 2018.
CATT, "RACH resources allocation for Msg1 based SI request", R2-1807645, 3GPP TSG-RAN WG2#102, Busan, Korea, May 21-25, 2018.
Vivo, "Details of SI Message Reception after Successful SI Request", R2-1807615, 3GPP TSG-RAN WG2 Meeting #102, Busan, Korea, May 21-25, 2018.
Intel Corporation, "Remaining open issues on on-demand SI", R2-1807371, 3GPP TSG-RAN WG2 NR meeting #102, Busan, Korea, May 21-26, 2018.
Sharp, "Considerations on Acquisition of an SI Message", R2-1807328, 3GPP TSG RAN WG2 Meeting #102, Busan, Korea, May 21-25, 2018.
ZTE Corporation, "Further consideration on the RACH resource and SI request mapping", R2-1807319, 3GPP TSG-RAN WG2 Meeting#102, Busan, Korea, May 21-25, 2018.
Lenovo et al., "Acquisition of Essential SIBs", R2-1807269, 3GPP TSG-RAN WG2 Meeting #102, Busan, South Korea, May 21-May 25, 2018.
Ericsson, "Duration of on-demand SI broadcast", Tdoc R2-1807205, 3GPP TSG-RAN WG2 #102 Tdoc, Busan, Republic of Korea, May 21-25, 2018.
Panasonic, "Remaining issues on the MSG3 based on-demand SI request", R2-1807161,3GPP TSG-RAN WG2 #102, Busan, Korea, May 21-May 25, 2018.
Ericsson, "Details of RRC SI request", R2-1807099, 3GPP TSG-RAN WG2#102, Busan, Republic of Korea, May 21-25, 2018.
Spreadtrum Communications, "Reception of on-demand SI", R2-1807073, 3GPP TSG-RAN WG2 Meeting #102, Busan, Korea, May 21-25, 2018.
Asustek, "Issue of simultaneously trigging multiple RRC procedures", R2-1806920, 3GPP TSG-RAN WG2 Meeting #102, Busan, Korea, May 21-25, 2018.
Samsung, "SI Period Monitoring for on Demand SI", R2-1806839, 3GPP TSG-RAN2 102, Busan, South Korea, May 21-May 25, 2018.
CATT, "Open issues of on demand SI Acquirement", R2-1806720, 3GPP TSG-RAN WG2 Meeting #102, Busan, Korea, May 21-25, 2018.
3GPP TS 38.331 V15.6.0 (Jun. 2019), 3rd Generation Partnership Project; Technical Specification Group Radio Access Network; NR; Radio Resource Control (RRC) protocol specification (Release 15).
3GPP TS 36.331 V15.6.0 (Jun. 2019), 3rd Generation Partnership Project; Technical Specification Group Radio Access Network; Evolved Universal Terrestrial Radio Access (E-UTRA); Radio Resource Control (RRC); Protocol specification (Release 15).
3GPP TS 38.304 V15.4.0 (Jun. 2019), 3rd Generation Partnership Project; Technical Specification Group Radio Access Network; NR; User Equipment (UE) procedures in Idle mode and RRC Inactive state (Release 15).
3GPP TS 36.304 V15.4.0 (Jun. 2019), 3rd Generation Partnership Project; Technical Specification Group Radio Access Network; Evolved Universal Terrestrial Radio Access (E-UTRA); User Equipment (UE) procedures in idle mode (Release 15).

* cited by examiner

APPARATUS AND METHOD FOR ACQUISITION OF ON-DEMAND SYSTEM INFORMATION IN CONNECTED STATE

CROSS REFERENCE

This Nonprovisional application claims priority under 35 U.S.C. § 119 on provisional Application No. 62/886,042 on Aug. 13 2019, the entire contents of which are hereby incorporated by reference.

TECHNICAL FIELD

The technology relates to wireless communications, and particularly to methods, apparatus, and techniques for requesting, transmitting, updating, and using system information (SI) in wireless communications.

BACKGROUND ART

In wireless communication systems, a radio access network generally comprises one or more access nodes (such as a base station) which communicate on radio channels over a radio or air interface with plural wireless terminals. In some technologies such a wireless terminal is also called a User Equipment (UE). A group known as the 3rd Generation Partnership Project ("3GPP") has undertaken to define globally applicable technical specifications and technical reports for present and future generation wireless communication systems. The 3GPP Long Term Evolution ("LTE") and 3GPP LTE Advanced (LTE-A) are projects to improve an earlier Universal Mobile Telecommunications System ("UMTS") mobile phone or device standard in a manner to cope with future requirements.

In typical cellular mobile communication systems, the base station broadcasts on the radio channels certain information which is required for mobile stations to access to the network. In Long-Term Evolution (LTE) and LTE Advanced (LTE-A), such information is called "system information" ("SI"). Each access node, such as an evolved NodeB ("eNB"), or a gNodeB or gNB in the 5G New Radio (NR) System, broadcasts such system information to its coverage area via a Master Information Block (MIB) and several System Information Blocks (SIBs) on downlink radio resources allocated to the access node.

A wireless terminal ("UE"), after entering a coverage area of an eNB or gNB, is required to obtain all the MIB/SIBs which are necessary to access to the system. For sake of UEs under coverage, the eNB or gNB periodically broadcasts all MIB/SIBs relevant for offered services, where each type of MIB or SIBs is transmitted in a designated radio resource(s) with its own pre-determined/configurable frequency.

This all-broadcast-based periodic delivery method (e.g., collective broadcast of all SIBs, not just those necessary for system access) is efficient under a condition where many UEs are almost always flowing into the coverage area (such as a macro cell). However, this approach may result in wasting valuable radio resources in case of small cell deployment. Therefore, more efficient methods of SIB transmission are desired.

What is needed, therefore, and an example object of the technology disclosed herein, are methods, apparatus, and techniques for obtaining and/or updating system information when a wireless terminal is in RRC_CONNECTED state.

SUMMARY OF INVENTION

In one example, a wireless terminal that communicates over a radio interface with a radio access node of a radio access network (RAN), the wireless terminal comprising: receiver circuitry configured to receive, in a radio resource control (RRC) connected state, one or more configuration messages via dedicated signaling(s), the one or more configuration messages comprising: a timer configuration for a timer, and; a configuration for Physical Downlink Control Channel (PDCCH) monitoring; transmitter circuitry configured to transmit, in the RRC connected state, a system information (SI) request message to request at least one system information block (SIB); processor circuitry configured to: start the timer based on the timer configuration, and; perform an SI acquisition process, wherein; the SI acquisition process comprises: reception of Downlink Control Information (DCI) on PDCCH based on the configuration for PDCCH monitoring, and reception of Physical Downlink Shared Channel (PDSCH) scheduled by using the DCI, and; the acquisition process continues until the at least one SIB is successfully received or the timer expires.

In one example, an access node of a radio access network (RAN), the access node comprising: transmitter circuitry configured to transmit, to a wireless terminal in a radio resource control (RRC) connected state, one or more configuration messages via dedicated signaling(s), the one or more configuration messages comprising: a timer configuration for a timer, and; a configuration for Physical Downlink Control Channel (PDCCH) monitoring; receiver circuitry configured to receive, in the RRC connected state, a system information (SI) request message to request at least one system information block (SIB); processor circuitry configured to perform an SI delivery process, wherein; the SI delivery process comprises: transmission of Downlink Control Information (DCI) on PDCCH based on the configuration for PDCCH monitoring, and transmission of Physical Downlink Shared Channel (PDSCH) scheduled by using the DCI, and; the timer is configured for the wireless terminal to terminate acquisition of the at least one SIB in a case that the acquisition is unsuccessful.

In one example, a method for a wireless terminal that communicates over a radio interface with a radio access node of a radio access network (RAN), comprising: receiving, in a radio resource control (RRC) connected state, one or more configuration messages via dedicated signaling(s), the one or more configuration messages comprising: a timer configuration for a timer, and; a configuration for Physical Downlink Control Channel (PDCCH) monitoring; transmitting, in the RRC connected state, a system information (SI) request message to request at least one system information block (SIB); starting the timer based on the timer configuration, and; performing an SI acquisition process, wherein; the SI acquisition process comprises: reception of Downlink Control Information (DCI) on PDCCH based on the configuration for PDCCH monitoring, and reception of Physical Downlink Shared Channel (PDSCH) scheduled by using the DCI, and; the acquisition process continues until the at least one SIB is successfully received or the timer expires.

In one example, a method for an access node of a radio access network (RAN), the method comprising: transmitting, to a wireless terminal in a radio resource control (RRC) connected state, one or more configuration messages via dedicated signaling(s), the one or more configuration messages comprising: a timer configuration for a timer, and; a configuration for Physical Downlink Control Channel (PDCCH) monitoring; receiving, in the RRC connected state, a system information (SI) request message to request at least one system information block (SIB); performing an SI delivery process, wherein; the SI delivery process comprises transmission of Downlink Control Information (DCI)

on PDCCH based on the configuration for PDCCH monitoring, and transmission of Physical Downlink Shared Channel (PDSCH) scheduled by using the DCI, and; the timer is configured for the wireless terminal to terminate acquisition of the at least one SIB in a case that the acquisition is unsuccessful.

BRIEF DESCRIPTION OF DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DESCRIPTION OF EMBODIMENTS

Figure 1:
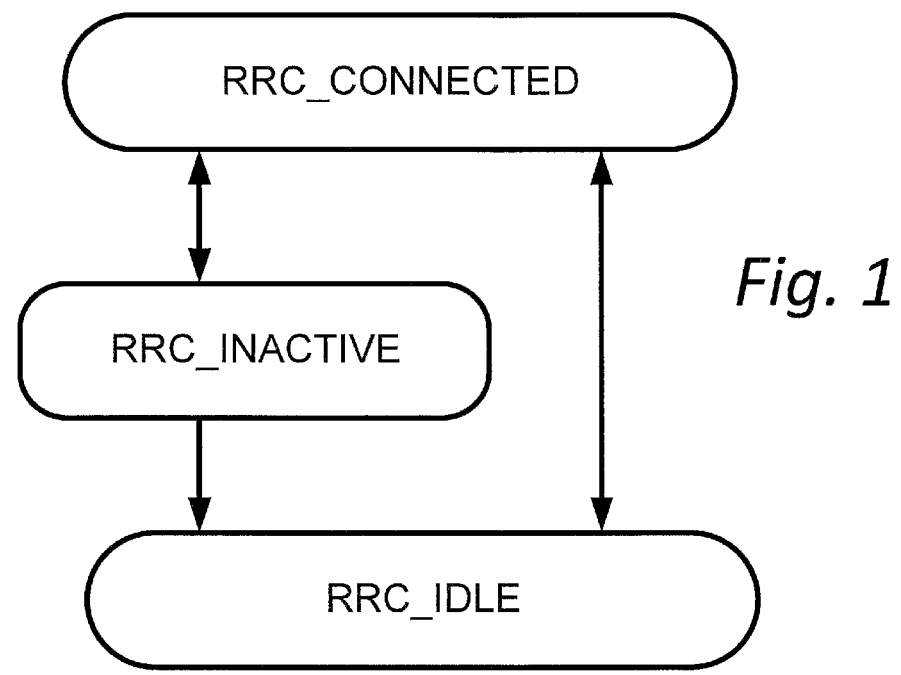
FIG. 1 is a diagrammatic view showing transition states of a Radio Resource Control RRC state machine.

In one of its example aspects, the technology disclosed herein concerns a wireless terminal that communicates over a radio interface with a radio access node of a radio access network (RAN). The wireless terminal comprises receiver circuitry, transmitter circuitry, and processor circuitry. The receiver circuitry is configured to receive, in a radio resource control (RRC) connected state, one or more configuration messages via dedicated signaling(s). The one or more configuration messages may comprise a timer configuration for a timer and a configuration for Physical Downlink Control Channel (PDCCH) monitoring. The transmitter circuitry is configured to transmit, in the RRC connected state, a system information (SI) request message to request at least one system information block (SIB). The processor circuitry is configured to start the timer based on the timer configuration and to perform an SI acquisition process. In an example embodiment and mode, the SI acquisition process comprises reception of Downlink Control Information (DCI) on PDCCH based on the configuration for PDCCH monitoring, and reception of Physical Downlink Shared Channel (PDSCH) scheduled by using the DCI. The SI acquisition process continues until the at least one SIB is successfully received or until the timer expires. Methods for operating such wireless terminal are also provided.

In another of its example aspects the technology disclosed herein concerns an access node which communicates over a radio interface with a wireless terminal. In an example embodiment and mode the access node comprises transmitter circuitry, receiver circuitry, and processor circuitry. The transmitter circuitry is configured to transmit, to a wireless terminal in a radio resource control (RRC) connected state, one or more configuration messages via dedicated signaling(s). The one or more configuration messages may comprise (1) a timer configuration for a timer, and (2) a configuration for Physical Downlink Control Channel (PDCCH) monitoring. The receiver circuitry is configured to receive, in the RRC connected state, a system information (SI) request message to request at least one system information block (SIB). The processor circuitry is configured to perform an SI delivery process. The SI delivery process comprises: (1) transmission of Downlink Control Information (DCI) on PDCCH based on the configuration for PDCCH monitoring, and transmission of Physical Downlink Shared Channel (PDSCH) scheduled by using the DCI. The timer is configured for the wireless terminal to terminate acquisition of the at least one SIB in a case that the acquisition is unsuccessful. Methods of operating such access node are also disclosed.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a 5G (New Radio [NR]) gNodeB or gNB, or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, 12, or higher), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

As used herein, "system information" ("SI") may include a Master Information Block (MIB) and several System Information Blocks (SIB s) which are provided on downlink radio resources allocated to an access node. The system information may be broadcast, and some types of system information may be provided on demand, e.g., upon receipt of a request for system information from a wireless terminal.

In various aspects of the technology disclosed herein, system information is classified into plural categories or types. In an example embodiment and mode, first type of the system information (e.g. a first type SIB or SIB1) is Minimum System Information (Minimum SI), minimally containing information required for UEs initially access to the network, periodically broadcasted by each access node (e.g. eNB for LTE, gNB for 5G Radio System). In some configurations, Minimum System SI may consist of MIB and a limited number of SIBs. The MIB may contain essential information for the radio system to help wireless terminals to synchronize to the serving access node and may also contain instruction how to obtain at least one of the essential SIBs. The Minimum SI may be also referred as "essential SI", or first type system information.

Second type of system information, e.g., "Other system information, "Other SI", or second type system information, contains all the other types of information, i.e., all types of system information except the Minimum System Information. The Other SI may comprise several system information blocks (SIBs) that are not categorized as Minimum SI. The Other SI may be also referred as "non-essential SI". However, second type system information is not to be confused with SIB Type 2, which is a particular (second) system information block (SIB) that may be included in the Minimum System Information or may be a part of the Other SI.

In some example embodiment and modes described herein, for each of the SIBs the access node may choose to broadcast the SIB periodically, similar to the SIBs in Minimum SI. Alternatively, the access node may choose to refrain from transmitting the SIB until receiving a request of on-demand delivery from a UE. In this case, the access node may advertise the availability of on-demand delivery using Minimum SI.

As described herein, both an access node and a wireless terminal may manage respective Radio Resource Control (RRC) state machines. The RRC state machines transition between several RRC states including RRC_IDLE, RRC_INACTIVE and RRC_CONNECTED. FIG. 1 depicts the state transition diagram of the RRC states. From the vantage point of a wireless terminal e.g., user equipment (UE), the RRC states may be briefly characterized as follows:

RRC_IDLE:
A UE specific DRX (discontinuous reception) may be configured by upper layers;
UE controlled mobility based on network configuration;
The UE:
  Monitors a Paging channel;
  Performs neighboring cell measurements and cell (re-) selection;
  Acquires system information.
RRC_INACTIVE:
A UE specific DRX may be configured by upper layers or by RRC layer;
UE controlled mobility based on network configuration;
The UE stores the Access Stratum (AS) context;
The UE:
  Monitors a Paging channel;
  Performs neighboring cell measurements and cell (re-) selection;

Performs RAN-based notification area updates when moving outside the RAN-based notification area;
Acquires system information.
RRC_CONNECTED:
The UE stores the AS context.
Transfer of unicast data to/from UE.
At lower layers, the UE may be configured with a UE specific DRX;
Network controlled mobility, i.e. handover within NR and to/from E-UTRAN.;
The UE:
Monitors a Paging channel;
Monitors control channels associated with the shared data channel to determine if data is scheduled for it;
Provides channel quality and feedback information;
Performs neighboring cell measurements and measurement reporting;
Acquires system information.

The technology disclosed herein concerns, e.g., apparatus, methods, and procedures for obtaining and/or updating SIBs including controlling timing of an SI message acquisition process.

Figure 2:
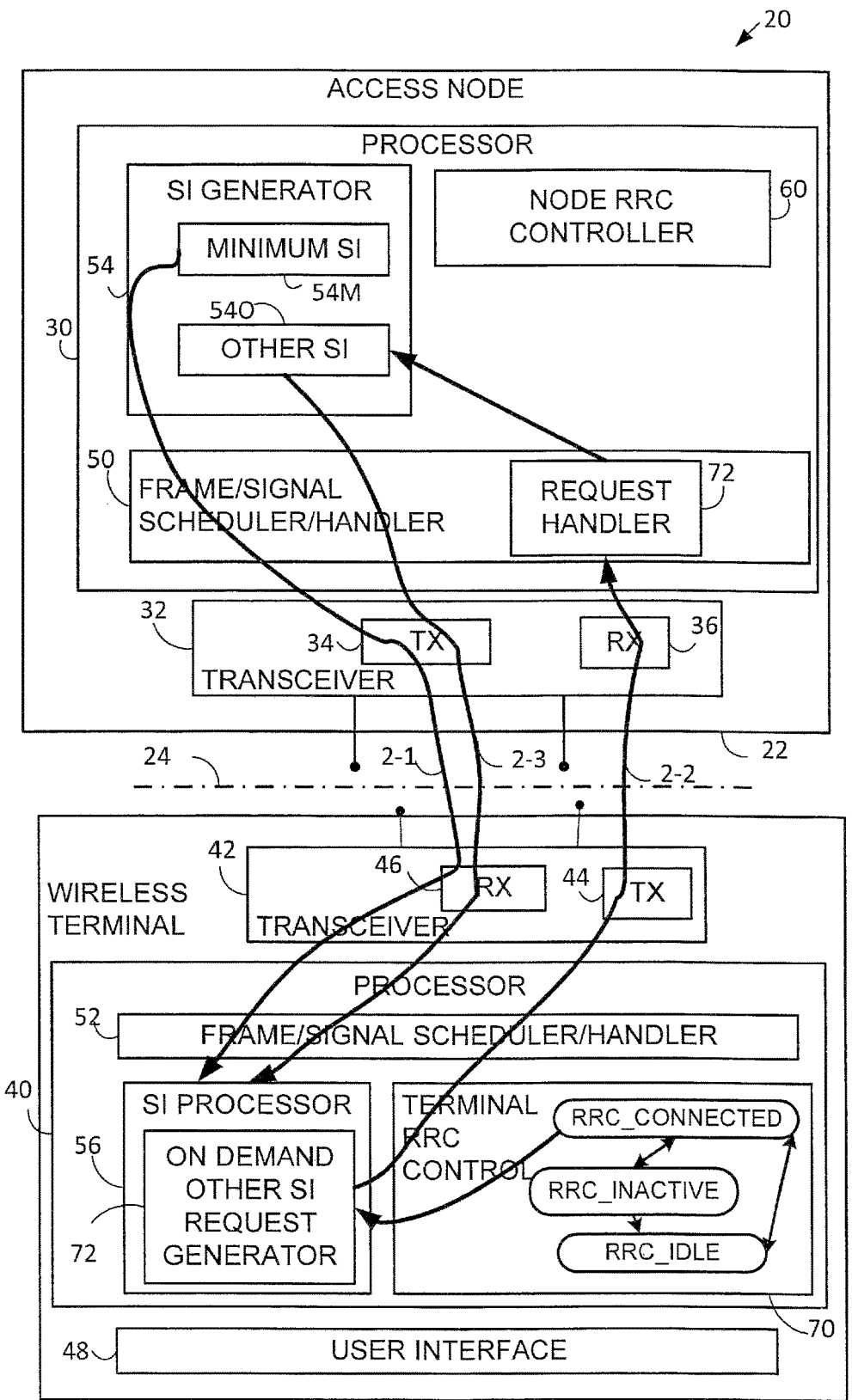
FIG. 2 is a schematic view showing an example generic communications system comprising a radio access node and a wireless terminal, wherein the wireless terminal requests, and the radio access node provides, Other system information (Other SI) when the wireless terminal is in a RRC_CONNECTED state.

FIG. 2 shows an example communications system 20 wherein radio access node 22 communicates over air or radio interface 24 (e.g., Uu interface) with wireless terminal 26. As mentioned above, the radio access node 22 may be any suitable node for communicating with the wireless terminal 26, such as a base station node, or eNodeB ("eNB") or gNodeB ("gNB"), for example. The node 22 comprises node processor circuitry ("node processor 30") and node transceiver circuitry 32. The node transceiver circuitry 32 typically comprises node transmitter circuitry 34 and node receiver circuitry 36, which are also called node transmitter and node receiver, respectively.

The wireless terminal 26 comprises terminal processor 40 and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically comprises user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

For both the radio access node 22 and radio interface 24, the respective transceiver circuitries 22 include antenna(s). The transmitter circuit 34 and transmitter circuit 44 may comprise, e.g., amplifier(s), modulation circuitry and other conventional transmission equipment. The receiver circuit 36 and receiver circuit 46 may comprise, e.g., e.g., amplifiers, demodulation circuitry, and other conventional receiver equipment.

In general operation, access node, 22 and wireless terminal 26 communicate with each other across radio interface 24 using predefined configurations of information. By way of non-limiting example, the radio access node 22 and wireless terminal 26 may communicate over radio interface 24 using "frames" of information that may be configured to include various channels. In Long Term Evolution (LTE), for example, a frame, which may have both downlink portion(s) and uplink portion(s), may comprise plural subframes, with each LTE subframe in turn being divided into two slots. The frame may be conceptualized as a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks, for example).

To cater to the transmission of information between radio access node 22 and wireless terminal 26 over radio interface 24, the node processor 30 and terminal processor 40 of FIG. 2 are shown as comprising respective information handlers. For an example implementation in which the information is communicated via frames, the information handler for radio access node 22 is shown as node frame/signal scheduler/handler 50, while the information handler for wireless terminal 26 is shown as terminal frame/signal handler 52.

The node processor 30 of radio access node 22 also includes system information (SI) generator 54. As described above, at least some of the system information generated and provided by the system information (SI) generator 54 is Minimum System Information (Minimum SI), also known as first type system information, represented by Minimum SI handler 54M. Some of the system information may be Other system information (Other SI), also known as second type system information, represented by Other SI handler 54O in FIG. 2. The wireless terminal 26 uses the system information (SI) generated by radio access node 22. Some of the Minimum SI may inform the wireless terminal 26 of the availability of the Other IS.

FIG. 2 illustrates a generic message 2-1 by which the node radio resource controller 54 may supply the Minimal SI to wireless terminal 26. In some example implementations, upon knowing of the availability of the Other SI, due to the message 2-1, for example, the wireless terminal 26 specifically requests the Other system information, in on-demand fashion, as described herein. The terminal processor 40 of wireless terminal 26 comprises, e.g., SI processor 56, to facilitate obtaining and use of system information.

The technology disclosed herein concerns, e.g., apparatus, methods, and procedures for obtaining and/or updating system information blocks (SIBs) in/of the Other SI (Other SI SIBs) in on-demand basis. Since in at least some of the example embodiments and modes the technology disclosed herein involves the Radio Resource Control (RRC) procedures, FIG. 2 shows terminal processor 40 as comprising node radio resource control (RRC) controller 60, e.g., node RRC controller 60. The node RRC controller 60 may execute an instance of the RRC state machine for each wireless terminal in which the access node 20 is in communication, with each instance keeping track of the RRC state transitions experienced by the wireless terminal associated with the respective instance.

FIG. 2 also shows the terminal processor 40 of wireless terminal 26 as comprising, in addition to terminal SI processor 56, a terminal RRC controller 70. The terminal RRC controller 70 includes or executes the RRC state machine discussed above, which transitions through the RRC states, as described above and shown in FIG. 2, for a communication involving wireless terminal 26.

FIG. 2 thus shows that the access node 22 comprises node processor 30, e.g., node processor circuitry 30, transmitter circuit 34, and, receiver circuit 36. The transmitter circuit 34 is configured to transmit the first type system information over a radio interface, the first type system information including availability of a SI message belonging to the second type system information. The receiver circuit 36 is configured to receive from the wireless terminal a request message to request delivery of the SI message which is available by on-demand basis. The transmitter circuit 34 is further configured to transmit the SI message to the wireless terminal.

FIG. 2 thus shows that the wireless terminal 26 communicates over radio interface 24 with access nodes, such as access node 22, of a radio access network (RAN). The wireless terminal 26 comprises receiver circuit 46, transmitter circuit 44, and terminal processor 40, e.g., terminal processor circuitry. The receiver circuit 46 is configured to receive first type system information over the radio interface. The terminal processor circuitry is configured to generate a request message to request the second type SIB which is available in an on-demand basis. The transmitter circuit 44 is configured to transmit the request message over the radio interface while in the connected state. The receiver circuit 46 is also configured to receive the SI message while in the connected state.

Figure 3:
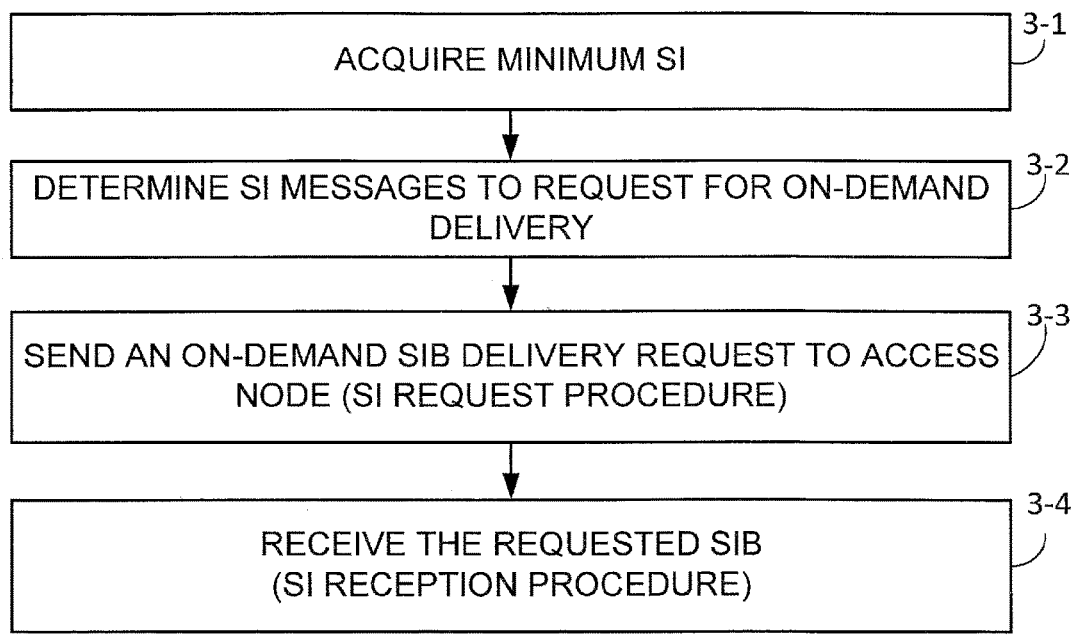
FIG. 3 is a flowchart showing example, basic example acts or steps performed by a wireless terminal of the example generic communications system of FIG. 2.

FIG. 3 shows example, representative acts or steps performed in conjunction with a generic method of operating a wireless terminal of a radio access network (RAN), such as wireless terminal 26 of FIG. 2. Act 3-1 comprises the wireless terminal acquiring, e.g., receiving, the Minimum SI that is broadcasted from the currently serving access node, e.g., access node 22. The Minimum SI may be broadcast in a message such as message 2-1 of FIG. 2. The Minimum SI may contain information about the Other SI, including the delivery method, e.g., periodic broadcast/on-demand, scheduling information, validity information, etc. Based on the information, the wireless terminal in act 3-2 may determine which SI message(s) to acquire by on-demand. As act 3-3, the wireless terminal may send a request message (depicted as message 2-2 of FIG. 2) to the access node, the request message indicating the SI message(s) that the wireless terminal desires to obtain. As act 3-4 the wireless terminal 26 may attempt to receive the requested SI message(s) which, e.g., was sent using message 2-3 of FIG. 2.

It was mentioned above that the first type system information includes availability of a SI message belonging to the second type system information, that the request message requests delivery of a SI message which is available by on-demand basis, and that the SI message is transmitted to the wireless terminal. It should be understood that reference herein to "a SI message belonging to the second type system information" means one or more pieces of Other system information (Other SI), e.g., one or more SI messages belonging to the second type system information. In some example situations indeed only one SI message may be advertised as available and accordingly periodically broadcasted or requested on-demand. But in other example situations plural SI messages (e.g., plural pieces of Other SI) are advertised as available, some of which may be periodically broadcasted and the others may be requested on-demand. Furthermore, it should be noted that in some configurations (e.g. the configuration presented in FIG. 7, or in FIG. 13A-D) the availability may be included in the scheduling information (e.g. schedulingInfoList described below).

Figure 4:
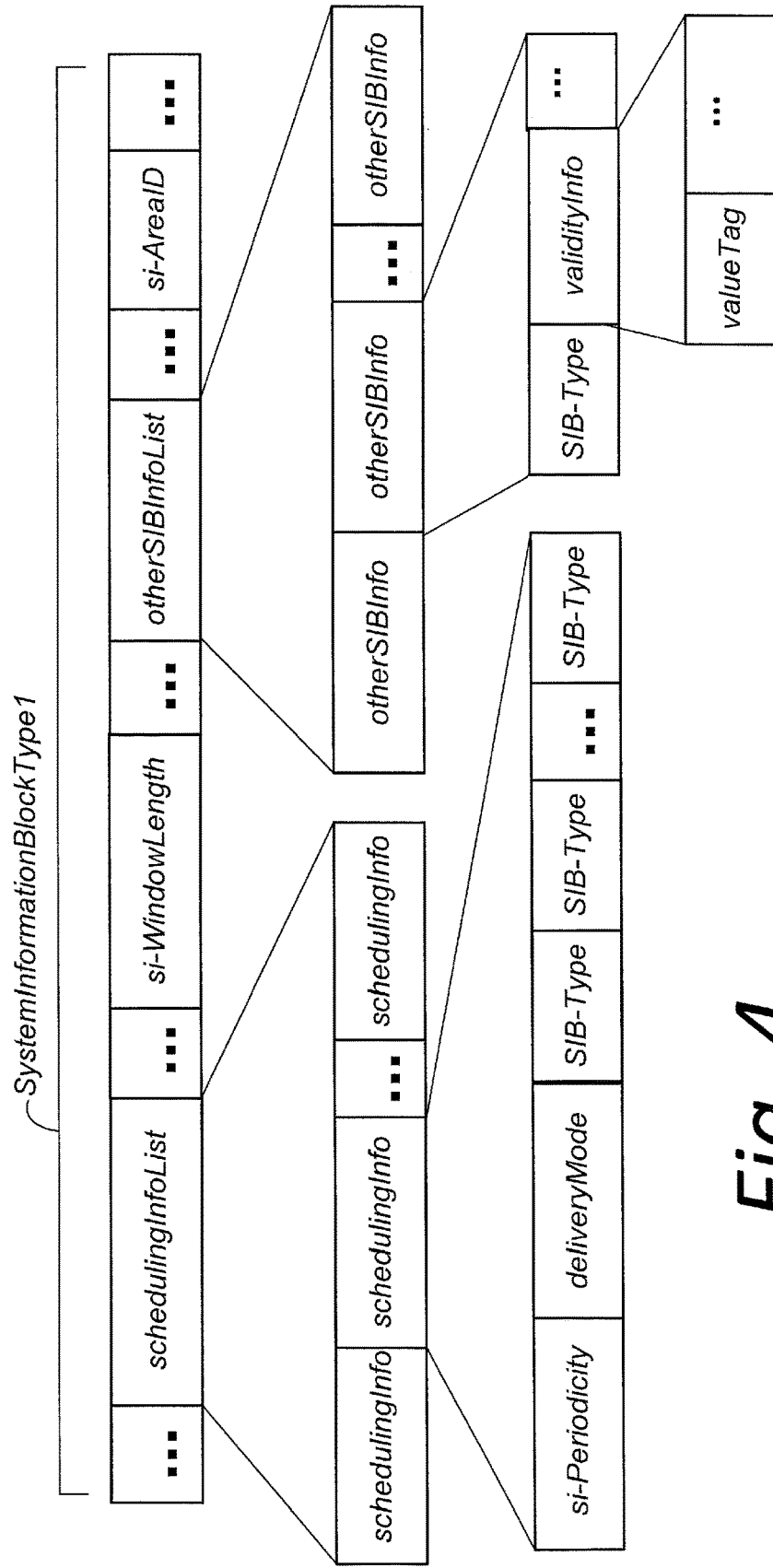
FIG. 4 is a diagrammatic view illustrating differing example formats of a system information block (SIB) which comprises Minimal SI and which carries availability of Other system information (Other SI).

In some configurations, the availability and delivery method information for Other SI SIBs may be included in SIB Type 1, one of the SIBs in the Minimum SI. FIG. 4 shows an example format of SIB Type 1, including schedulingInfoList, si-WindowLength, otherSIBInfoList, validity area identification (si-AreaID), and possibly other configuration parameters. The otherSIBInfoList is a list of otherSIBInfo, which comprises SIB-Type, an identifier of a SIB, validityInfo and validity information of the SIB (a value tag [valueTag], and other parameters, such as validity timer, etc.).

SIBs other than SIB1 are carried in SystemInformation (SI) messages and mapping of SIBs to SI messages is flexibly configurable by schedulingInfoList included in SIB1, with restrictions that: each SIB is contained only in a single SI message, only SIBs having the sae scheduling requirement (periodicity given by si-periodicity) can be mapped to the same SI message. There may be multiple SI messages transmitted with the same periodicity.

In one configuration, each element, schedulingInfo, of schedulingInfoList may represent one SI message, comprising its periodicity (si-Periodicity), delivery method (deliveryMethod) indicating if this SIB is periodically broadcasted or to be transmitted upon request (on-demand), and associated SIB types (one or more SIB-Type's). The actual broadcast opportunity, e.g., timing/resources, of a given SI message may be determined by a pre-determined or a network-configured formula as a function of at least the corresponding periodicity. At each opportunity the broadcast of the SI message may occur within the duration of the window length (si-WindowLength). Hereafter a broadcast opportunity is also referred as a SI window. More than one SIB may be possibly transmitted on a same SI window.

Figure 5:
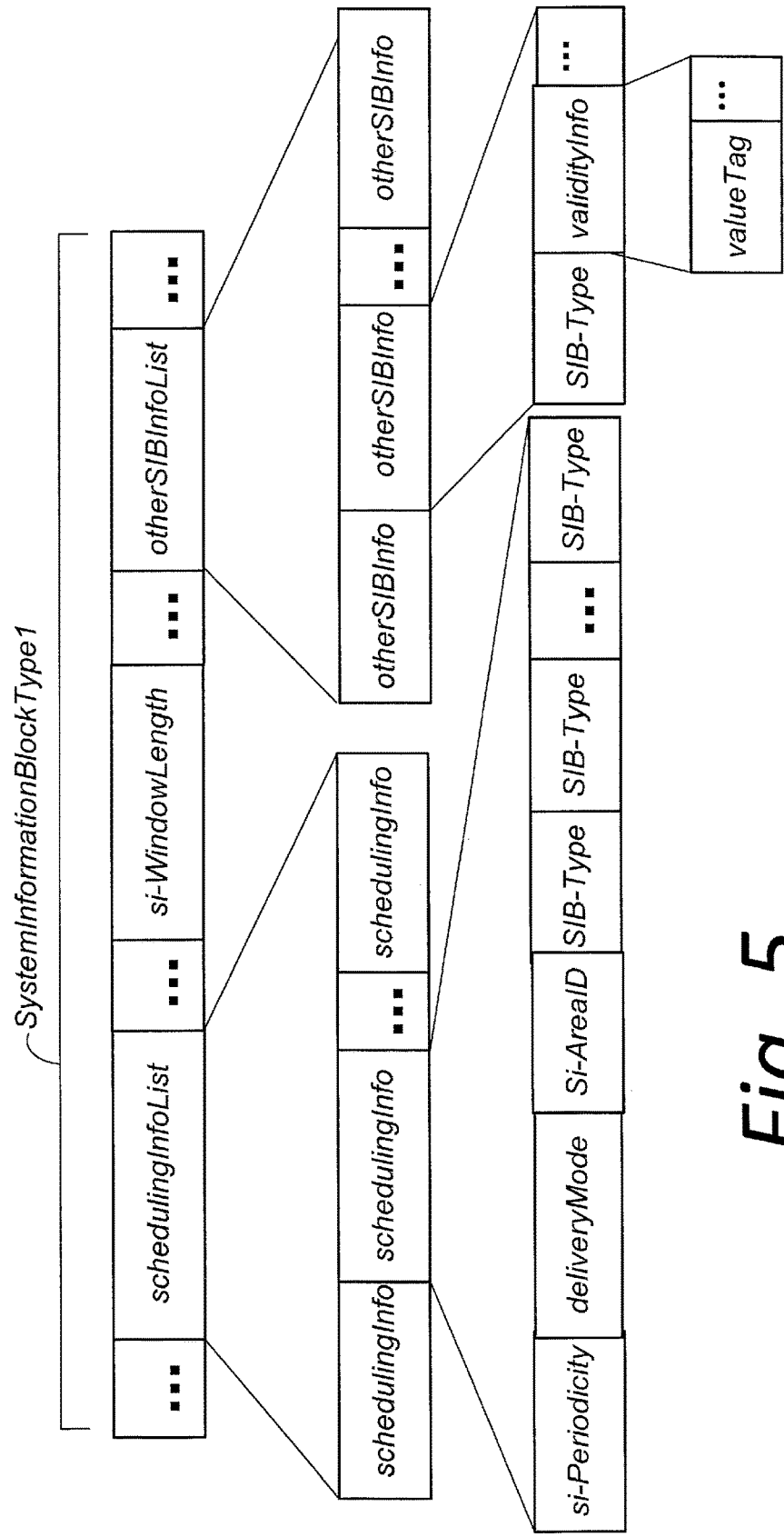
FIG. 5 is a diagrammatic view illustrating differing example formats of a system information block (SIB) which comprises Minimal SI and which carries availability of Other system information (Other SI).
Figure 6:
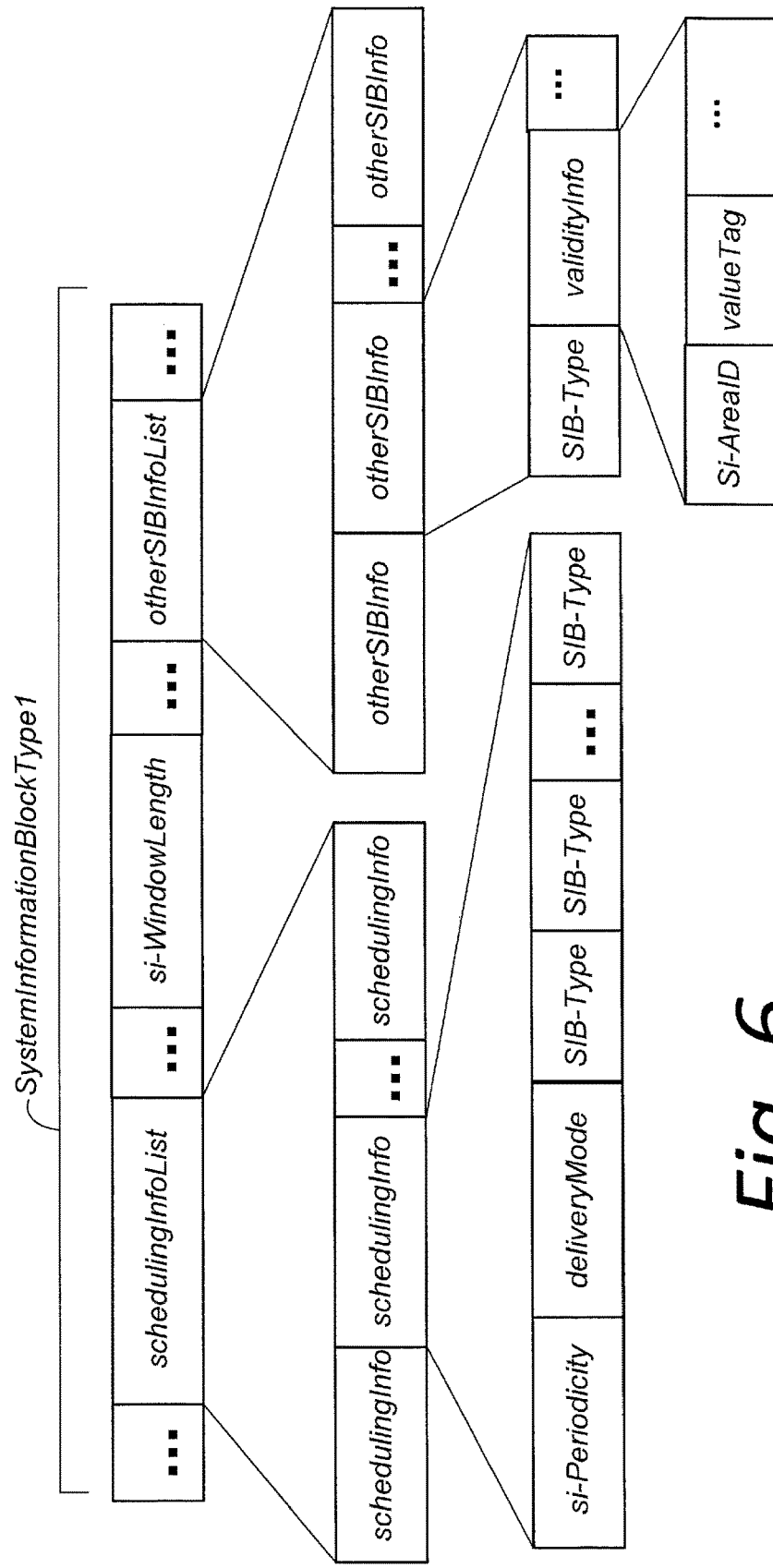
FIG. 6 is a diagrammatic view illustrating differing example formats of a system information block (SIB) which comprises Minimal SI and which carries availability of Other system information (Other SI).

In the configuration of FIG. 4 si-AreaID is common for all SI messages or SIB types, which means that all SIBs have the same validity area. Alternatively, in another configuration, each SI message may have a designated validity area. FIG. 5 shows an example format of SIB1 for such a configuration wherein each SI message may have a designated validity area. Furthermore, in another configuration, having an example format such as shown in FIG. 6, each SIB type may have a designated validity area. Thus, in differing implementations, the system information (SI) generator 54 of FIG. 2, working with node frame/signal scheduler/handler 50, generates the differing formatted SI messages of FIG. 4, FIG. 5, and FIG. 6, for transmission by node transmitter circuitry 34 over radio interface 24.

Figure 7:
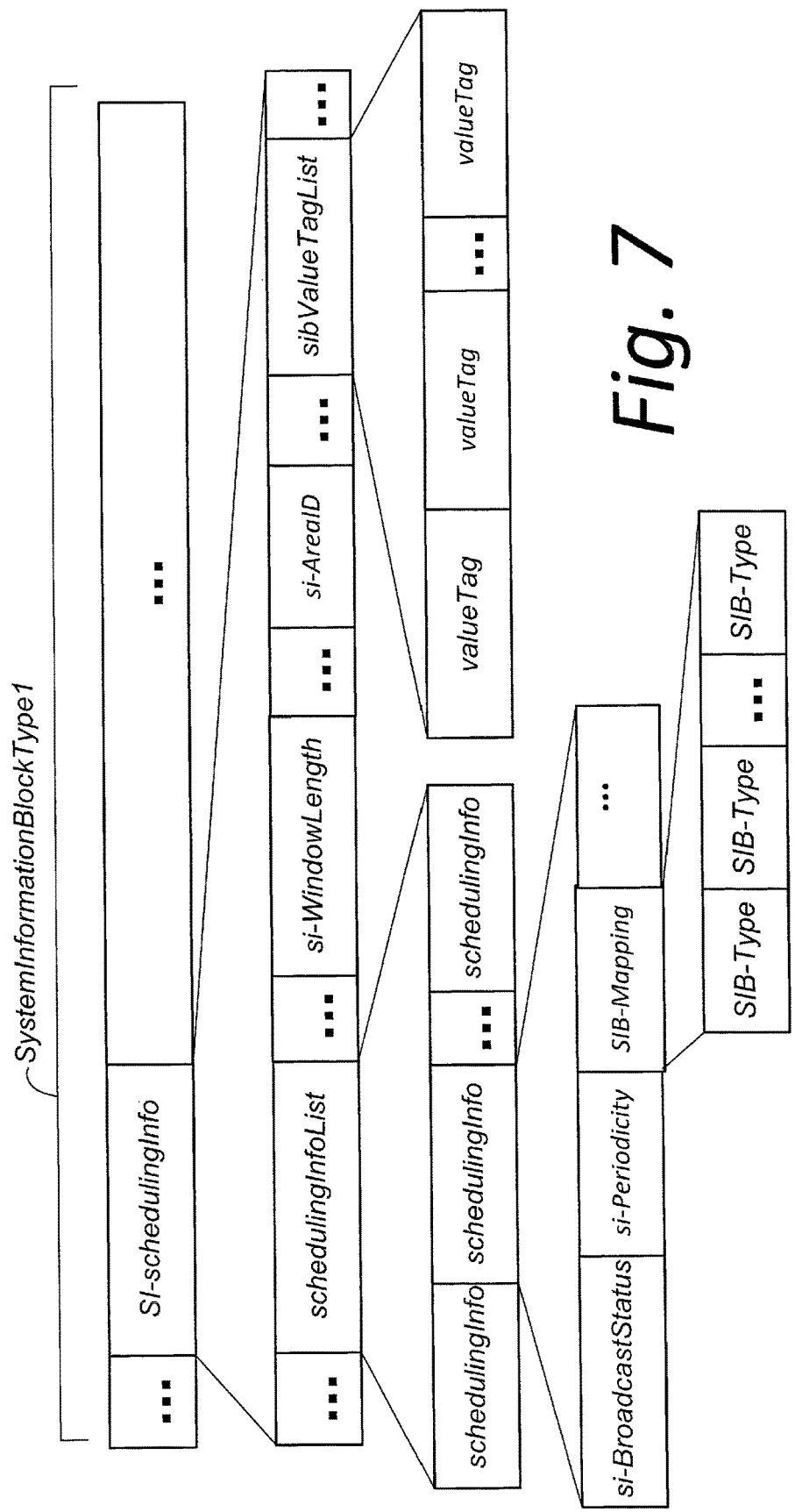
FIG. 7 is a diagrammatic view illustrating differing example formats of a system information block (SIB) which comprises Minimal SI and which carries availability of Other system information (Other SI).
Figure 8:
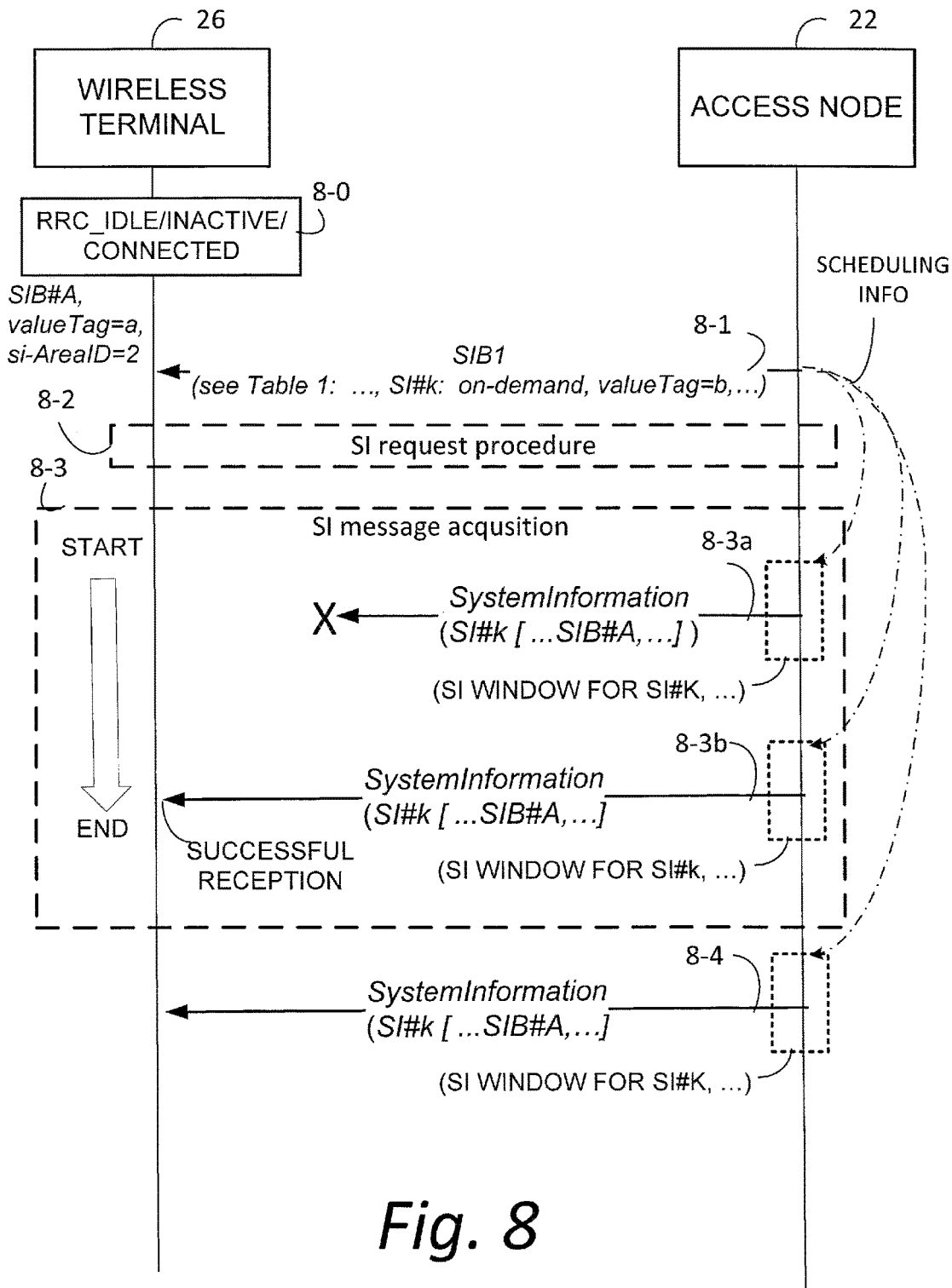
FIG. 8 is a diagrammatic view illustrating an exemplary message flow of on-demand based SI acquisition procedure.

FIG. 7 is an alternative format for SIB1, which is logically equivalent to the format shown in FIG. 4. The si-BroadcastStatus information element of FIG. 7 may be functionally identical to deliveryMode information element described earlier. In one configuration, the information element sibValueTagList may comprise a list of value tags for the available SIBs included in schedulingInfoList, in the order of the SIB numbering scheme (e.g. SIB2, SIB3, SIB4, SIB5, . . . ). In another configuration, sibValueTagList may comprise a list of value tags for the available SIBs (included in schedulingInfoList) as well as the non-available SIBs (not included in schedulingInfoList), in the order of the SIB numbering scheme (e.g. SIB2, SIB3, SIB4, SIB5, . . . ). In this case, a pre-determined value may be set to the value tag for a non-available SIB. Accordingly, the si-BroadcastStatus information element may be used for indicating broadcast status (e.g. the broadcast status being either periodic broadcast or on-demand basis). FIG. 8 is an exemplary message flow diagram of on-demand based SI acquisition procedure. As shown by act 8-0, wireless terminal 26 in either RRC_IDLE, RRC_INACTIVE or RRC_CONNECTED state stores the content of SIB #A with the validity information, valueTag=a, si-AreaID=2, which the wireless terminal has previously received. From the currently serving access node, as act 8-1 the wireless terminal may obtain SIB1 as Minimum SI. As shown in FIG. 4, FIG. 5, FIG. 6, and FIG. 7, the SIB1 includes the scheduleInfoList, which in turn may include one or more schedulingInfo information elements. An example scheduleInfoList for this scenario is shown in Table 1, wherein the k'th schedulingInfo indicates that the SI message associated with this schedulingInfo (SI #k, hereafter), containing SIB #A, will be available by on-demand delivery. Furthermore, the otherSIBInfo corresponding to SIB #A indicates that the validity information of SIB #A is valueTag=b, si-AreaID=3. It is assumed hereafter that whenever the wireless terminal receives SIB1, it has already received MIB beforehand.

TABLE 1

```
...
schedulingInfoList {
  ...
  k'th schdulingInfo (SI#k) {
    ...
    deliveryMethod = on-demand
    SIB-type = A
    ...
  }
  ...
}
...
otherSIBInfoList {
  ...
  otherISBInfo {
    SIB-type = A
    ValidityInfo {
      valueTag = b
      ...
    }
    ...
  }
  ...
}
...
si-AreaID = 3
...
```

Knowing that the stored SIB #A is now invalid, the wireless terminal may decide to obtain a valid version of SIB #A, and may initiate the SI request procedure represented by act 8-2 and explained herein. After the SI request procedure has a successful result, the wireless terminal may start the SI message acquisition, shown generally as act 8-3 in FIG. 8. In the SI message acquisition the wireless terminal monitors signals from the access node in the designated SI windows derived from the scheduling information (scheduleInfo) in the SIB1, and thereby attempts to receive the requested SI #k. The SI windows are shown by dotted rectangles in FIG. 8. FIG. 8 shows by act 8-3a a first transmission of the requested SI #k, which is unsuccessful, and by act 8-3b a second transmission of the requested SI #k, which is successful. A tail of a vertical down-pointing arrow in the SI message acquisition depiction of FIG. 8 is associated with start of the SI message acquisition, while the head of the same vertical down-pointing arrow is associated with end of the SI message acquisition (at successful reception of the SI #k). FIG. 8 also shows by act 8-4 that other transmissions of the requested system information may also be made even after the wireless terminal has successfully received the sought SI #k.

In one configuration, the wireless terminal may use a counter, which is incremented at every SI window of a particular SI message, e.g. SI #k. In this configuration, the SI message acquisition may end when the requested SI message(s) are successfully received, or when the counter reaches a maximum counter value. In another configuration the wireless terminal starts a timer at the beginning of the SI message acquisition. In this configuration, the SI message acquisition may end when the requested SI message(s) are successfully received, or when the timer expires. The maximum counter value, or the timer value, which may be common for all SI messages or per-SI message basis, may be pre-configured or configured by network via system information. The conditions for the wireless terminal to end the SI reception process is referred as "termination conditions" herein.

Figure 9A:
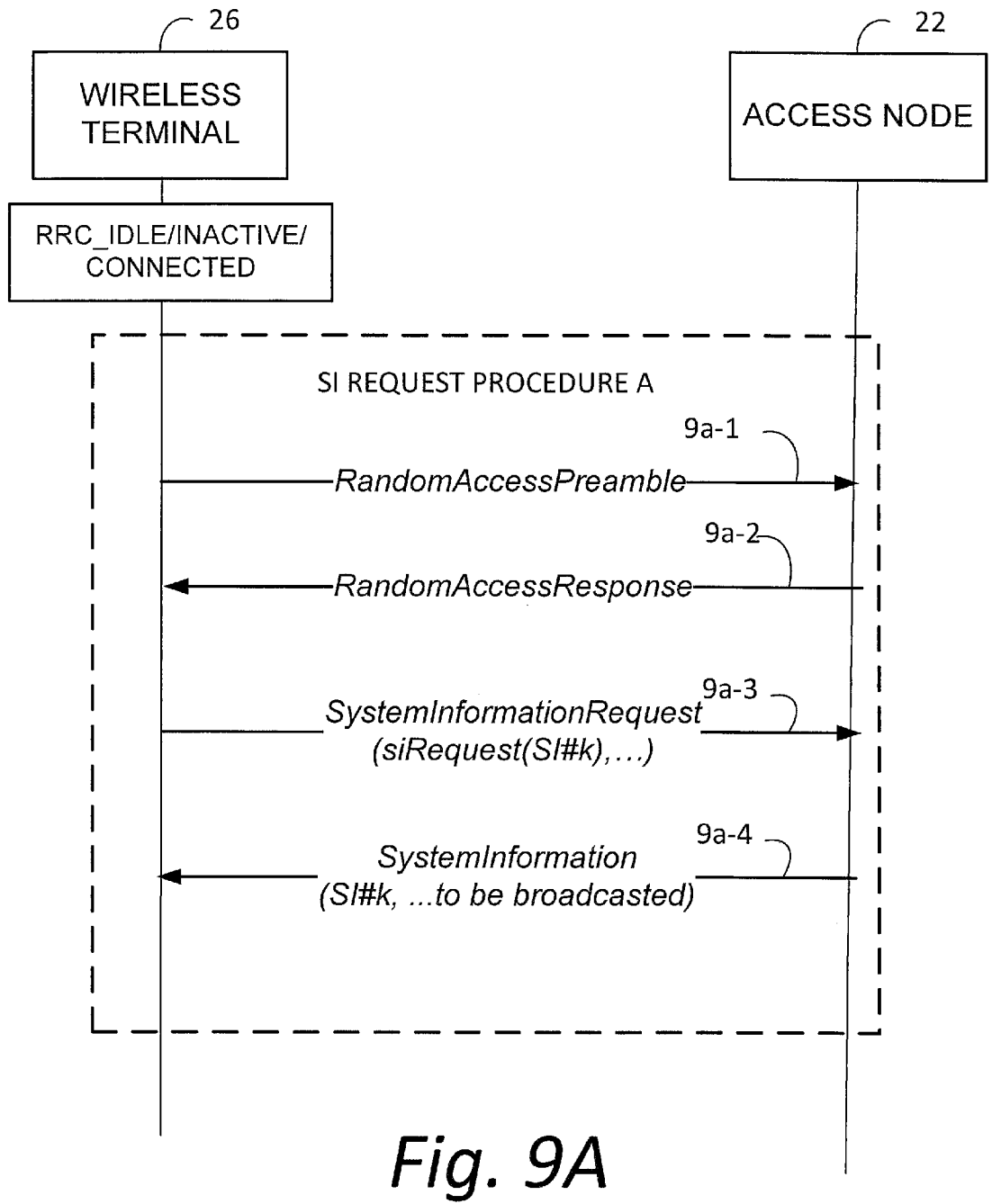
FIG. 9A is a diagrammatic view illustrating three options for an SI request procedure.
Figure 9B:
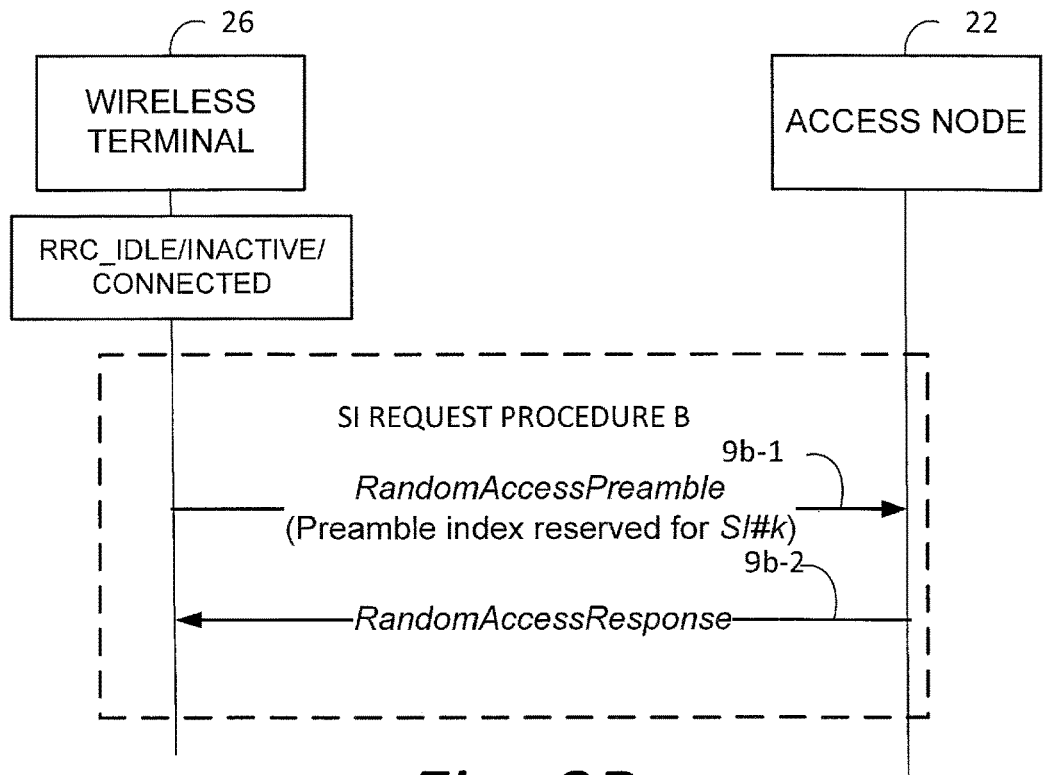
FIG. 9B is a diagrammatic view illustrating three options for an SI request procedure.
Figure 9C:
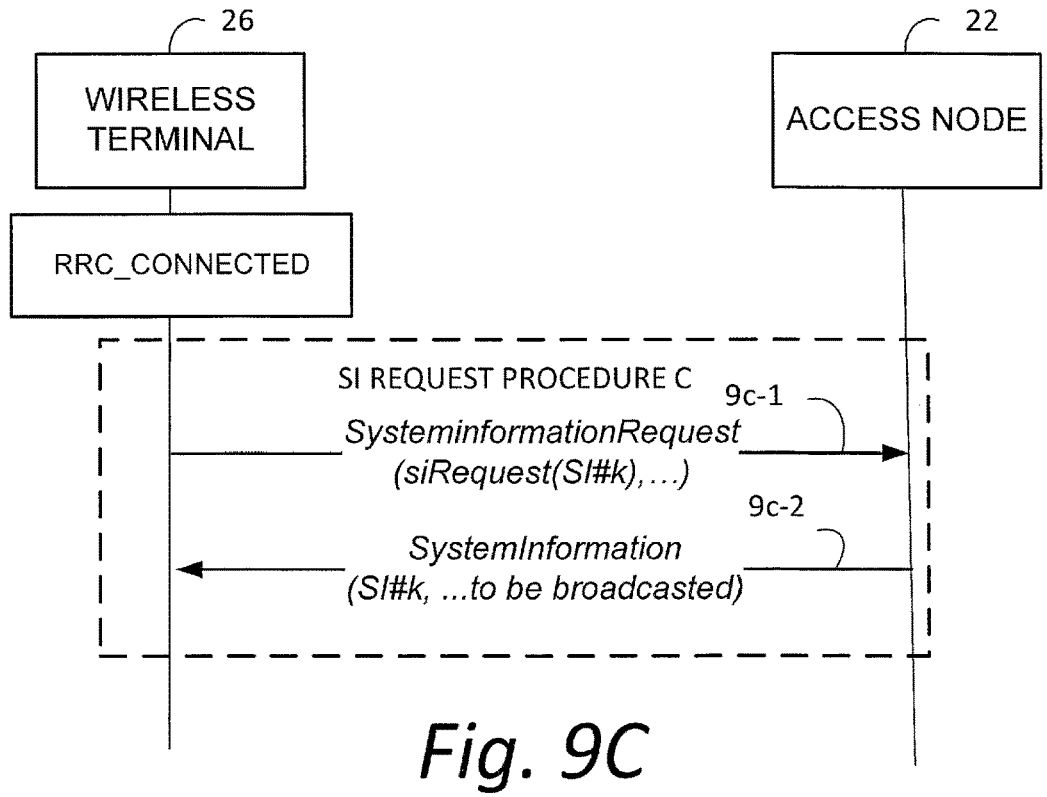
FIG. 9C is a diagrammatic view illustrating three options for an SI request procedure.

FIG. 9A, FIG. 9B and FIG. 9C show three options for the SI request procedure. In FIG. 9A, which may be applicable to wireless terminals in any of the RRC states, the request of on-demand delivery for SI messages may be accomplished by sending a Random Access Preamble, which may comprise a sequence selected from a set of available sequences configured by the access node via Minimum SI. A given sequence is identified by a Preamble Index. When the access node detects the transmission of a preamble sequence, it may respond to it with Random Access Response, which includes the Preamble Index corresponding to the sequence. Upon receiving the Random Access Response, the wireless terminal may validate that the Preamble index in the Random Access Response matches the one associated with the preamble sequence, and then send to the access node SystemInformationRequest message that includes the identity of the SI messages (e.g. SI #k) that the wireless terminal desires to receive. In response, the access node may send a SystemInformation message acknowledging the request, indicating that the requested SI message(s) will be broadcasted from the next SI window scheduled for the requested SI message(s).

In one configuration, the access node may include in Minimum SI a set of Preamble indices, each of which is designated for requesting on-demand delivery of one or more specific SI messages. FIG. 9B illustrates an example SI request procedure using this configuration, where the wireless terminal in any RRC state may transmit Random Access Preamble sequence given by the Preamble Index associated with the SI message(s) that the wireless terminal has selected. When the wireless terminal receives Random Access Response including the Preamble Index, it may consider that the request procedure is successful.

The SI request procedure in FIG. 9C may be applicable to wireless terminals in RRC_CONNECTED, wherein the SystemInformationRequest message is sent without the random access preamble/response.

In any of the three options disclosed above, the wireless terminal may proceed to the SI message acquisition if the SI request procedure is successful. Otherwise, the wireless terminal may think that the serving cell (controlled by the access node) is barred, which will invoke a cell reselection.

Figure 10:
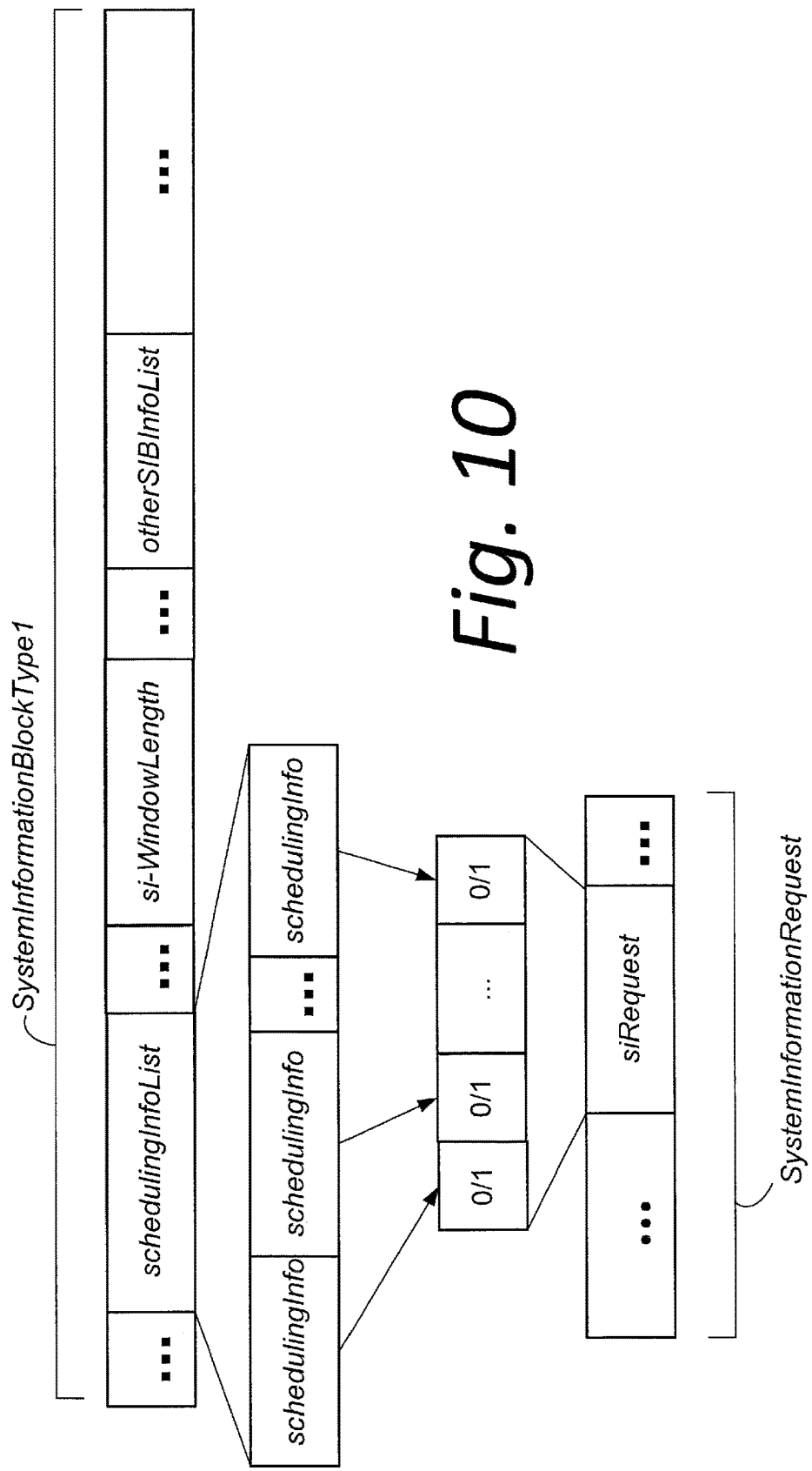
FIG. 10 is a diagrammatic view showing, e.g., a SystemInformationRequest message wherein a siRequest information element comprises a bit map.

The SystemInformationRequest message shown in FIG. 9A or FIG. 9C may include an information element (e.g. siRequest) to indicate which SI message(s) that the wireless terminal desires to receive. In one configuration, as shown in FIG. 10, the siRequest may comprise a bit map, wherein each bit corresponds to a schedulingInfo information element in SIB1 of the current serving cell, the bits arranged in the order of schedulingInfo information elements. By doing so, each bit of the bit map may correspond to a specific SI message. Alternatively, siRequest may carry a field indicating that the wireless terminal desires to receive at least one on-demand basis SI message. In this case, the access node may start broadcasting all of the on-demand basis SI messages for a pre-configured duration. The SystemInformation message shown in FIG. 9A or FIG. 9C may include siAck, an information element for acknowledging siRequest. In one configuration, siAck may comprises the same bit map as the one in SystemInformationRequest, indicating the SI message(s) to be broadcasted. Alternatively, siAck may comprise one Boolean field, indicating whether the request has been accepted or not.

Figure 11:
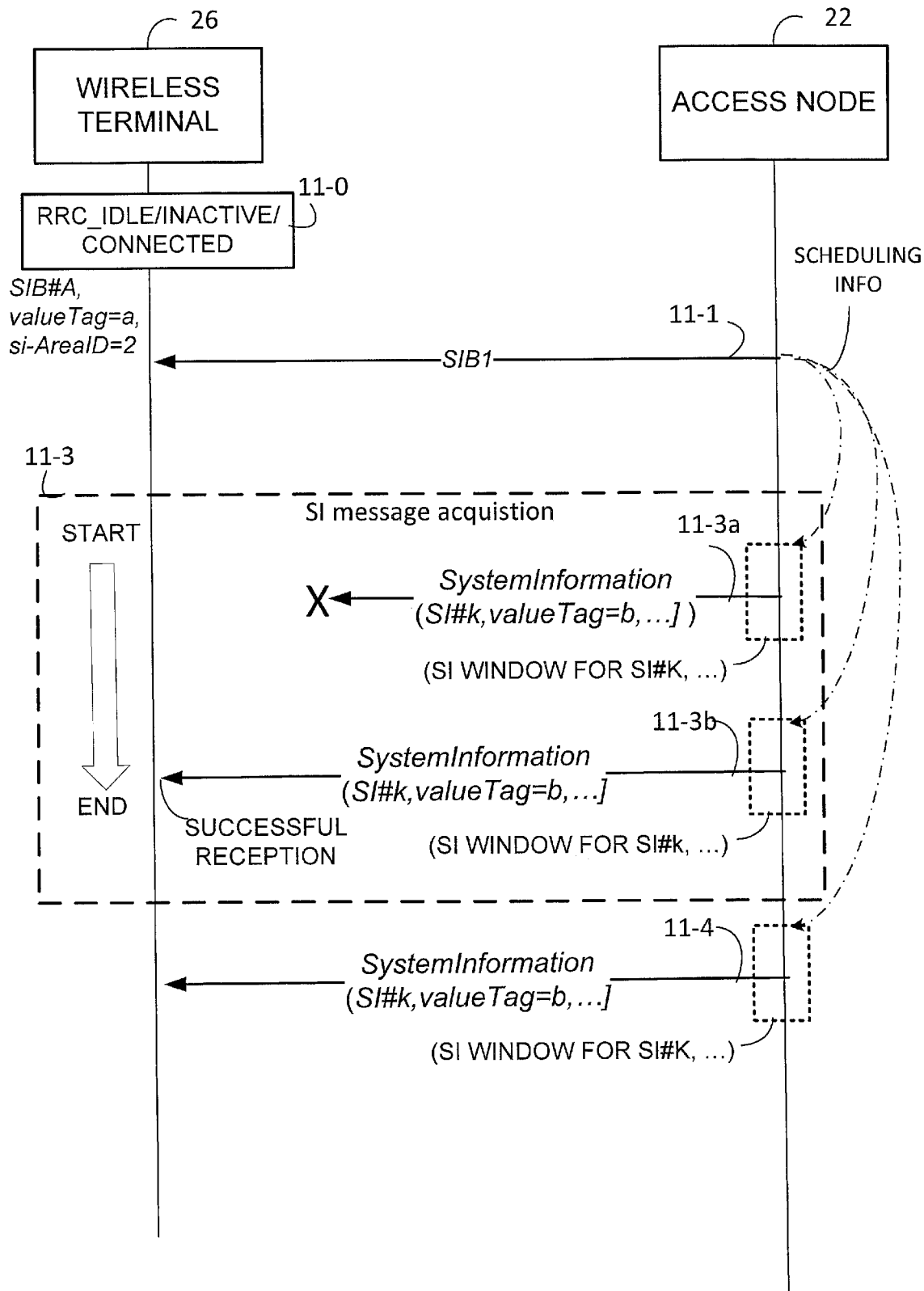
FIG. 11 is a diagrammatic view illustrating an exemplary message flow of periodic broadcast based SI acquisition procedure.

FIG. 11 is an exemplary message flow diagram of SI acquisition procedure for a SI message broadcasted periodically. Act 11-0 comprises the wireless terminal 26, in either RRC_IDLE, RRC_INACTIVE or RRC_CONNECTED state, storing the content of SIB #A with the validity information, e.g., valueTag=a and si-AreaID=2. Act 11-1 comprises the wireless terminal 26 obtaining, from the currently serving access node 22, SIB1 as Minimum SI, which, as understood from previous description, includes one or more schedulingInfo information elements. In the scenario of FIG. 11, and as shown by Table 2, the k'th schedulingInfo information element indicates that the SI message associated with this schedulingInfo (SI #k, hereafter), containing SIB #A, is currently broadcasted periodically. Furthermore, the SIB1 specifies (see Table 2) that otherSIBInfo corresponding to SIB #A indicates that the validity information of SIB #A is now valueTag=b and si-AreaID=3.

Knowing that the stored SIB #A is now invalid, as act 11-3 the wireless terminal 26 begins an SI message acquisition wherein the wireless terminal may attempt to acquire the SI message (SI #k) in the SI windows specified in SIB 1. In FIG. 11, act 11-3a illustrates an unsuccessful SI message reception attempt in a first SI window for SI #k, followed by act 11-3b which is a successful SI message reception in a second SI window for SI #k, Thus, as shown in FIG. 11, if the SI message is not received by the end of the SI window (as was the case for act 11-3a), the wireless terminal 26 may repeat reception at the next SI window occasion for the concerned SI message until it successfully receives the SI message (as was done in act 11-3b).

TABLE 2

```
...
schedulingInfoList {
  ...
  k'th schdulingInfo (SI#k) {
    ...
    deliveryMethod = broadcast
    SIB-type = A
    ...
  }
  ...
}
...
otherSIBInfoList {
  ...
  otherISBInfo {
    SIB-type = A
    ValidityInfo {
      valueTag = b
      ...
    }
    ...
  }
  ...
}
...
si-AreaID = 3
...
```

Unsuccessful Attempted Reception of on-Demand System Information

Figure 12:
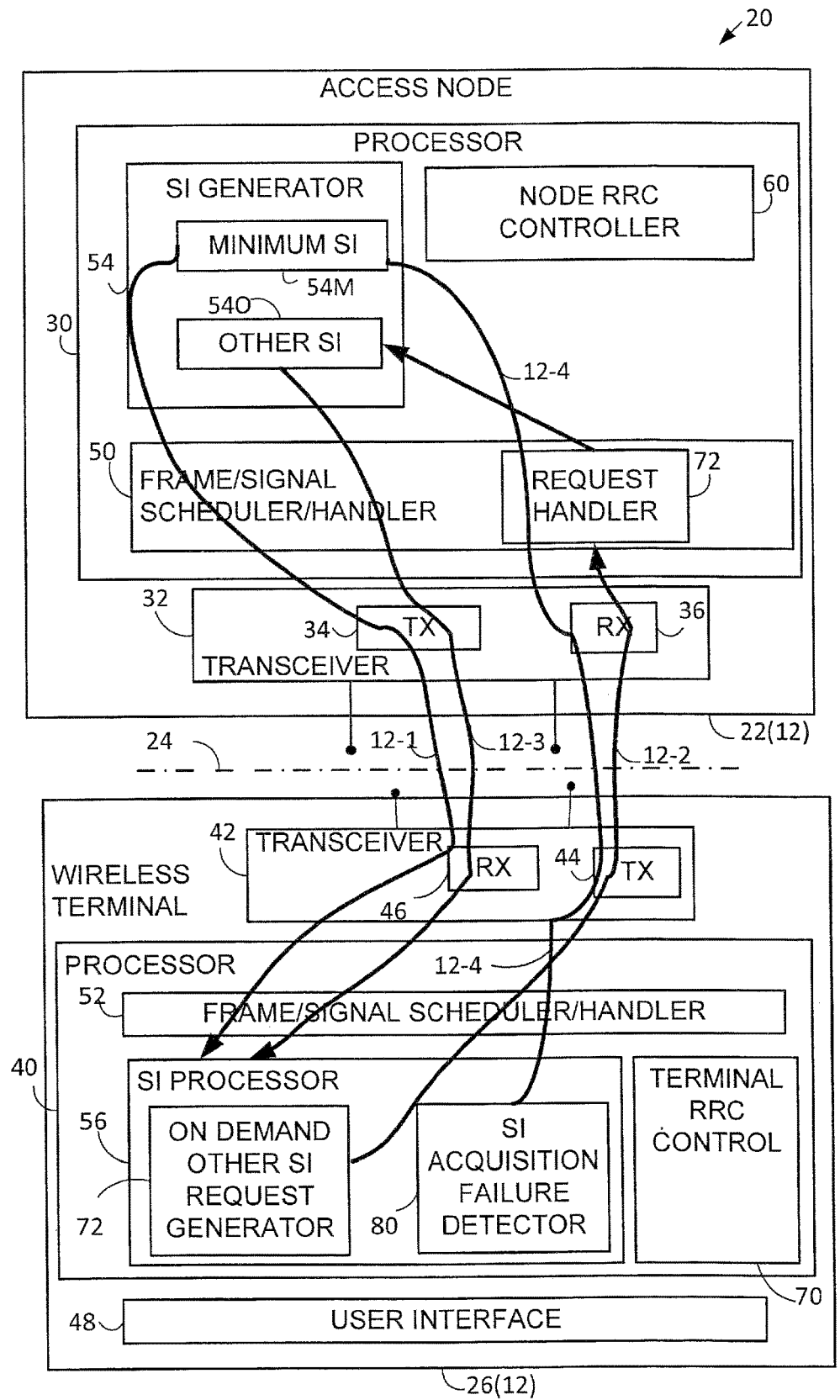
FIG. 12 is a schematic view showing an example generic communications system comprising a wireless terminal configured to detect failure of a SI reception process involving an on-demand SI message, following a successful completion of an SI request.

FIG. 12 shows an example communications system 20(12) comprising wireless terminal 26(12) configured to detect failure of a SI reception process involving an on-demand SI message, following a successful completion of an SI request. The access node 22(12) and wireless terminal 26(12) of FIG. 12 are essentially identical to the respective access node 22 and wireless terminal 26 of FIG. 2, except as otherwise indicated herein. In terms of likeness, for example, the radio access node 22(12) comprises node processor 30 and node transceiver circuitry 32, with the node processor 30 comprising, e.g., node frame/signal scheduler/handler 50, system information (SI) generator 54, and node RRC controller 60. Similarly, the wireless terminal 26(12) comprises terminal processor 40, terminal transceiver circuitry 42, with terminal processor 40 comprising terminal frame/signal scheduler/handler 52, system information (SI) processor 56, and terminal RRC controller 70.

FIG. 12 also shows that wireless terminal 26(12) comprises system information acquisition failure detector 80. The terminal processor 40, and particularly SI processor 56, may comprise or constitute the system information acquisition failure detector 80. The system information acquisition failure detector 80 is configured to make a determination of a failure of the SI message acquisition process. The system information acquisition failure detector 80 may make such failure determination based on a termination condition, as herein explained.

The system information generator 54 of radio access node 22(12) is configured to generate first type system information. For the example embodiment and mode of FIG. 12, and in an example, non-limiting manner shown in FIG. 13, the first type system information comprises (information elements or the like which indicate): availability of second type SI messages; scheduling information of each of the SI messages; a delivery mode for each of the second type SI messages; and, a configuration parameter to configure at least one termination condition for determination of a failure of an SI message acquisition process for the on-demand based second type SI messages.

As understood herein, a second type SI message comprises at least one system information block (SIB), and the delivery mode may be either periodic broadcast or on-demand basis. The transmitter circuitry 36 of radio access node 22(12) is configured to transmit the first type system information over the radio interface 24 to the wireless terminal 26(12), as shown by arrow 12-1 in FIG. 12

As in the example embodiment and mode of FIG. 2, the on-demand Other SI request generator 72 of wireless terminal 26(12) may request at least one second type SI using a request message as indicated by arrow 12-2 in FIG. 12. The second type SI request message depicted by arrow 12-2 is received by node receiver circuitry 36. The node processor 30, and particularly the SI generator 54, generates the requested (second type) SI message in one or more windows of transmission, the transmission of the requested SI message being depicted by arrow 12-3 in FIG. 12.

As mentioned above, system information acquisition failure detector 80 may make a determination of a failure of the SI message acquisition process. When so doing, in an example embodiment and mode, the terminal processor 40, working in response to or with system information acquisition failure detector 80, is configured to initiate acquisition of the first type system information. That is, the terminal processor 40 is configured, upon a failure of the SI message acquisition process, to initiate acquisition of the first type system information, e.g., to again request the first type system information (Minimum SI) from the radio access node 22(12). In FIG. 12 such request for first type system information is depicted by arrow 12-4.

Figure 13A:
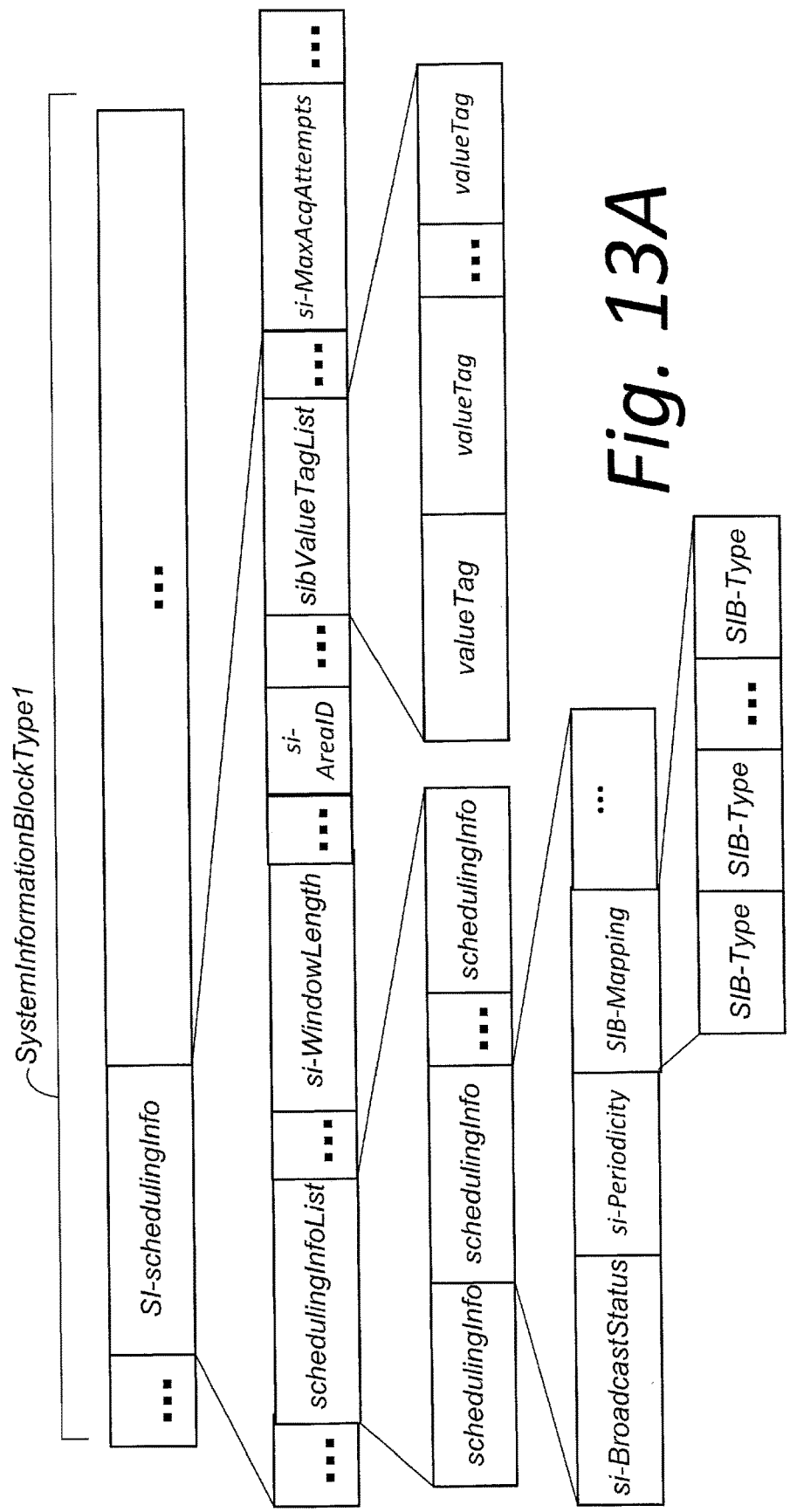
FIG. 13A is a diagrammatic view of differing implementations of SIB1 which comprise termination condition parameters.
Figure 13B:
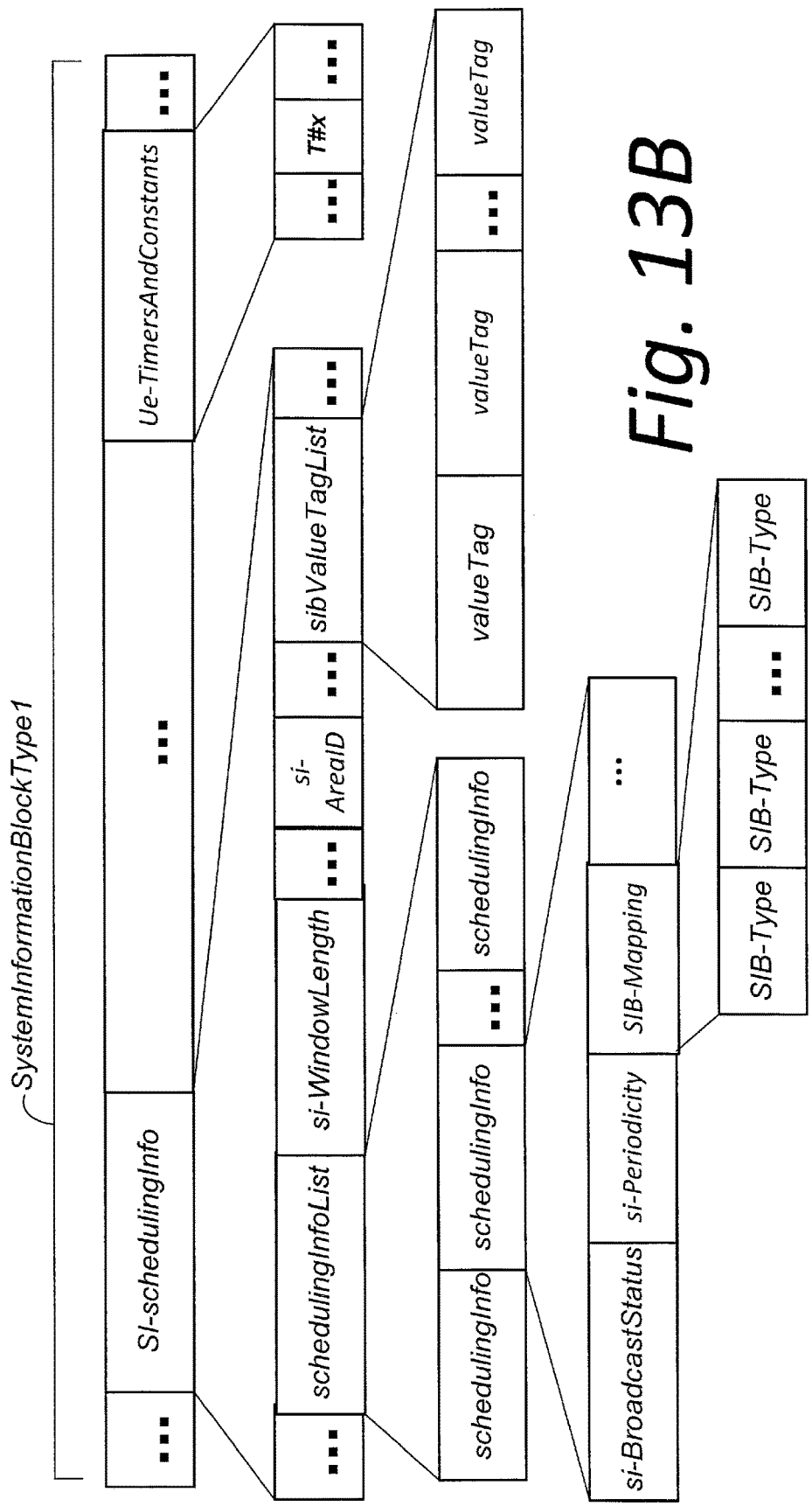
FIG. 13B is a diagrammatic view of differing implementations of SIB1 which comprise termination condition parameters.
Figure 13C:
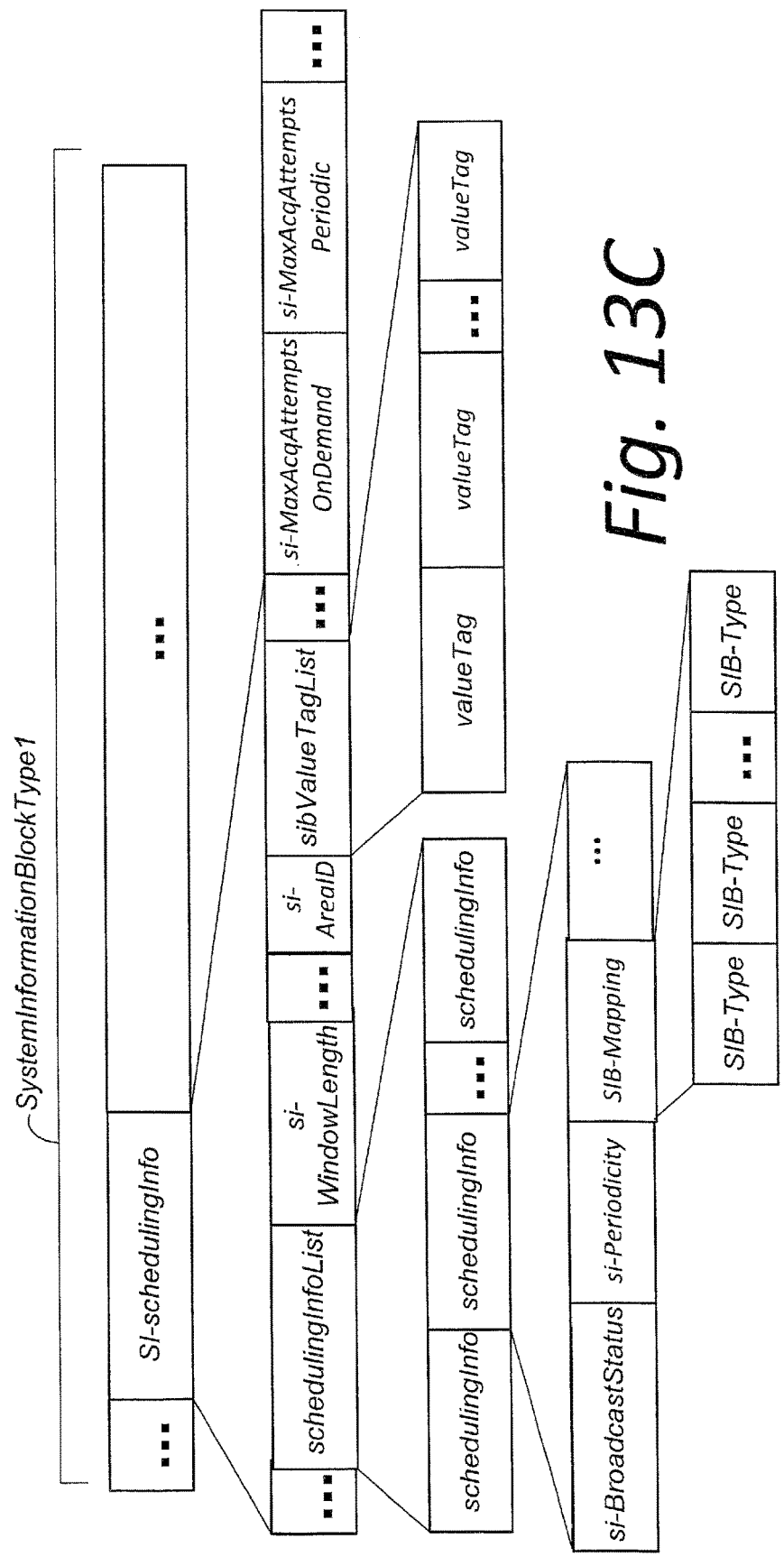
FIG. 13C is a diagrammatic view of differing implementations of SIB1 which comprise termination condition parameters.
Figure 13D:
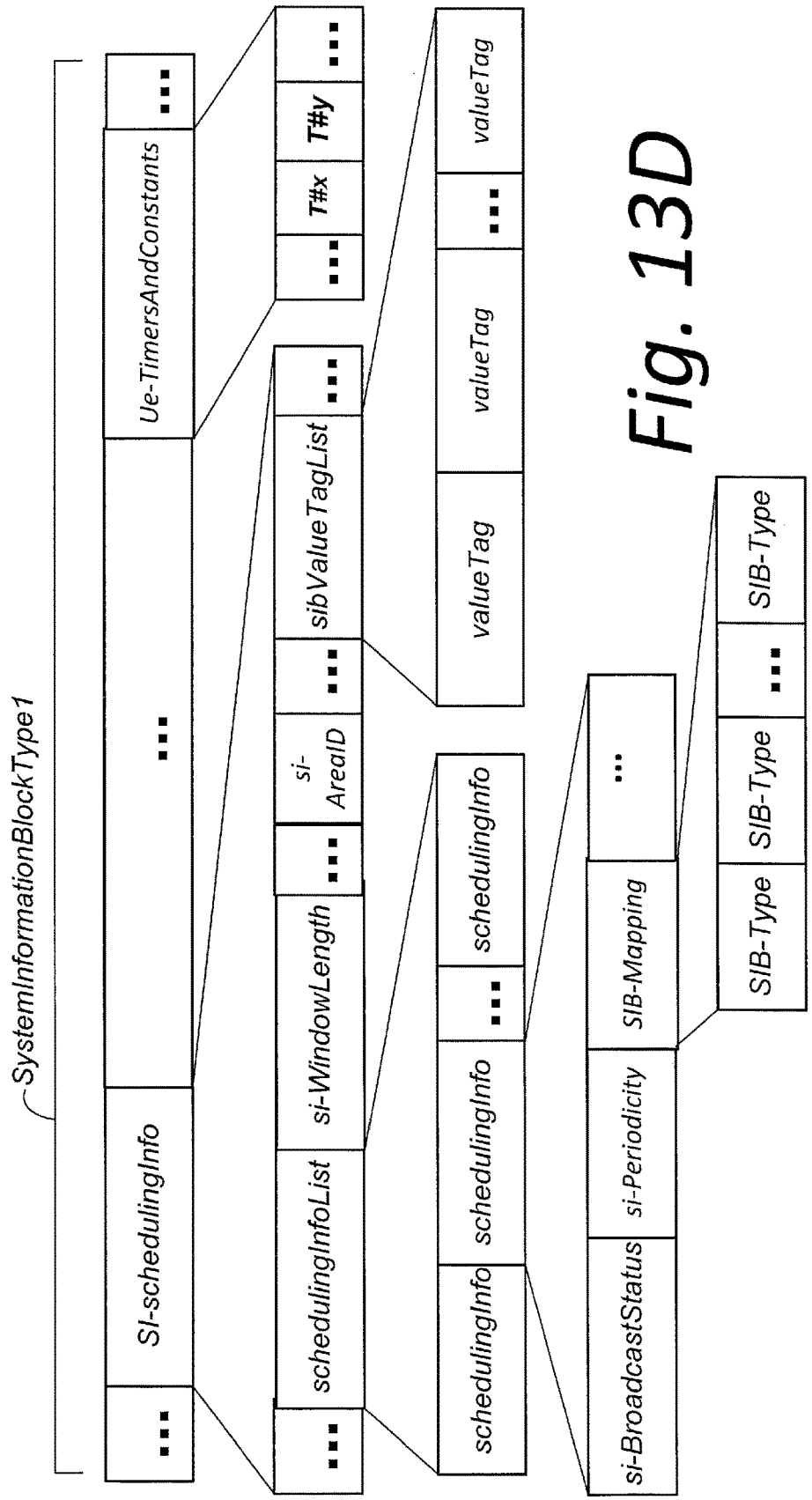
FIG. 13D is a diagrammatic view of differing implementations of SIB1 which comprise termination condition parameters.

FIG. 13A is an exemplary format of SIB1, which is based on the format shown in FIG. 7 with an additional information element si-MaxAcqAttempts. The information element si-MaxAcqAttempts provides a termination condition for the SI message acquisition, indicating the maximum number of SI message reception opportunities (e.g. SI windows) allowed before the end of the SI message acquisition. FIG. 13B is an alternative format of SIB1, wherein the information element ue-TimersAndConstants includes a timer configuration (T #x) to be used as a termination condition for the SI message acquisition.

Figure 14:
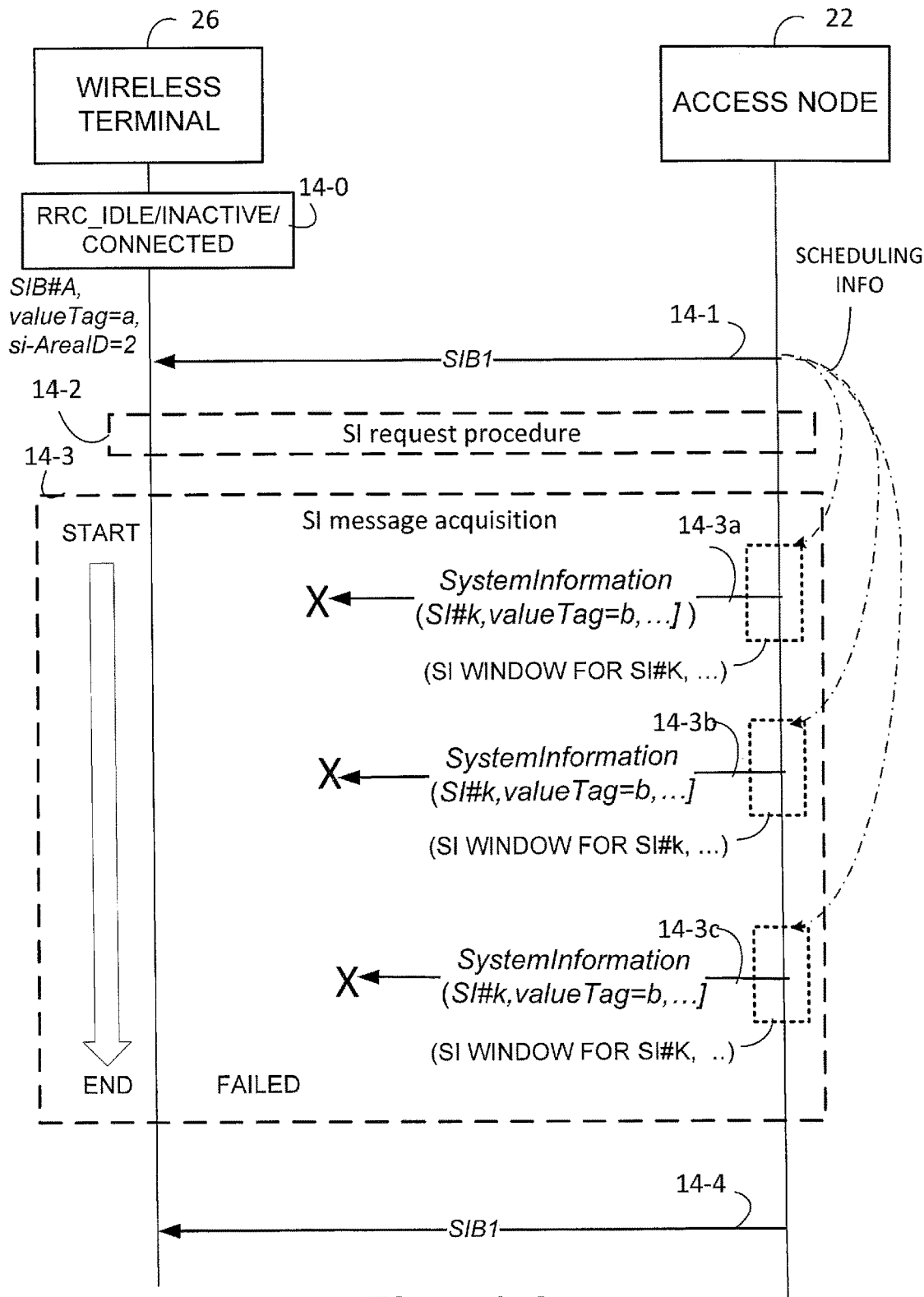
FIG. 14 is a diagrammatic view illustrating an exemplary message flow including an on-demand based SI acquisition procedure which fails.

FIG. 14 is an exemplary message flow diagram of on-demand based SI acquisition procedure wherein system information acquisition failure is detected. As shown by act 14-0, wireless terminal 26, in either RRC_IDLE, RRC_INACTIVE or RRC_CONNECTED state stores the content of SIB #A with the validity information, valueTag=a, si-AreaID=2, which the wireless terminal has previously received. From the currently serving access node, as act 14-1 the wireless terminal may obtain SIB1 as Minimum SI, e.g., first type system information. Obtaining of the SIB1 is depicted by arrow 12-1 in FIG. 12. As shown in FIG. 13, the SIB1 includes the scheduleInfoList, which in turn may include one or more schedulingInfo information elements. An example scheduleInfoList for this scenario is shown in previously-discussed Table 1, wherein the k'th schedulingInfo indicates that the SI message associated with this schedulingInfo (SI #k, hereafter), containing SIB #A, will be available by on-demand delivery. Furthermore, the otherSIBInfo corresponding to SIB #A indicates that the validity information of SIB #A is valueTag=b, si-AreaID=3. It is assumed hereafter that whenever the wireless terminal receives SIB1, it has already received MIB beforehand.

Knowing that the stored SIB #A is now invalid, the wireless terminal may decide to obtain a valid version of SIB #A, and may initiate the SI request procedure represented by act 14-2 and explained herein and illustrated by arrow 12-2 in FIG. 12. After the SI request procedure has a successful result, the wireless terminal may start the SI message acquisition, shown generally as act 14-3 in FIG. 14. In the SI message acquisition the wireless terminal monitors signals from the access node (depicted by arrow 12-3 in FIG. 12) in the designated SI windows derived from the scheduling information (scheduleInfo) in the SIB1, and thereby attempts to receive the requested SI #k. The SI windows are shown by dotted rectangles in FIG. 14. FIG. 14 shows by act 14-3a, act 14-3b, and act 14-3c three successive transmissions of the requested SI #k, all of which are unsuccessful. A tail of a vertical down-pointing arrow in the SI message acquisition depiction of FIG. 14 is associated with start of the SI message acquisition, while the head of the same vertical down-pointing arrow is associated with end of the SI message acquisition. In FIG. 14, the SI message acquisition fails. Failure of the SI message acquisition is determined by system information acquisition failure detector 80 which, as indicated above, makes a determination of a failure of the SI message acquisition process based on a termination condition. Examples of the termination condition are described below.

Upon detection of failure of the SI message acquisition process, as act 14-4 the terminal processor 40 initiates (re)acquisition of the first type system information, e.g., the MINIMAL SI or SIB1, as shown by arrow 12-4 in FIG. 12. The wireless terminal 26(12) thus attempts to again acquire the first type system information, in hopes that the SI message acquisition process can thereafter be repeated and perhaps in such repeat of the SI message acquisition process the requested SI message will be obtained. In an example implementation, the wireless terminal 26(12) may optionally reacquire MIB prior to reacquisition of SIB 1. Accordingly, not having a valid version of a stored SIB, upon detection of failure of the SI message acquisition process, the terminal processor 40 initiates (re)acquisition of the first type system information.

Figure 15:
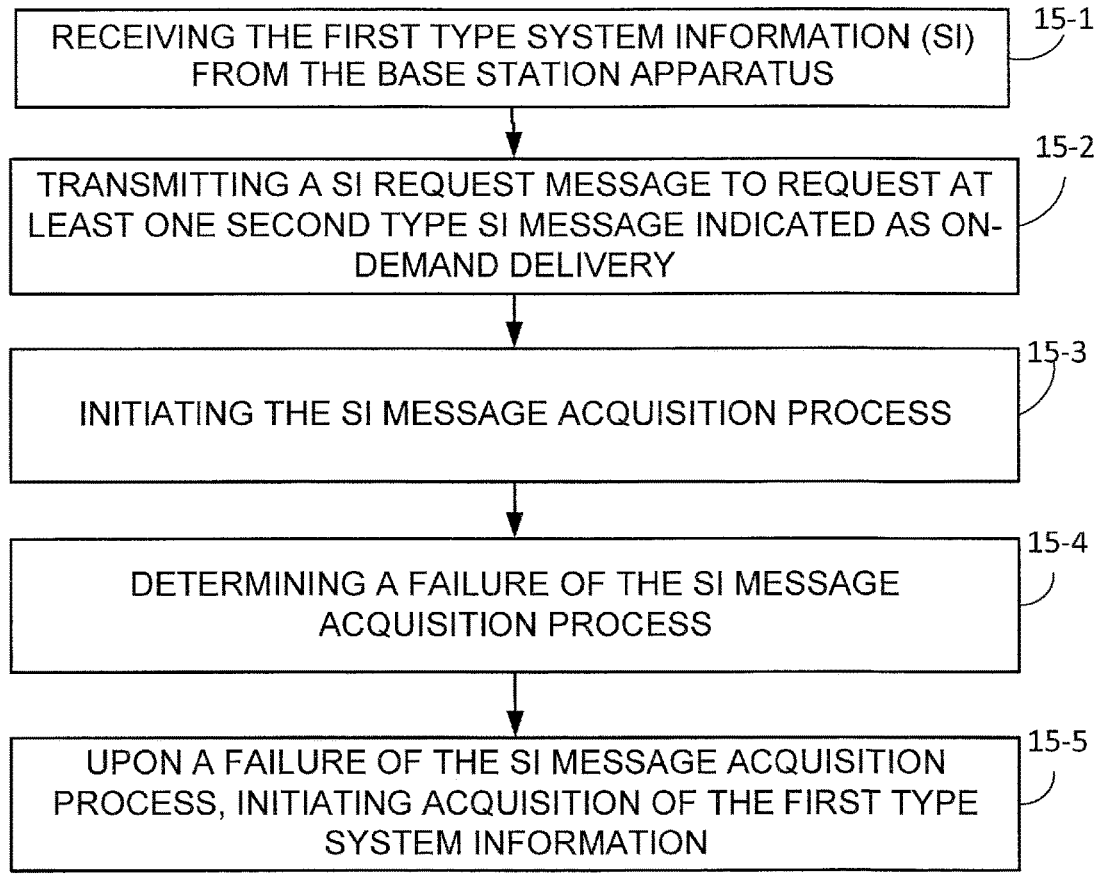
FIG. 15 is a flowchart showing basic, representative, example acts or steps performed by the wireless terminal of FIG. 12.
Figure 16:
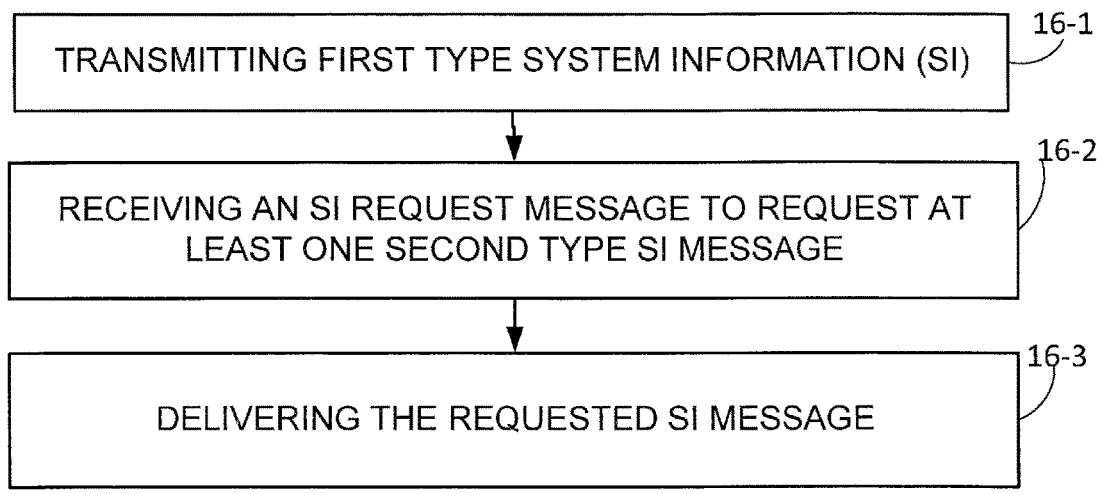
FIG. 16 is a flowchart showing basic, representative, example acts or steps performed by the access node of FIG. 12.
Figure 17A:
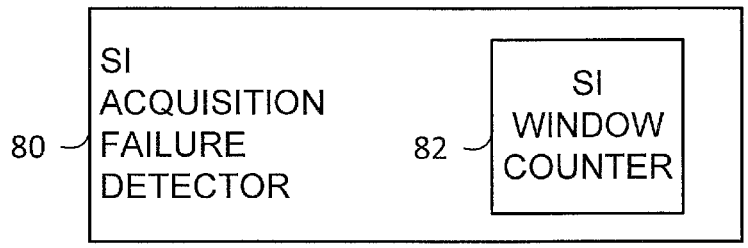
FIG. 17A is a diagrammatic view of a system information acquisition failure detector which comprises a SI window counter for making a determination of SI message acquisition process termination.

FIG. 15 shows basic, representative, example acts or steps performed by the wireless terminal 26(12) of FIG. 12. Act 15-1 comprises receiving the first type system information (SI) from the base station apparatus. As mentioned above, the first type system information comprises: availability of a second type SI message, the second type SI message comprising at least one system information block (SIB); scheduling information for the SI message; an indication of a delivery mode for the second type SI message, the delivery mode being either periodic broadcast or on-demand basis; and, at least one termination condition for determination of a failure of an SI message acquisition process for the on-demand based second type SI message. Act 15-2 comprises transmitting an SI request message to request at least one second type SI message indicated as on-demand delivery. Act 15-3 comprises initiating the SI message acquisition process. Act 15-4 comprises determining a failure of the SI message acquisition process. Act 15-5 comprises, upon a failure of the SI message acquisition process, initiating acquisition of the first type system information FIG. 16 is a flowchart showing basic, representative, example acts or steps performed by the access node 22(12) of FIG. 12. Act 16-1 comprises transmitting first type system information (SI). The first type SI has been described above. Act 16-2 comprises receiving an SI request message to request at least one second type SI message. Act 16-3 comprises delivering the requested SI message. As understood from above, the requested SI message may be sent periodically, repeatedly transmitted at a predetermined interval, for a predetermined length of time It was mentioned above that, in one configuration, the wireless terminal may use a counter, which is incremented at every SI window of a particular SI message, e.g. SI #k, and that the SI message acquisition may end when the requested SI message(s) are successfully received, or when the counter reaches a maximum counter value. In some configurations, the maximum counter value may be configured by SIB1 (e.g. si-MaxAcqAttempts shown in FIG. 13A). FIG. 17A shows the system information acquisition failure detector 80 as comprising such counter as SI window counter 82. Thus in one example implementation of the FIG. 12 example embodiment and mode, the termination condition may comprise SI window counter 82 counting up to reach a maximum value, or counting down from a pre-set value to zero. Such maximum or pre-set value may be configured by the radio access node 22(12). The SI window counter 82 is incremented (or decremented) in a case in which the requested SI message was not received by the end of one reception opportunity, e.g., a case in which the requested SI message was not received by the end of an SI window.

Figure 17B:
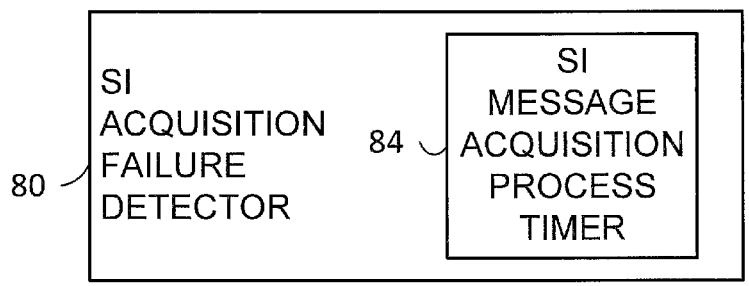
FIG. 17B is a diagrammatic view of a system information acquisition failure detector which comprises a SI message acquisition process timer for making a determination of SI message acquisition process termination.

It was further mentioned above that, in another configuration the wireless terminal may start a timer at the beginning of the SI message acquisition, and that the SI message acquisition may end when the requested SI message(s) are successfully received, or when the timer expires. In some configuration, the timer is configured by SIB1 (e.g. the timer configuration T #x in FIG. 13B). FIG. 17B shows the system information acquisition failure detector 80 as comprising such a timer: SI message acquisition process timer 84. Thus in another example implementation of the FIG. 12 example embodiment and mode, the termination condition may comprise SI message acquisition process timer 84 expiration of a timer configured by the base station apparatus. The SI message acquisition process timer 84 is started at the beginning of the SI message acquisition process. The timer expiration value may be configured by the radio access node 22(12).

Figure 18A:
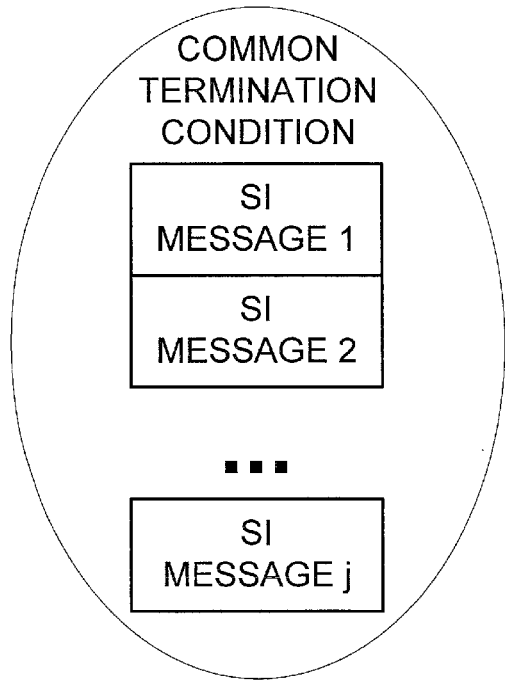
FIG. 18A is a diagrammatic view showing a common termination condition for plural SI messages.
Figure 18B:
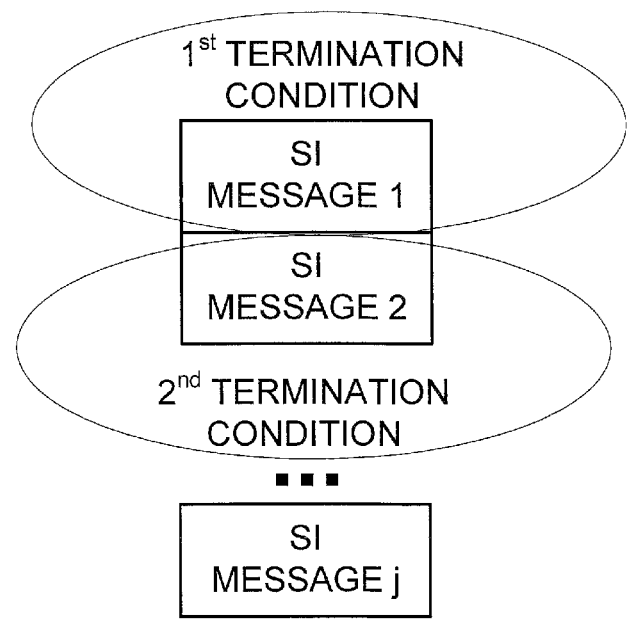
FIG. 18B is a diagrammatic view showing different termination conditions for different SI messages.

As understood from above, the Other SI may comprise one or more (Other) SI messages, also known as second type SI messages. In one example implementation, as reflected by FIG. 18A, the termination condition may be common for plural, e.g., all, SI messages. That is, in the FIG. 18A implementation, the maximum counter value in the case of FIG. 17A, or the timer value in the case of FIG. 17B, may be common for all SI messages. In this case, the counter value configuration or the timer configuration in Minimum SI (e.g., si-MaxAcqAttempts in FIG. 13A, or T #x in FIG. 13B) may comprise a single parameter. Alternatively, as shown in the example implementation of FIG. 18B, the termination condition may be configured on a per-SI message basis, e.g., uniquely configured for one or more (Other SI) SI messages. In this case, the counter value configuration or the timer configuration in Minimum SI (e.g. si-MaxAcqAttempts in FIG. 13A, or T #x in FIG. 13B) may comprise a list of parameters, each of which configures a corresponding SI message. In either the FIG. 18A or FIG. 18B implementations, the termination condition(s), whether common or not common, e.g., unique, may be pre-configured or configured by network via system information. Thus, the condition for the wireless terminal to end the SI reception process is referred as a "termination condition" herein.

The foregoing is now discussed in context of a more general 3GPP TS SI acquisition procedure for a UE to acquire the access stratum, AS, and non-access stratum, NAS, information. This more 3GPP TS procedure applies to UEs in RRC_IDLE, in RRC_INACTIVE and in RRC_CONNECTED. The UE in RRC_IDLE and RRC_INACTIVE shall ensure having a valid version of (at least) the MIB, SIB1 as well as SIB X through SIB Y (depending on support of the concerned RATs for UE controlled mobility). The UE in RRC_CONNECTED shall ensure having a valid version of (at least) the MIB, SIB1 as well as SIB X (depending on support of mobility towards the concerned RATs).

For the acquisition of MIB and SIB1, the UE shall perform the acts of LISTING 1 below (wherein reference to any "section", "clause", or "sub-clause" is to the respective section, clause, or sub-clause of 3GPP TS 38.331.)

---
LISTING 1
---
```
1>     if the cell is a PSCell:
           2>     acquire the MIB;
           2>     perform the actions specified in section 5.2.2.4.1;
1>     else:
           2>     acquire the MIB;
           2> if the UE is unable to acquire the MIB;
              3> perform the actions as specified in clause 5.2.2.5;
           2>     else:
              3>        perform the actions specified in section 5.2.2.4.1.
           2>     acquire the SIB1,
           2>     if the UE is unable to acquire the SIB1:
              3> perform the actions as specified in clause 5.2.2.5;
           2>        else:
              3>perform the actions specified in section 5.2.2.4.2.
```

From the foregoing it is understood that the UE shall apply the SI acquisition procedure as defined above upon cell selection (e.g. upon power on), cell-reselection, return from out of coverage, after reconfiguration with sync completion, after entering NR-RAN from another RAT, upon receiving an indication that the system information has changed, upon receiving a PWS notification, upon failing to acquire an SI message; whenever the UE does not have a valid version in the stored SI.

From the foregoing it is understood that, in an example implementation, when acquiring an SI message, the UE may perform the following acts of Listing 2.

---
LISTING 2
---
```
     1>    determine the start of the SI-window for the concerned SI message.
     1> if SI message acquisition is not triggered due to UE request:
                 2>         receive DL-SCH using the SI-RNTI from the start of the
                 SI-window and continue until the end of the SI-window whose absolute
                 length in time is given by si-WindowLength, or until the SI message was
                 received;
                 2>         if the SI message was not received by the end of the SI-window,
                 repeat reception at the next SI-window occasion for the concerned SI
                 message;
     1> else if SI message acquisition is triggered due to UE request:
        2>Set the SI window counter 82 to 0 (or Start SI message acquisition process timer
              84);
        2>[FFS receive DL-SCH using the SI-RNTI from the start of the SI-window and
              continue until the end of the SI-window whose absolute length in time is given by
              si-WindowLength, or until the SI message was received];
        2>[FFS if the SI message was not received by the end of the SI-window, increment
              the SI window counter 82 , repeat reception at the next SI-window occasion for
              the concerned SI message];
        2>if the SI window counter 82 is equal to configured maximum value or counted
              down to zero (or timer SI message acquisition process timer 84 expires)
           3> Initiate the SI acquisition procedure.
When the UE acquires a MIB or a SIB1 or a SI message in a currently camped/serving cell
as described in clause 5.2.2.3, the UE shall store the acquired SI. A version of the SI that
the UE stored is out of date after 3 hours. The UE may use such a stored version of the SI
e.g. after cell re-selection, upon return from out of coverage or after the reception of SI
change indication. The storage and management of the stored SI in addition to the SI
relevant for the current camped/serving cell is left to UE implementation. The UE shall:
        1>     delete any stored version of a SIB after 3 hours from the moment it was
```

LISTING 2

```
successfully confirmed as valid;
    1>      if UE has stored version of any SIB:
        2>for each SIB:
            3> if the stored SIB is area specific SIB and if
            systemInfoAreaIdentifier and systemInfoValueTag included in the SIBI
            received from the currently camped/serving cell are identical to the
            systemInfoAreaIdentifier and systemInfoValueTag associated with stored
            version of that SIB; or
                3>     if the stored SIB is cell specific and if systemInfoValueTag
                included in the SIBI received from the currently camped/serving cell is
                identical to the systemInfoValueTag associated with stored version of that
                SIB;
                    4> consider the stored SIB as valid for the cell;
                3>    else:
                    4> (re)acquire the corresponding SI message as specified in
                clause 5.2.2.3.
    1>      if UE has no stored version of a SIB:
        2> (re)acquire the corresponding SI message as specified in clause 5.2.2.3.
```

Unsuccessful Attempted Reception of Broadcasted System Information

The previous embodiments disclose, e.g., procedure(s) for acquiring an SI message currently broadcasted periodically, wherein the wireless terminal may continue the SI message acquisition until successful completion. This operation may be valid if the concerned SI message is assumed to be broadcasted forever. By the introduction of on-demand SI, however, the assumption is not guaranteed to be true. For instance, when the wireless terminal sees deliveryMode=broadcast in SIB1 for the SI message of concern, it is possible that the access node may be temporarily broadcasting the SI message in response to a request from another wireless terminal, and that the access node may stop the periodic broadcast eventually.

Figure 19:
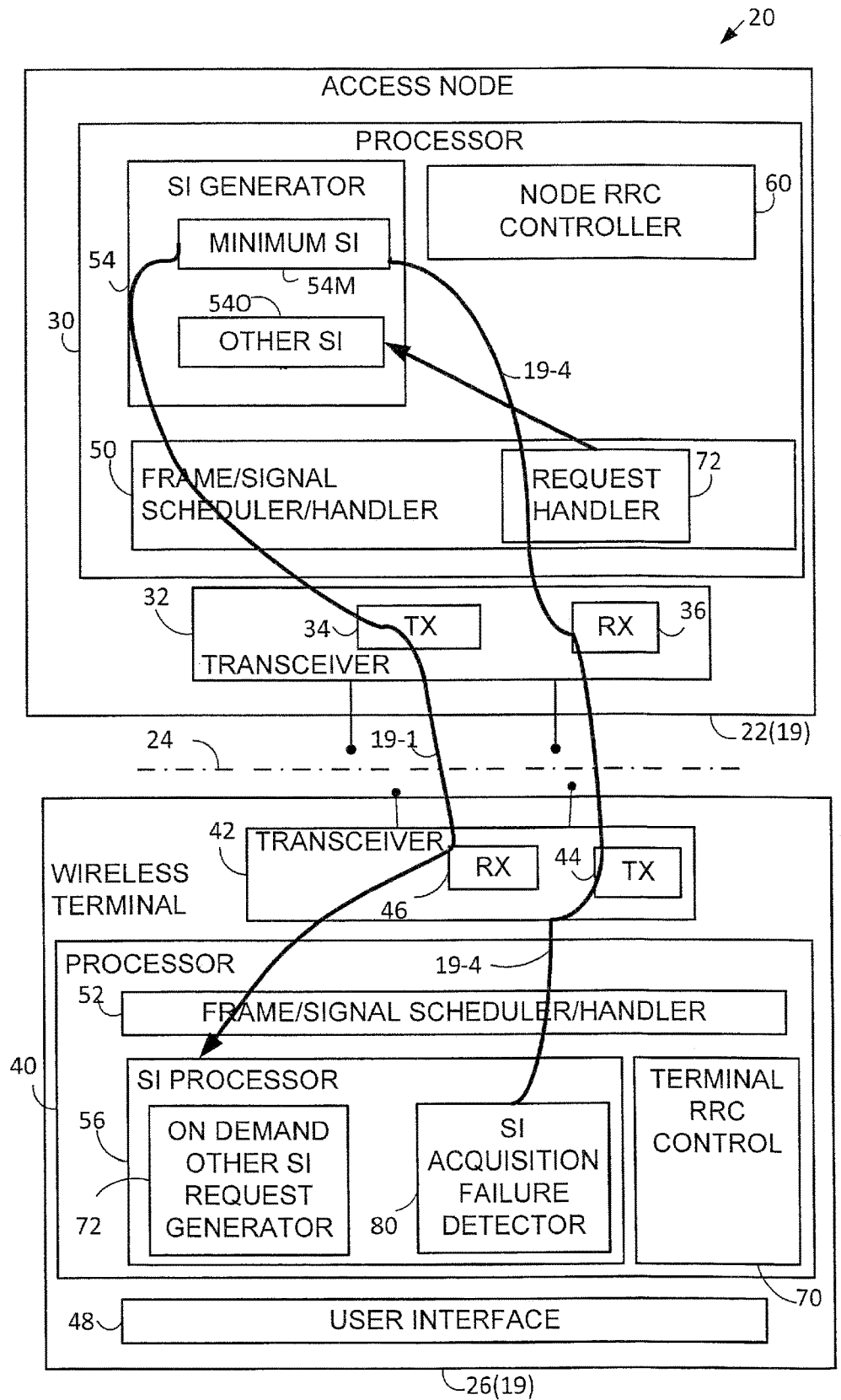
FIG. 19 is a schematic view showing an example generic communications system comprising a wireless terminal configured to detect failure of a SI reception process involving a periodically broadcasted SI message.

Whereas the example communications system 20(12) of FIG. 12 primarily concerns unsuccessful attempted reception of on-demand system information, FIG. 19 shows an example communications system 20(17) comprising wireless terminal 26(17) configured to detect failure of a SI reception process involving a periodically broadcast SI message. The access node 22(17) and wireless terminal 26(17) of FIG. 19 are essentially identical to the respective access node 22 and wireless terminal 26 of FIG. 2 and FIG. 12, except as otherwise indicated herein. In terms of likeness, for example, the radio access node 22(17) comprises node processor 30 and node transceiver circuitry 32, with the node processor 30 comprising, e.g., node frame/signal scheduler/handler 50, system information (SI) generator 54, and node RRC controller 60. Similarly, the wireless terminal 26(17) comprises terminal processor 40, terminal transceiver circuitry 42, with terminal processor 40 comprising terminal frame/signal scheduler/handler 52, system information (SI) processor 56, and terminal RRC controller 70.

FIG. 19 shows that wireless terminal 26(17) also comprises system information acquisition failure detector 80. As in the case of FIG. 12, terminal processor 40, and particularly SI processor 56, may comprise or constitute the system information acquisition failure detector 80. The system information acquisition failure detector 80 is configured to make a determination of a failure of the SI message acquisition process. The system information acquisition failure detector 80 may make such failure determination based on a termination condition, as herein explained.

As in the FIG. 12 example embodiment and mode, system information generator 54 of radio access node 22(12) is configured to generate first type system information. For the example embodiment and mode of FIG. 19, and in the example, non-limiting manner shown in FIG. 13, the first type system information comprises (information elements or the like which indicate): availability of second type SI messages; scheduling information of each of the SI messages; a delivery mode for each of the second type SI messages; and, a configuration parameter to configure at least one termination condition for determination of a failure of an SI message acquisition process for the on-demand based second type SI messages. As understood herein, a second type SI message comprises at least one system information block (SIB), and the delivery mode may be either periodic broadcast or on-demand basis. The transmitter circuitry 36 of radio access node 22(17) is configured to transmit the first type system information over the radio interface 24 to the wireless terminal 26(17), as shown by arrow 19-1 in FIG. 19.

In the FIG. 19 example embodiment and mode it is assumed that wireless terminal 26(17) is presently concerned with acquiring a second type SI message for which the delivery mode is periodic broadcast. As such, the terminal processor 40 is controlling terminal receiver 46 to initiate a SI message acquisition process for a periodically broadcasted second type SI message. But it may turn out, however, after initiating the SI message acquisition process, that the expected periodically broadcasted second type SI message(s) are not received. Non-receipt of the periodically broadcasted second type SI message(s) may be for any of several reasons, including the fact that the broadcast of the periodically broadcasted second type SI message was at the behest of another wireless terminal, with the wireless terminal 26(17) essentially being a third-party beneficiary of the broadcasts, and the access node has by now terminated the broadcast of the second type SI message intended for the another wireless terminal.

Thus, as in the FIG. 12 example embodiment and mode, system information acquisition failure detector 80 may make a determination of a failure of the SI message acquisition process. When so doing, in an example embodiment and mode, the terminal processor 40, working in response to or with system information acquisition failure detector 80, is configured to initiate acquisition of the first type system information. That is, the terminal processor 40 is configured, upon a failure of the SI message acquisition process involving a periodically broadcasted second type SI message, to initiate acquisition of the first type system information, e.g., to again request the first type system information (Minimum SI) from the radio access node 22(17). In FIG. 19 such request for first type system information is depicted by arrow 19-4 (there being no arrow 19-2 or arrow 19-3 in FIG. 19).

Figure 20:
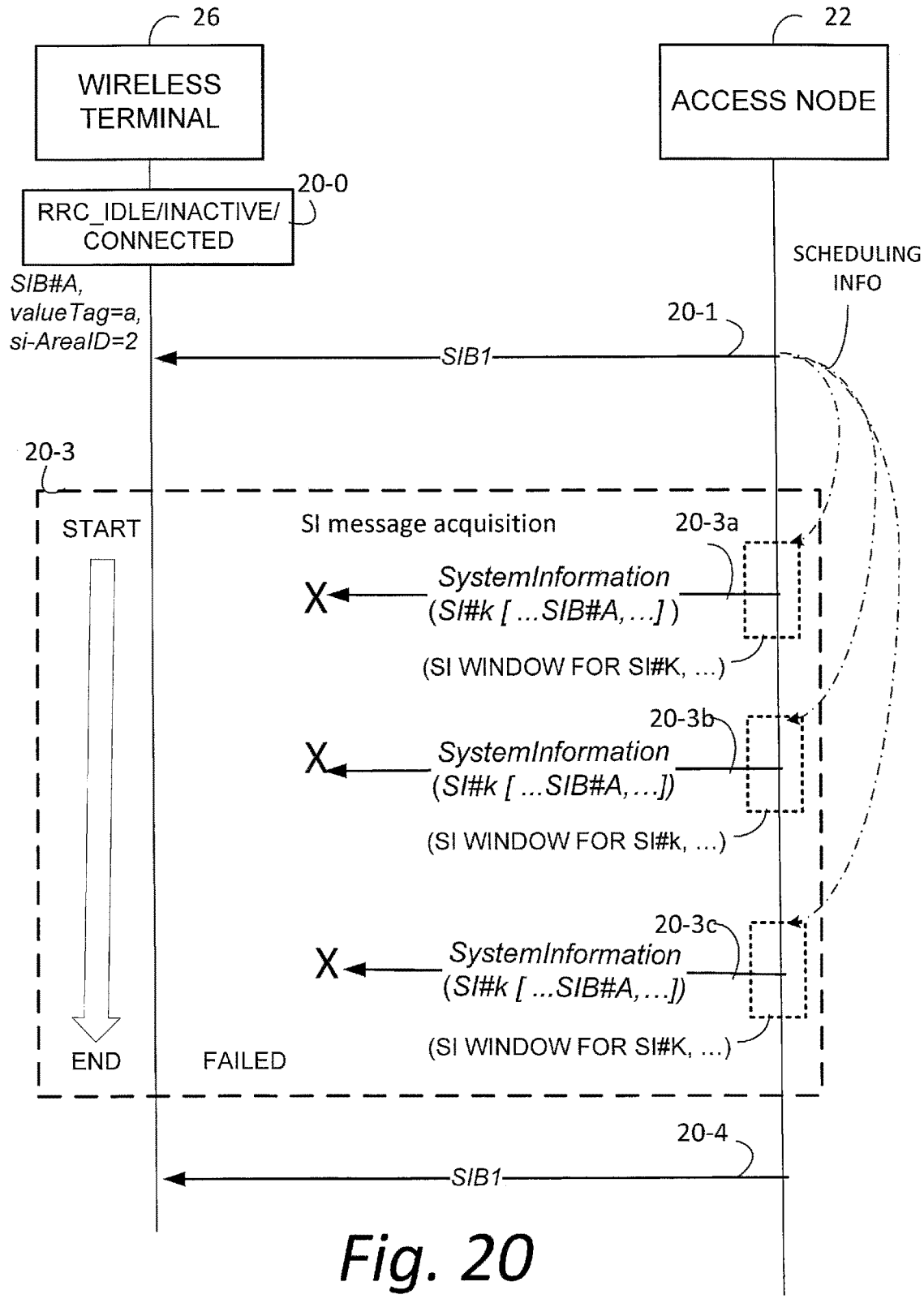
FIG. 20 is a diagrammatic view illustrating an exemplary message flow including a failed SI acquisition procedure for a periodically broadcasted SI message.

FIG. 20 is an exemplary message flow diagram of a periodic broadcast based SI acquisition procedure wherein system information acquisition failure is detected. As shown by act 20-0, wireless terminal 26, in either RRC_IDLE, RRC_INACTIVE or RRC_CONNECTED state stores the content of SIB #A with the validity information, valueTag=a, si-AreaID=2, which the wireless terminal has previously received. From the currently serving access node, as act 20-1 the wireless terminal may obtain SIB1 as Minimum SI, e.g., first type system information. Obtaining of the SIB1 is also depicted by arrow 19-1 in FIG. 19. As shown in FIG. 13, the SIB1 includes the scheduleInfoList, which in turn may include one or more schedulingInfo information elements. An example scheduleInfoList for this scenario is shown in previously-discussed Table 1, wherein the k'th schedulingInfo indicates that the SI message associated with this schedulingInfo (SI #k, hereafter), containing SIB #A, will be available by broadcast. Furthermore, the otherSIBInfo corresponding to SIB #A indicates that the validity information of SIB #A is valueTag=b, si-AreaID=3. It is assumed hereafter that whenever the wireless terminal receives SIB1, it has already received MIB beforehand. Having received the SIB1 as Minimum SI, e.g., first type system information, the wireless terminal 26(17) knows when the radio access node 22(17) is expected to broadcast the system information for the sought second type SI, e.g., SIB #A. As such, the terminal processor 40 of wireless terminal 26(17) begins the SI message acquisition (represented by act 20-3 in FIG. 20).

In the SI message acquisition 20-3, the wireless terminal monitors signals from the access node attempts to obtain the SI messages in the designated SI windows derived from the scheduling information (scheduleInfo) in the SIB1, and thereby attempts to receive the requested SI #k. The SI windows are shown by dotted rectangles in FIG. 20. FIG. 20 shows by act 20-3a, act 20-3b, and act 20-3c three successive transmissions of the requested SI #k, all of which are unsuccessful. A tail of a vertical down-pointing arrow in the SI message acquisition depiction of FIG. 20 is associated with start of the SI message acquisition, while the head of the same vertical down-pointing arrow is associated with end of the SI message acquisition. In FIG. 20, the SI message acquisition 20-3 utterly fails. Failure of the SI message acquisition is determined by system information acquisition failure detector 80 which, as indicated above, makes a determination of a failure of the SI message acquisition process based on a termination condition. Examples of the termination condition are described herein.

Upon detection of failure of the SI message acquisition process, as act 20-4 the terminal processor 40 initiates (re)acquisition of the first type system information, e.g., the MINIMAL SI or SIB1, as shown by arrow 14-4 in FIG. 14. The wireless terminal 26(14) thus attempts to again acquire the first type system information, in hopes that the SI message acquisition process can thereafter be repeated and perhaps in such repeat of the SI message acquisition process the requested SI message will be obtained. In an example implementation, the wireless terminal 26(14) may optionally reacquire MIB prior to reacquisition of SIB 1. Accordingly, not having a valid version of a stored SIB, upon detection of failure of the SI message acquisition process, the terminal processor 40 initiates (re)acquisition of the first type system information.

Figure 21:
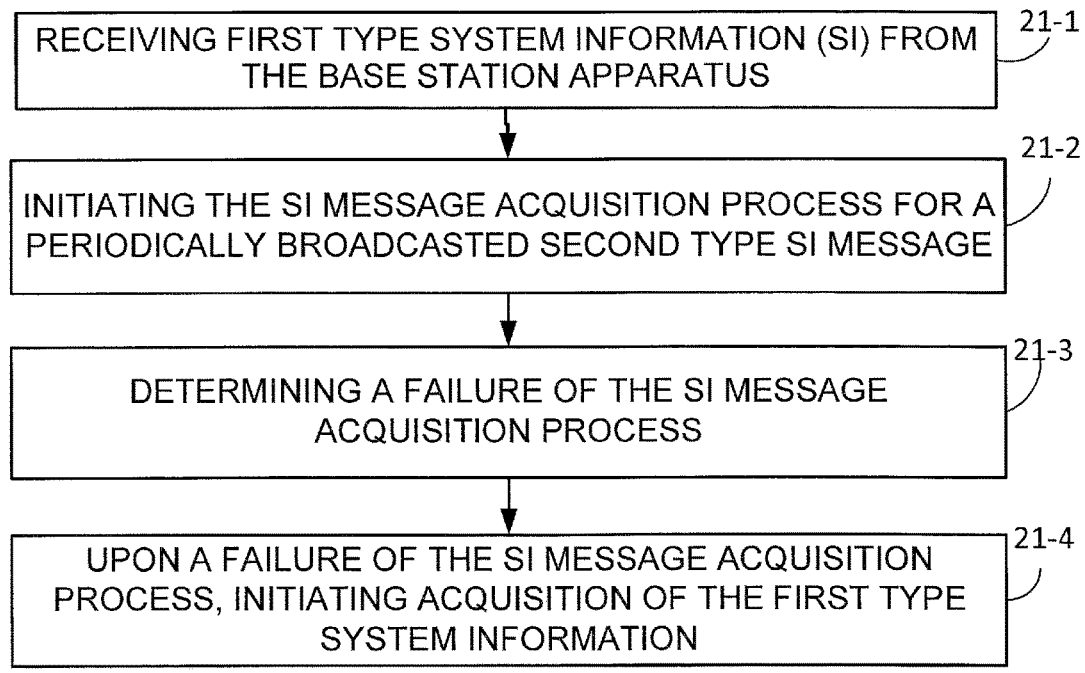
FIG. 21 is a flowchart showing basic, representative, example acts or steps performed by the wireless terminal of FIG. 19.

FIG. 21 is a flowchart showing basic, representative, example acts or steps performed by the wireless terminal of FIG. 19. Act 21-1 comprises receiving first type system information (SI) from the base station apparatus. As indicated previously, the first type system information comprises: availability of a second type SI message; scheduling information for the SI message; an indication of a delivery mode for the second type SI message, the delivery mode being either periodic broadcast or on-demand basis; and, at least one termination condition for determination of a failure of an SI message acquisition process. Act 21-2 comprises initiating the SI message acquisition process for a periodically broadcasted second type SI message. Act 21-3 comprises determining a failure of the SI message acquisition process. Act 21-4 comprises, upon a failure of the SI message acquisition process, initiating acquisition of the first type system information.

Figure 22:
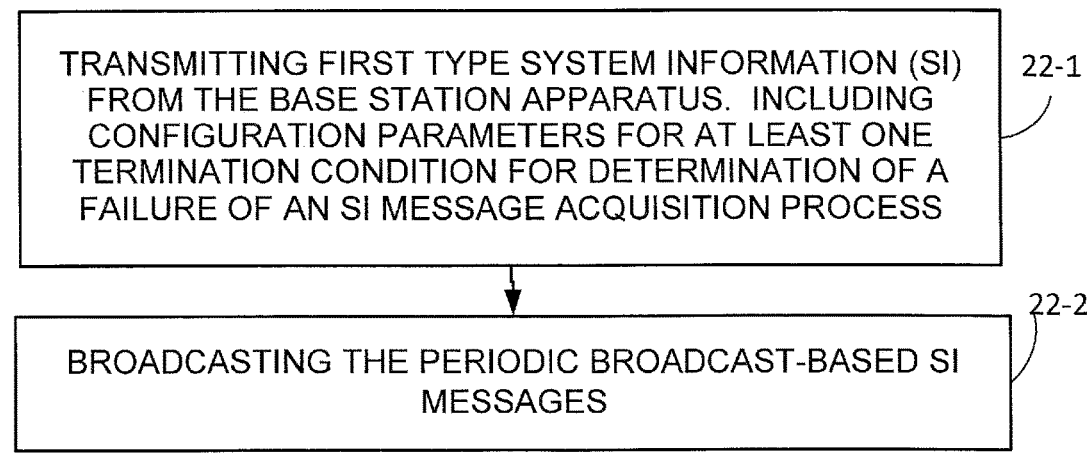
FIG. 22 is a flowchart showing basic, representative, example acts or steps performed by the access node of FIG. 19.

FIG. 22 is a flowchart showing basic, representative, example acts or steps performed by the access node of FIG. 19. Act 22-1 comprises transmitting first type system information (SI) from the base station apparatus. The first type system information comprises, e.g., configuration parameters to configure for at least one termination condition for determination of a failure of an SI message acquisition process. Act 22-2 comprises broadcasting the periodic broadcast-based SI messages.

As in the FIG. 12 embodiment and mode, wireless terminal 26(17) may use a counter, which is incremented at every SI window of a particular SI message, e.g. SI #k, and may end the SI message acquisition when the requested SI message(s) are successfully received, or when the counter reaches a maximum counter value. The system information acquisition failure detector 80 of FIG. 19 may comprise the aforementioned SI window counter 82, shown in FIG. 17A, which may count up to reach a maximum value, or count down from a pre-set value to zero. Such maximum or pre-set value may be configured by the radio access node 22(17). The SI window counter 82 is incremented (or decremented) in a case in which the requested SI message was not received by the end of one reception opportunity, e.g., a case in which the requested SI message was not received by the end of an SI window.

Also as in the FIG. 12 embodiment and mode, wireless terminal 26(17) may start a timer at the beginning of the SI message acquisition, and may end the SI message acquisition when the requested SI message(s) are successfully received, or when the timer expires. The system information acquisition failure detector 80 of FIG. 19 may comprise the aforementioned SI message acquisition process timer 84 shown in FIG. 17B when the termination condition comprises expiration of acquisition process timer 84. The SI message acquisition process timer 84 is started at the beginning of the SI message acquisition process. The timer expiration value may be configured by the radio access node 22(17).

Thus, similar to the example embodiments and modes of FIG. 2 and FIG. 12, for acquisition of periodic broadcast-based SI message(s) as shown in FIG. 19 an extra mechanism to terminate the SI message acquisition may employed. In one configuration, the wireless terminal may use a counter, which is incremented at every SI window of a particular SI message (e.g. SI #k). In this configuration, the SI message acquisition triggered by acquiring may end when the requested SI message is successfully received, or when the counter reaches a maximum counter value. (It should be understood that this counter implementation is logically identical to an alternative implementation, wherein the counter is set with the maximum counter value at the beginning of the SI message acquisition and decremented upon the end of the SI window. In this implementation, the SI message acquisition may end when the counter becomes a pre-determined value, such as zero). In another configuration the wireless terminal starts a timer at the beginning of the SI message acquisition. In this configuration, the SI message acquisition may end when the requested SI message is successfully received, or when the timer expires. Similar to the embodiment of FIG. 12, and as understood by FIG. 18A and FIG. 18B, the maximum counter value, or the timer value, may be common for all SIB types, per-SIB type basis or per-SI message basis, may be pre-configured or configured by network via system information.

It should further be understood that a wireless terminal may be attempting to receive some second type SI by periodic broadcast, and one or more other second type SI by on-demand delivery. Hence, in a further example embodiment and mode the terminal processor 40 of a wireless terminal, such as wireless terminal 26(17), may be configured to both detect failure of a SI message acquisition process for broadcasted second type system information and detect failure of a SI message acquisition process for on-demand second type system information. For this reason the terminal processor 40 of wireless terminal 26(17) shows terminal processor 40 and SI processor 56 in particular as still comprising on-demand Other SI request generator 72. Thus it is possible in some modes for both the process of FIG. 14 and FIG. 19 to be executing essentially currently.

When a wireless terminal 26 is capable of both detecting failure of a SI message acquisition process for broadcasted second type system information and detecting failure of a SI message acquisition process for on-demand second type system information, the wireless terminal 26 may have separate termination conditions for each process. For that reason the wireless terminal 26 may comprise plural SI window counters 82 and/or plural SI message acquisition process timers 84. For example, the wireless terminal may have a first SI window counter 82(B) for a SI message acquisition process for broadcasted second type system information; and a second SI window counter 82(D) for a SI message acquisition process for on-demand second type system information. Or, for example, wireless terminal may have a first SI message acquisition process timer 84(B) for a SI message acquisition process for broadcasted second type system information; and a second SI message acquisition process timer 84(D) for a SI message acquisition process for on-demand second type system information.

Furthermore, the counter configuration or the timer configuration for acquisition of periodic broadcast-based SI message(s) may be configured via system information (e.g. SIB1) separately from the configuration for acquisition of on-demand based SI message(s). In this case, SIB1 shown in FIG. 13C with two separate counter configurations (si-MaxAcqAttemptsOnDemand and si-MaxAcqAttemptsPeriodic) or FIG. 13D with two separate timer configurations (T #x for on-demand and T #y for periodic broadcast) may be used. Alternatively, the counter/timer configuration common for on-demand and periodic broadcast-based SI message acquisition may be configured. In this case, SIB1 shown in FIG. 13A (common counter configuration) or FIG. 13B (common timer configuration) may be used.

The aforementioned more general 3GPP TS SI acquisition procedure for a UE to acquire the AS- and NAS information may be modified in part, e.g., for acquisition of an SI Message, for the example embodiment and mode of FIG. 19 as shown below. As indicated earlier, the counters (SI window counter 82(B) and SI window counter 82(D)) or the timers (SI message acquisition process timer 84(B) and SI message acquisition process timer 84(D)) may be identical, or alternatively separately configured.

LISTING 3

When acquiring an SI message, the UE shall:
   1>determine the start of the SI-window for the concerned SI message as follows:
   1> if SI message acquisition is not triggered due to UE request:
      2> Set the counter SI window counter 82(B) to 0 (or Start timer SI message
      acquisition process timer 84(B));
      2>receive DL-SCH using the SI-RNTI from the start of the SI-window and continue
         until the end of the SI-window whose absolute length in time is given by
         si-WindowLength, or until the SI message was received;
      2>if the SI message was not received by the end of the SI-window, increment the
         counter SI window counter 82(B), repeat reception at the next SI-window
         occasion for the concerned SI message;
      2>if the counter SI window counter 82(B) is equal to [configured maximum value]
         (or timer SI message acquisition process timer 84(B) expires)
         3> Initiate the SI acquisition procedure as defined in sub-clause 5.2.2.3.
   1> else if SI message acquisition is triggered due to UE request:
      2> Set the counter SI window counter 82(D) to 0 (or Start timer SI message
      acquisition process timer 84(D));
      2> [receive DL-SCH using the SI-RNTI from the start of the SI-window and
         continue until the end of the SI-window whose absolute length in time is given by
         si-WindowLength, or until the SI message was received];
      2>[if the SI message was not received by the end of the SI-window, increment the
         counter SI window counter 82(D) , repeat reception at the next SI-window
         occasion for the concerned SI messagel;
      2>if the counter SI window counter 82(D) is equal to [configured maximum value]
         (or timer SI message acquisition process timer 84(D) expires)
         3> Initiate the SI acquisition procedure as defined in sub-clause 5.2.2.3.

Figure 23:
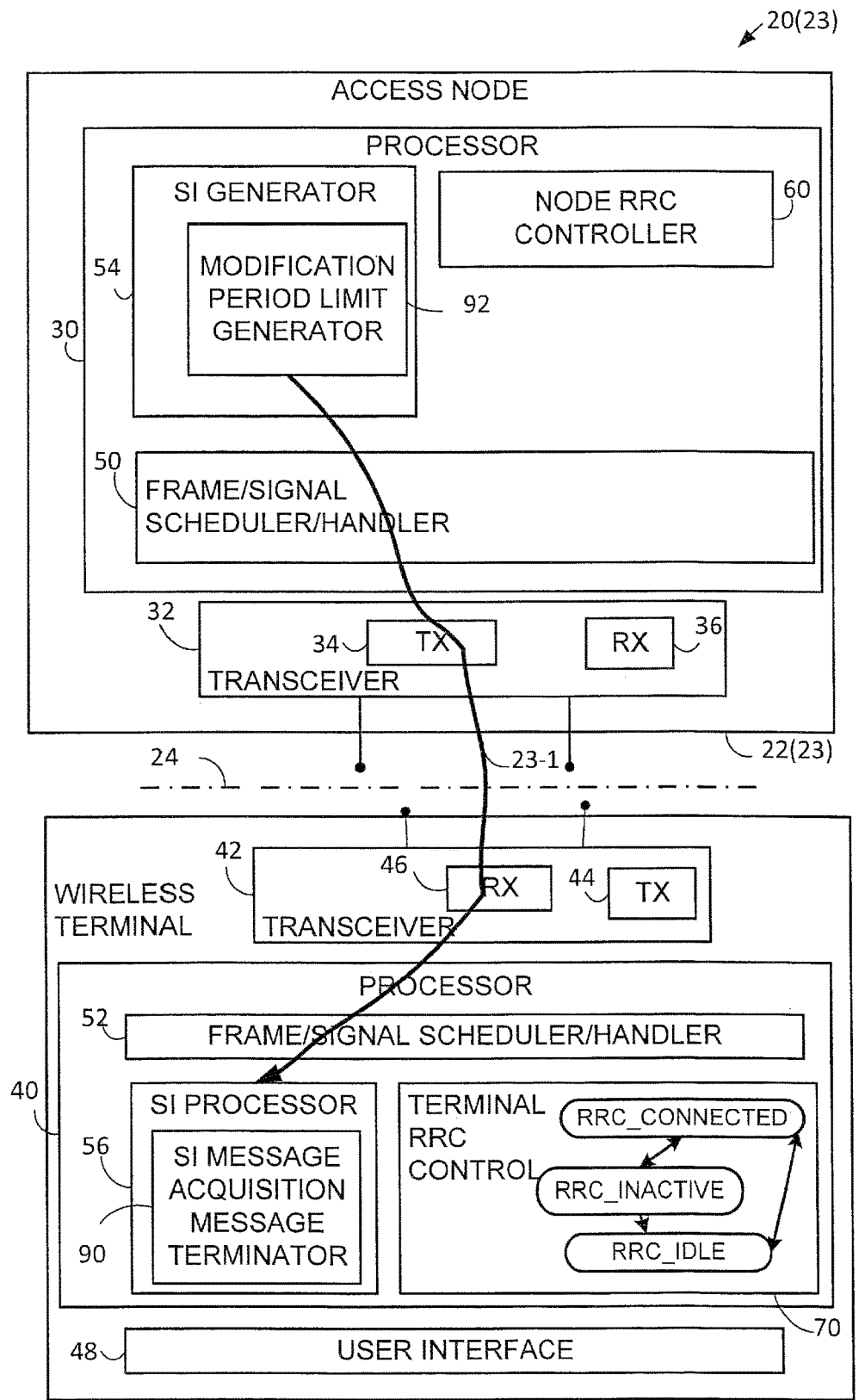
FIG. 23 is a schematic view showing an example communications system comprising a radio access node and a wireless terminal, wherein the wireless terminal terminates a SI message acquisition process based on a number of modification periods.

Limiting Duration of System Information Message Acquisition by Number of Modification Periods FIG. 23 shows an example communications system 20(23) comprising wireless terminal 26(23) configured to limit duration of system information message acquisition based on a number of modification periods. The example embodiment and mode of FIG. 23 may considered to be similar to previous embodiments and modes which employed a counter, but instead of counting a number of SI windows, the counter in the example embodiment and mode of FIG. 23 essentially counts a number of modification periods as a measure for determining when to terminate the SI message acquisition process.

The elements of access node 22(23) and wireless terminal 26(23) of FIG. 23 are essentially identical to the corresponding elements respective access node 22 and wireless terminal 26 of FIG. 2 that have same base reference numbers, except as otherwise indicated herein. In terms of likeness, for example, the radio access node 22(23) comprises node processor 30 and node transceiver circuitry 32, with the node processor 30 comprising, e.g., node frame/signal scheduler/handler 50, system information (SI) generator 54, and node RRC controller 60. Similarly, the wireless terminal 26(23) comprises terminal processor 40, terminal transceiver circuitry 42, with terminal processor 40 comprising terminal frame/signal scheduler/handler 52, system information (SI) processor 56, and terminal RRC controller 70.

FIG. 23 also shows that wireless terminal 26(23) comprises system information message acquisition terminator 90. The terminal processor 40, and particularly SI processor 56, may comprise or constitute the system information message acquisition terminator 90. The SI processor 56 performs an SI message acquisition process to acquire the system information transmitted from the network, e.g., from access node 22(23). The system information message acquisition terminator 90 is configured to terminate the SI message acquisition process after attempting SI message acquisition for a first number of modification periods. Thus, the system information message acquisition terminator 90 essentially serves as and/or comprises a counter for counting up to the first number of modification periods as criteria for determining when to end the SI message acquisition process.

A modification period is a preconfigured time duration where the content of the system information is unchanged. A modification period may be defined as a time period wherein the system information may be transmitted a number of times with the same content (except some predefined parameters), as defined by its own scheduling. A modification period can be any predefined time duration established by any predetermined convention. For example, the modification periods may be the same or akin to the concept of modification period as defined for LTE in 3GPP TS 36.304, 38.304, 36.331 and/or 38.331, all of which are incorporated herein by reference.

Figure 24:
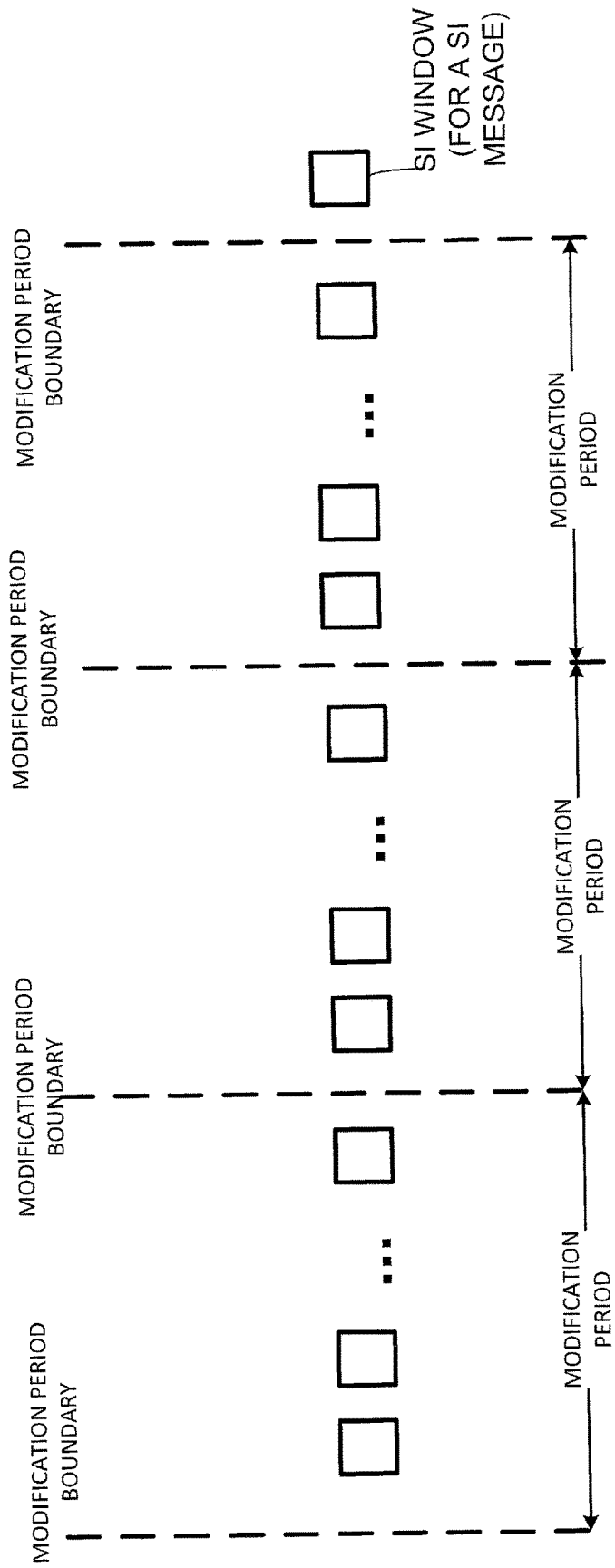
FIG. 24 is a diagrammatic view of a series of modification periods and showing generation and transmission of system information windows through plural modification periods.

FIG. 24 depicts an example configuration of modification periods. In each modification period, defined between two adjacent modification period boundaries, there may be one or more transmission opportunities (e.g., SI windows) allocated for a designated SI message. The access node 22(23) may choose to transmit, or not to transmit, the SI message on these opportunities.

The first number of modification periods may be obtained by any appropriate manner, and preferably is configured at the wireless terminal 26(23) by access node 22(23). For example, the node SI generator 54 may comprise modification period limit generator 92, which generates the first number of modification periods which is sent to and used by wireless terminal 26(23) for determining when to terminate the SI message acquisition process. For example, FIG. 23 shows by arrow 23-1 transmission of an indication of the first number of modification periods to wireless terminal 26(23). Alternatively, the first number of modification periods may be pre-configured at the wireless terminal 26(23), e.g., stored in memory of wireless terminal 26(23) via input other from the radio access network such as through user interface 48 upon programming of wireless terminal 26(23).

In one configuration, transmission of such an SI message, either initiated autonomously by the radio access node or triggered by an on-demand request from a wireless terminal, may be started at the first boundary of a modification period. Alternatively, in another configuration, transmission of such an SI message may start at any SI window of a modification period. Nonetheless, in either configuration the SI transmission may end (if the access node decides to end) at the last SI window of a modification period.

Figure 25:
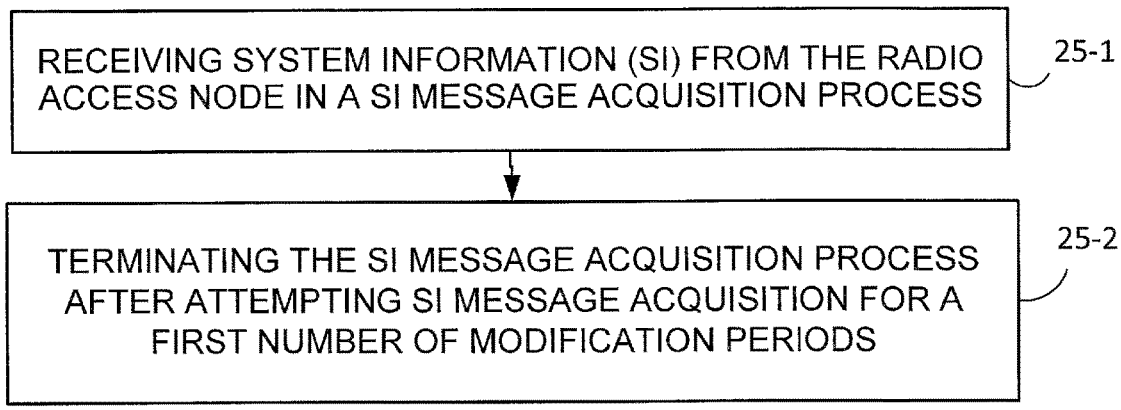
FIG. 25 is a flowchart showing basic, representative, example acts or steps performed by the wireless terminal of FIG. 23.

FIG. 25 is a flowchart showing basic, representative, example acts or steps performed by the wireless terminal of FIG. 23. Act 25-1 comprises the wireless terminal 26(3), e.g., via terminal receiver 46, receiving system information (SI) from the radio access node in a SI message acquisition process. Act 25-2 comprises terminating the SI message acquisition process after attempting SI message acquisition for a first number of modification periods. As explained herein, a modification period is a preconfigured time duration where the content of the SI is unchanged. The first number of modification periods may be assessed or counted from a prescribed event, such as a network event or action of the wireless terminal. Act 25-2 may be performed by system information message acquisition terminator 90, which may be realized by SI processor 56.

Figure 26:
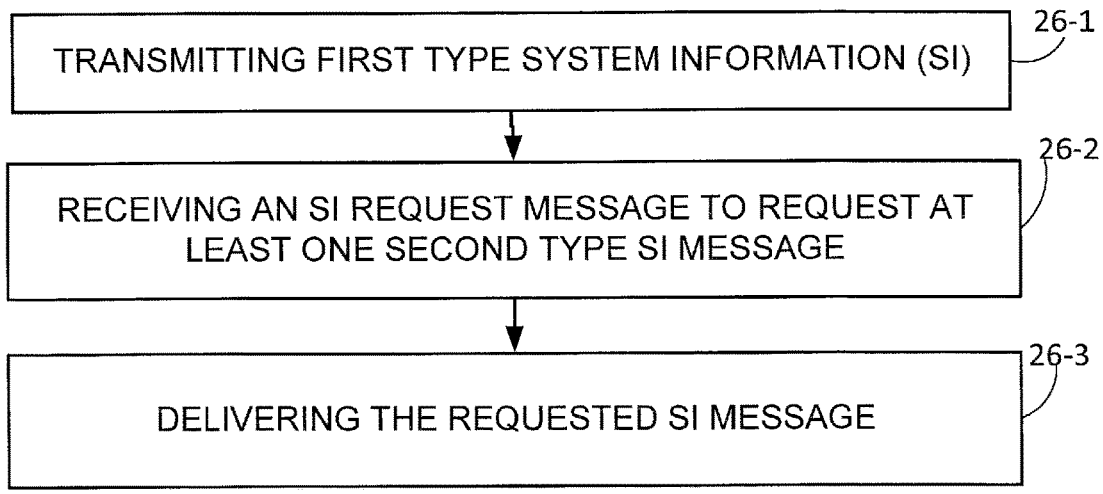
FIG. 26 is a flowchart showing basic, representative, example acts or steps performed by the access node of FIG. 23.

FIG. 26 is a flowchart showing basic, representative, example acts or steps performed by the access node of FIG. 23. Act 26-1 comprises configuring the wireless terminal with the first number of modification periods. Act 26-1 may be performed by modification period limit generator 92, and transmission of the first number of modification periods from access node 22(23) to wireless terminal 26(23) may be shown by arrow 23-1 in FIG. 23. Act 26-2 comprises transmitting system information (SI) to the wireless terminal.

Figure 27:
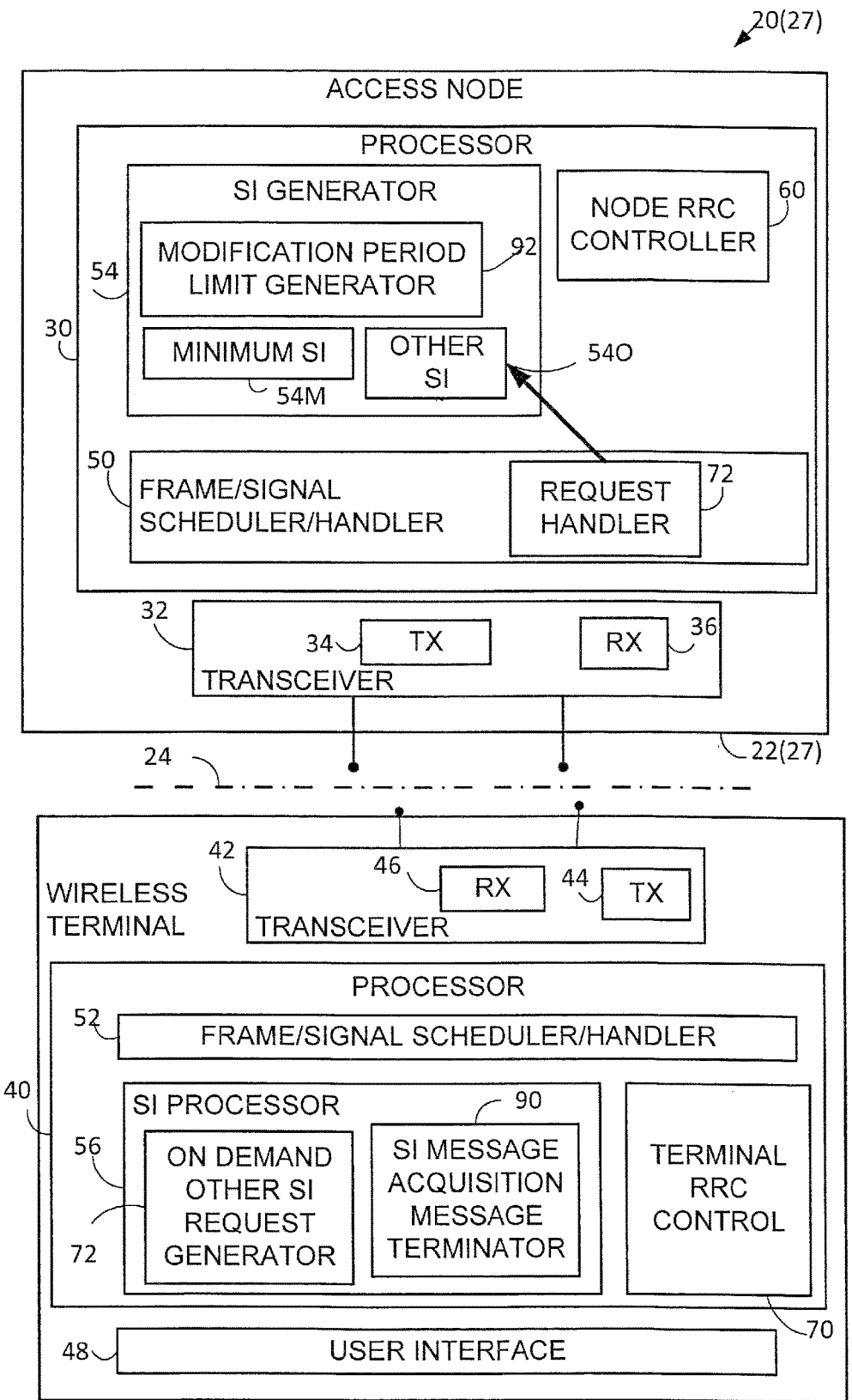
FIG. 27 is a schematic view showing an example communications system comprising a radio access node and a wireless terminal, wherein the wireless terminal uses both first type system information and second time system information and terminates a SI message acquisition process for the second type system information based on a number of modification periods.

The example embodiment and mode of FIG. 27 is a special case of the example embodiment and mode of FIG. 23 in which the system information takes the form of first type system information and second type system information, as previously discussed in conjunction with other example embodiments and modes. The elements of access node 22(27) and wireless terminal 26(27) of FIG. 27 are essentially identical to the corresponding elements respective access node 22 and wireless terminal 26 of FIG. 2 that have same reference numbers, except as otherwise indicated herein. In terms of likeness, for example, the radio access node 22(23) comprises node processor 30 and node transceiver circuitry 32, with the node processor 30 comprising, e.g., node frame/signal scheduler/handler 50, system information (SI) generator 54, and node RRC controller 60. Similarly, the wireless terminal 26(23) comprises terminal processor 40, terminal transceiver circuitry 42, with terminal processor 40 comprising terminal frame/signal scheduler/handler 52, system information (SI) processor 56, and terminal RRC controller 70. Further, like the example embodiment and mode of FIG. 23, the wireless terminal 26(27) of FIG. 27 comprises system information message acquisition terminator 90 and the access node 22(27) of FIG. 27 comprises the modification period limit generator 92. The system information message acquisition terminator 90 of wireless terminal 26(27) is likewise configured to terminate the SI message acquisition process after attempting SI message acquisition for a first number of modification periods.

The node processor 30 of radio access node 22 includes a system information (SI) generator 54 similar to that of the example embodiment and mode of FIG. 2 wherein at least some of the system information generated and provided by the system information (SI) generator 54 is Minimum System Information (Minimum SI), also known as first type system information, represented by Minimum SI handler 54M. Some of the system information may be Other system information (Other SI), also known as second type system information, represented by Other SI handler 54O in FIG. 2. The wireless terminal 26(27) of FIG. 27 may use the system information (SI) generated by radio access node 22(27), and some of the Minimum SI may inform the wireless terminal 26 of the availability of the Other IS.

In the example embodiment and mode of FIG. 27, the terminal receiver 46 is configured to receive first type system information (SI) from the radio access node. As understood herein, the first type SI comprises (1) availability of second type SI messages, and (2) an indication of a delivery mode for each of the second type SI messages. The second type SI message comprises at least one system information block (SIB). The delivery mode is either broadcast or on-demand basis. Further, in the example embodiment and mode of FIG. 27, like the embodiment and mode of FIG. 2, the terminal receiver 46 is configured to transmit an SI request message to request at least one second type SI message indicated as on-demand delivery in a case where the delivery mode of the second type SI message is on-demand. Such SI request message is understood with reference to arrow 2-2 of the embodiment and mode of FIG. 2 and discussion thereof. In the embodiment and mode of FIG. 27, the modification period is thus a preconfigured time duration where the content of the first type and second type system information is unchanged.

As was mentioned above, the number of modification periods that constitutes the first number of modification periods may be pre-configured in the wireless terminal as well as in the access node. Alternatively, the first number of modification periods may be configured by the access node via the minimum system information (e.g. SIB1). In the latter case, SI-SchedulingInfo in SIB1, mentioned in earlier example embodiments and modes, may be augmented to comprise a parameter, such as si-NumModBoundaries. The parameter si-NumModBoundaries, may express the first number of modification periods, and thereby to instruct the wireless terminal 26(27) regarding the duration of the SI message acquisition in units of modification period boundaries. This parameter may apply to any cases of the SI message acquisition (on-demand request or not). If the wireless terminal 26(27) is allowed to start the SI message acquisition in the middle of a modification period, in one configuration si-NumModBoundaries may include the modification period where the SI reception is started. In another configuration si-NumModBoundaries may include modification periods starting at the next modification period boundary. Listing 4A, shown below, illustrates use of a parameter, such as si-NumModBoundaries, to express the first number of modification periods.

LISTING 4A

```
-- ASN1START
-- TAG-OTHER-SI-INFO-START
SI-SchedulingInfo ::=           SEQUENCE {
    schedulingInfoList          SEQUENCE (SIZE (1..maxSI-Message)) OF SchedulingInfo,
    si-WindowLength             ENUMERATED {ms1, ms2, ms5, ms10, ms15, ms20,
                                    ms40},
    si-Request-Config           SI-Request-Config OPTIONAL, -- Cond MSG-1
    systemInformationAreaID         BIT STRING (SIZE (24))   OPTIONAL,
-- First entry is SIB2
    sib ValueTagList            SEQUENCE (SIZE (1..maxSIB-1)) OF SIBValueTag,
    systemInfoAreaScope         SystemInfoAreaScope OPTIONAL, -- Cond AREA-ID,
    si-NumModBoundary               INTEGER (0..7)        OPTIONAL
    ...
}
SchedulingInfo ::= SEQUENCE {
    si-BroadcastStatus              ENUMERATED {broadcast, onDemand},
    si-Periodicity              ENUMERATED {
                                    rf8, rf16, rf32, rf64, rf128, rf256, rf512},
    sib-MappingInfo             SIB-Mapping
}
SIB-Mapping ::= SEQUENCE (SIZE (0..maxSIB-1)) OF SIB-Type
SIB-Type ::=                    ENUMERATED {
                                    sibType2, sibType3, sibType4, sibType5,
                                    sibType6, sibType7, sibType8, sibType9,
                                    spare8, spare7, spare6, spare5,
                                    spare4, spare3, spare2, spare1,
                                    ...}
-- Value TAG per SIB.
SIBValueTag ::=             INTEGER (0..31)
```

Listing 4B is an alternative implementation of SI-SchedulingInfo that configures the number of modification period, wherein two parameters, si-NumModBoundariesOnDemand and si-NumModBoundariesPeriodic, may configure the duration of the SI message acquisition. The parameter NumModBoundariesOnDemand may be used in the scenario disclosed in the second embodiment, whereas the parameter NumModBoundariesPeriodic may be used in the scenario disclosed in a previous embodiment.

LISTING 4B

```
-- ASN1START
-- TAG-OTHER-SI-INFO-START
SI-SchedulingInfo ::=               SEQUENCE {
   schedulingInfoList   SEQUENCE (SIZE (1..maxSI-Message)) OF SchedulingInfo,
   si-WindowLength                  ENUMERATED {ms1, ms2, ms5, ms10, ms15, ms20,
      ms40},
   si-Request-Config                SI-Request-Config OPTIONAL, -- Cond MSG-1
   systemInformationAreaID          BIT STRING (SIZE (24))      OPTIONAL,
-- First entry is SIB2
   sib ValueTagList                 SEQUENCE (SIZE (1..maxSIB-1)) OF SIBValueTag,
   systemInfoAreaScope              SystemInfoAreaScope OPTIONAL, -- Cond AREA-ID,
   si-NumModBoundary Periodic       INTEGER (0..7)          OPTIONAL,
   si-NumModBoundaryOnDemand           INTEGER (0..7)          OPTIONAL
   ...
}
SchedulingInfo ::=         SEQUENCE {
si-BroadcastStatus                      ENUMERATED {broadcast, onDemand},
si-Periodicity                          ENUMERATED {
                                           rf8, rf16, rf32, rf64, rf128, rf256, rf512},
sib-MappingInfo                                                 SIB-Mapping
}
SIB-Mapping ::= SEQUENCE (SIZE (0..maxSIB-1)) OF SIB-Type
SIB-Type ::=                            ENUMERATED {
                                           sibType2, sibType3, sibType4, sibType5,
                                           sibType6, sibType7, sibType8, sibType9,
                                                    spare8, spare7, spare6, spare5,
                                                    spare4, spare3, spare2, spare1,
                                                       ...}
-- Value TAG per SIB.
SIBValueTag ::=            INTEGER (0..31)
```

The procedure of the example embodiments and modes of FIG. 23 and FIG. 27 may be akin to Listing 3, except that the counters (N1, N2) are replaced by si-NumModBoundaries. Alternatively, the counters may be replaced by si-NumModBoundariesPeriodic and si-NumModBoundariesOnDemand respectively.

Figure 28:
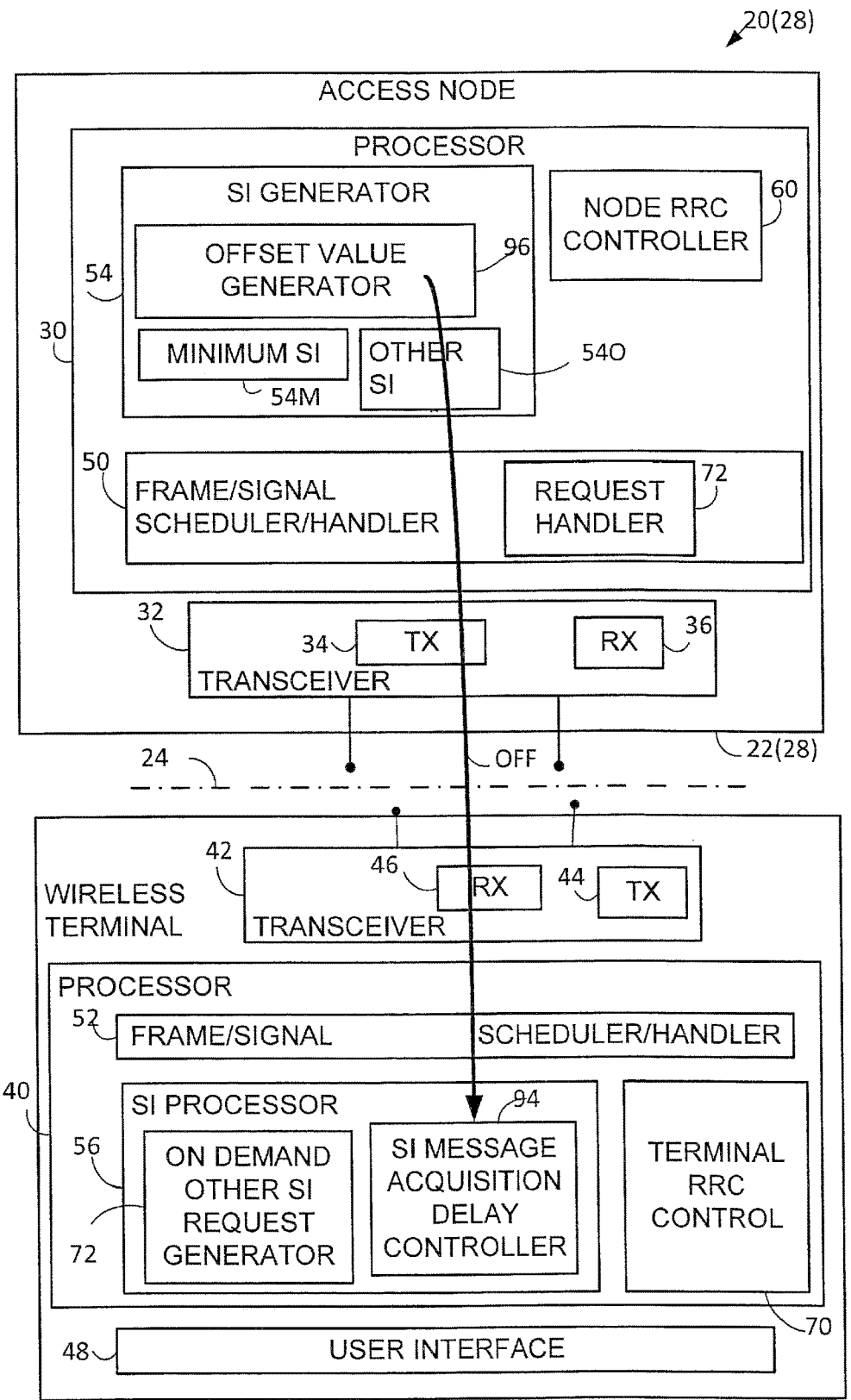
FIG. 28 is a schematic view showing an example communications system comprising a radio access node and a wireless terminal, wherein the wireless terminal is required to wait an offset value of time before starting an SI message acquisition process.

Requiring Wireless Terminal to Wait an Offset Time Before Beginning SI Message Acquisition FIG. 28 shows an example communications system 20(28) wherein wireless terminal 26(28) may be configured, e.g., via the minimum system information (e.g. SIB1), with at least one offset value. The offset value indicates a duration, e.g., of time, that wireless terminal 26(28) is required to wait before starting a SI message acquisition process.

The elements of access node 22(28) and wireless terminal 26(28) of FIG. 28 may be essentially identical to the corresponding elements respective access node 22 and wireless terminal 26 of FIG. 2 that have same base reference numbers, except as otherwise indicated herein. In terms of likeness, for example, the radio access node 22(28) comprises node processor 30 and node transceiver circuitry 32, with the node processor 30 comprising, e.g., node frame/signal scheduler/handler 50, system information (SI) generator 54, and node RRC controller 60. Similarly, the wireless terminal 26(28) comprises terminal processor 40, terminal transceiver circuitry 42, with terminal processor 40 comprising terminal frame/signal scheduler/handler 52, system information (SI) processor 56, and terminal RRC controller 70.

In the example embodiment and mode of FIG. 28, the terminal receiver 46 is configured to receive first type system information (SI) from the radio access node. As understood herein, the first type SI comprises (1) availability of second type SI messages, and (2) an indication of a delivery mode for each of the second type SI messages. The second type SI message comprises at least one system information block (SIB). The delivery mode is either broadcast or on-demand basis. Further, in the example embodiment and mode of FIG. 27, like the embodiment and mode of FIG. 2, the terminal receiver 46 is configured to transmit an SI request message to request at least one second type SI message indicated as on-demand delivery in a case where the delivery mode of the second type SI message is on-demand.

FIG. 28 also shows that wireless terminal 26(28) comprises system information acquisition delay controller 94. The terminal processor 40, and particularly SI processor 56, may comprise or constitute the system information acquisition delay controller 94. In the FIG. 28 example embodiment and mode, the system information acquisition delay controller 94 is configured to require the SI processor 56 to wait, after receiving from the radio access node an acknowledgement for the SI request message, for a time duration specified by an offset value, before performing an SI message acquisition process.

FIG. 28 further shows that the access node 22(28) comprises offset value generator 96. The node SI generator 54 of access node 22(28) generates first type system information which is used to configure the wireless terminal with an offset value OFF. The offset value OFF is used to instruct the wireless terminal 26(28) to wait, for a time duration specified by the offset value OFF, after the wireless terminal receives from access node 22(28) an acknowledgement for the SI request message, before the wireless terminal performs an SI message acquisition process. Receipt from access node 22(28) of an acknowledgement for the SI request message is understood to be an acknowledgment of the request message shown as arrow 2-2 of FIG. 2. FIG. 28 shows transmission of the offset value OFF as arrow 28-1.

Figure 29:
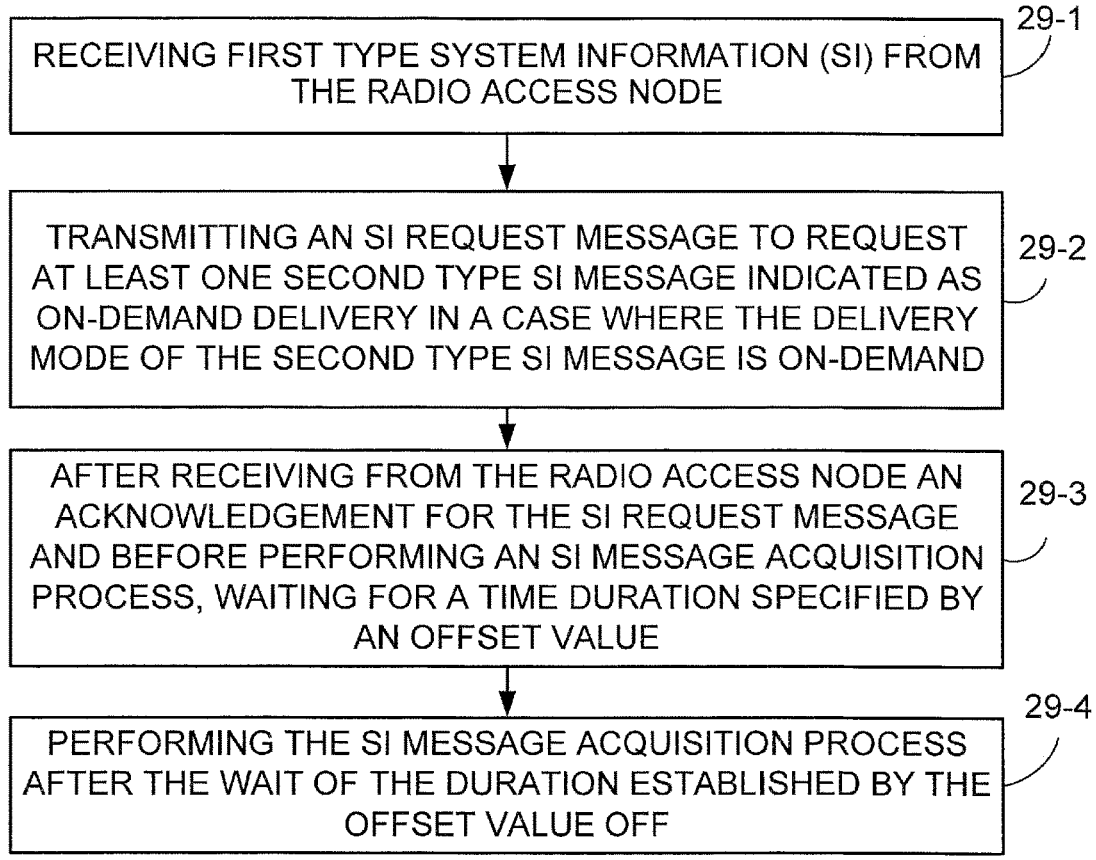
FIG. 29 is a flowchart showing basic, representative, example acts or steps performed by the wireless terminal of FIG. 28.

FIG. 29 is a flowchart showing basic, representative, example acts or steps performed by the wireless terminal wireless terminal 26(28) of FIG. 28. Act 29-1 comprises receiving first type system information (SI) from the radio access node. As explained previously, the first type system information may comprise availability of second type SI messages. Act 29-2 comprises transmitting, to access node 22(28), an SI request message to request at least one second type SI message indicated as on-demand delivery in a case where the delivery mode of the second type SI message is on-demand. Act 29-2 may be performed by terminal frame/signal handler 72 in conjunction with terminal transmitter 44, and is understood with reference to message 2-2 of the example embodiment and mode of FIG. 2. Act 29-3 comprises, after receiving from the radio access node an acknowledgement for the SI request message and before performing an SI message acquisition process, waiting for a time duration specified by an offset value. The wait of act 29-3 may be assessed and controlled by system information acquisition delay controller 94. Act 29-4 comprises performing the SI message acquisition process after the wait of the duration established by the offset value OFF.

Figure 30:
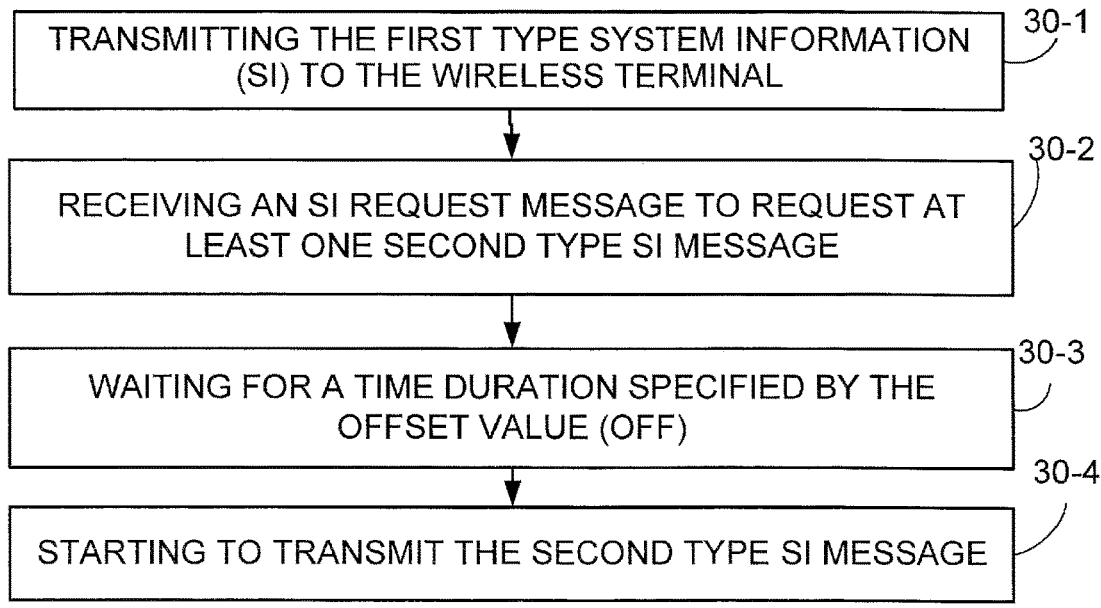
FIG. 30 is a flowchart showing basic, representative, example acts or steps performed by the access node of FIG. 28.

FIG. 30 is a flowchart showing basic, representative, example acts or steps performed by the access node access node 22(28) of FIG. 28. Act 30-1 comprises the access node 22(28) transmitting the first type system information (SI) to the wireless terminal. Act 30-1 may be performed by node SI generator 54 in conjunction with core node transmitter 34. Act 30-2 comprises the access node 22(28) receiving an SI request message to request at least one second type SI message. The SI request message may be understood with reference to message 2-2 of FIG. 2, for example, and may be received via node receiver 36 and handled by request handler 72. Act 30-3 comprises the access node 22(28) waiting for a time duration specified by the offset value (OFF). Act 3-4 comprises the access node 22(28) starting to transmit the second type SI message. The offset value OFF may be generated by offset value generator 96 and transmitted from access node 22(28) to wireless terminal 26(28) by core node transmitter 34. As explained previously, the offset value OFF serves to instruct the wireless terminal to wait for a time duration specified by an offset value after the wireless terminal receives, from the radio access node, an acknowledgement for the SI request message, before the wireless terminal performs an SI message acquisition process.

Figure 31:
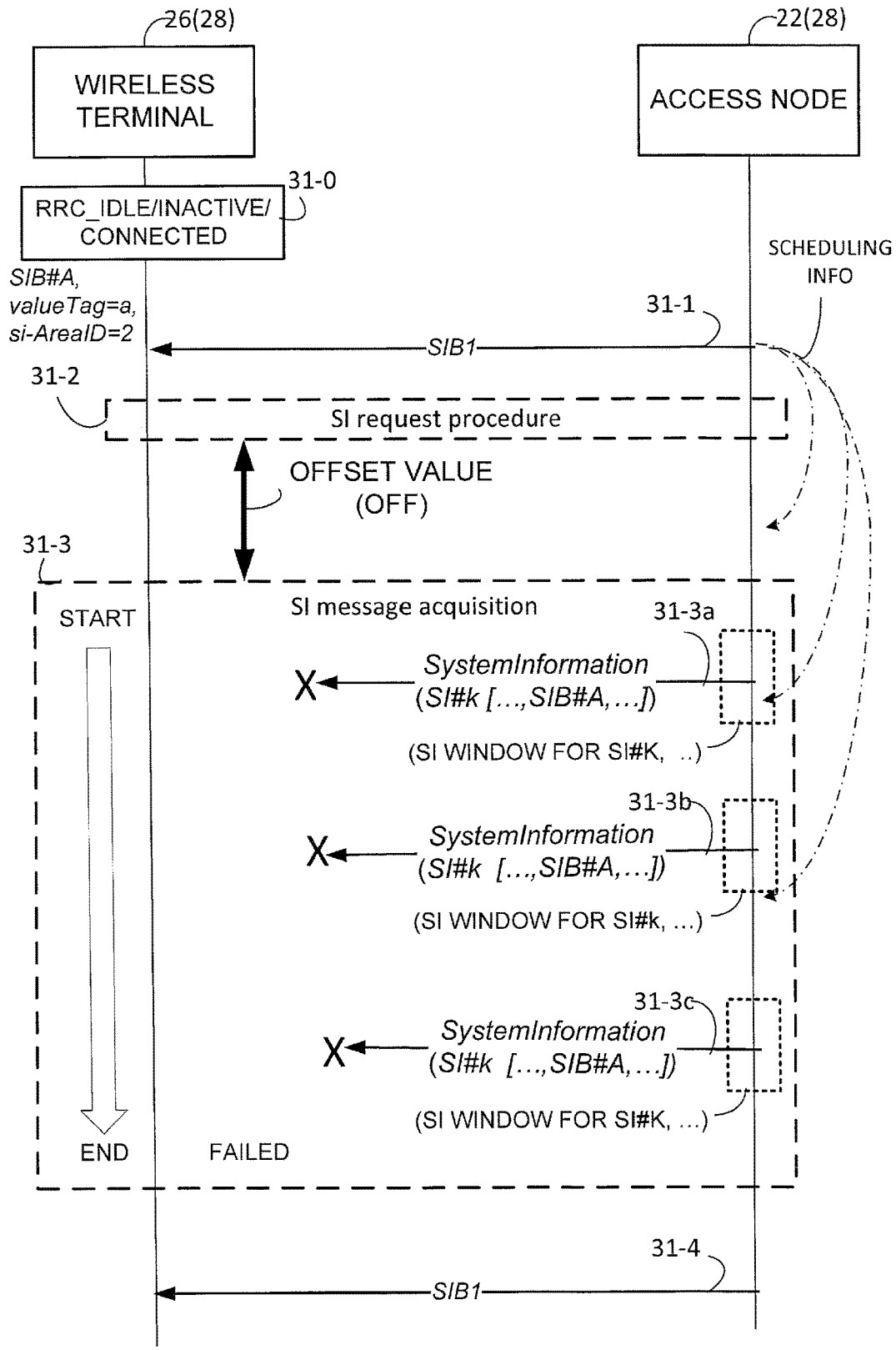
FIG. 31 is a diagrammatic view illustrating an exemplary message flow including for the communications system of FIG. 28.

FIG. 31 illustrates the scenario of the example embodiment and mode of FIG. 28, where wireless terminal 26(28), after completing the SI request procedure 31-2, waits for the specified duration (offset value OFF) before starting the SI message acquisition procedure 31-3.

In some configurations, the offset value (offset value OFF) may be used in a case where the access node 22(28) desires to defer the transmission of an SI message from the reception of an SI request.

In one configuration the offset value may be provided in units of SI windows. In the SI window unit configuration, the wireless terminal may skip the specified number of SI windows.

In another configuration, the offset value may be provided in units of modification periods, which have been discussed above. In this modification period offset value embodiment, the wireless terminal may postpone the SI message acquisition until the specified number of modification periods is consumed.

Furthermore, in another configuration, the offset value may be a time duration specifying the time (e.g. in units of milliseconds). In this time case, after the successful completion of the SI request procedure, the wireless terminal may wait for the specified time and may start the SI message acquisition from the following SI window.

The offset value may be pre-configured in the wireless terminal 26(28) as well as in the access node 22(28). Alternatively, as explained above, the offset value OFF may be configured by the access node 22(28), e.g., via the minimum system information (e.g. SIB1).

In the latter case, e.g., configuration of offset value OFF by the access node 22(28), Listing 5A, Listing 5B and Listing 5C below show example formats of SI-SchedulingInfo, with the offset configured by the number of SI windows, the number of modification period, and the time duration, respectively. Listing 5D shows the case where the access node is able to choose one of these configurations, e.g., the configuration of the offset value OFF being expressed in terms of number of SI windows, number of modification periods, or time duration.

The counter values or the timers to limit the duration of a SI message acquisition, disclosed in a previous embodiment, may be started upon or after the end of the waiting duration specified by the offset value.

LISTING 5A:

```
-- ASN1START
-- TAG-OTHER-SI-INFO-START
SI-SchedulingInfo ::=         SEQUENCE {
    schedulingInfoList        SEQUENCE (SIZE (1..maxSI-Message)) OF SchedulingInfo,
    si-WindowLength               ENUMERATED {ms1, ms2, ms5, ms10, ms15, ms20,
                                      ms40},
    si-Request-Config         SI-Request-Config OPTIONAL, -- Cond MSG-1
    systemInformationAreaID       BIT STRING (SIZE (24))      OPTIONAL,
-- First entry is SIB2
    sibValueTagList           SEQUENCE (SIZE (1..maxSIB-1)) OF SIBValueTag,
    systemInfoAreaScope           SystemInfoAreaScope OPTIONAL, -- Cond AREA-ID,
    si-AcqOffset              INTEGER (0..15)         OPTIONAL -- Number of SI windows
    ...
}
```

LISTING 5B:

```
-- ASN1START
-- TAG-OTHER-SI-INFO-START
SI-SchedulingInfo ::=         SEQUENCE {
    schedulingInfoList        SEQUENCE (SIZE (1..maxSI-Message)) OF SchedulingInfo,
    si-WindowLength               ENUMERATED {ms1, ms2, ms5, ms10, ms15, ms20,
                                      ms40},
```

-continued

LISTING 5B:

```
si-Request-Config           SI-Request-Config OPTIONAL, -- Cond MSG-1
systemInformationAreaID        BIT STRING (SIZE (24))    OPTIONAL,
-- First entry is SIB2
sibValueTagList             SEQUENCE (SIZE (1..maxSIB-1)) OF SIBValueTag,
systemInfoAreaScope            System InfoAreaScope OPTIONAL, -- Cond AREA-ID,
si-AcqOffset                   INTEGER (0..7)            OPTIONAL -- Number of modification
periods
    ...
}
```

LISTING 5C:

```
-- ASN1START
-- TAG-OTHER-SI-INFO-START
SI-SchedulingInfo ::=          SEQUENCE {
    schedulingInfoList         SEQUENCE (SIZE (1..maxSI-Message)) OF SchedulingInfo,
    si-WindowLength                ENUMERATED {ms1, ms2, ms5, ms10, ms15, ms20,
                                   ms40},
    si-Request-Config          SI-Request-Config OPTIONAL, -- Cond MSG-1
    systemInformationAreaID        BIT STRING (SIZE (24)) OPTIONAL,
-- First entry is SIB2
    sibValueTagList            SEQUENCE (SIZE (1..maxSIB-1)) OF SIBValueTag,
    systemInfoAreaScope            SystemInfoAreaScope OPTIONAL, -- Cond AREA-ID,
    si-AcqOffset                   ENUMERATED {ms1, ms2, ms5, ms10, ms15, ms20,
                                   ms40}   OPTIONAL -- time to wait for SI message acquisition
    ...
}
```

LISTING 5D:

```
-- ASN1START
-- TAG-OTHER-SI-INFO-START
SI-SchedulingInfo ::=          SEQUENCE {
    schedulingInfoList         SEQUENCE (SIZE (1..maxSI-Message)) OF Schedulinginfo,
    si-WindowLength                ENUMERATED {ms1, ms2, ms5, ms10, ms15, ms20,
                                   ms40},
    si-Request-Config          SI-Request-Config OPTIONAL, -- Cond MSG-1
    systemInformationAreaID        BIT STRING (SIZE (24))      OPTIONAL,
-- First entry is SIB2
    sibValueTagList            SEQUENCE (SIZE (1..maxSIB-1)) OF SIBValueTag,
    systemInfoAreaScope            SystemInfoAreaScope OPTIONAL, -- Cond AREA-ID,
    si-AcqOffset               CHOICE {
        offset-SiWindow            INTEGER (0..15), -- Number of modification periods
        offset-ModPeriod           INTEGER (0..7), -- Number of modification periods
        offset-Duration            ENUMERATED {ms1, ms2, ms5, ms10, ms15, ms20,
                                   ms40} - time to wait for SI message acquisition
    } OPTIONAL
    ...
}
```

Figure 32:
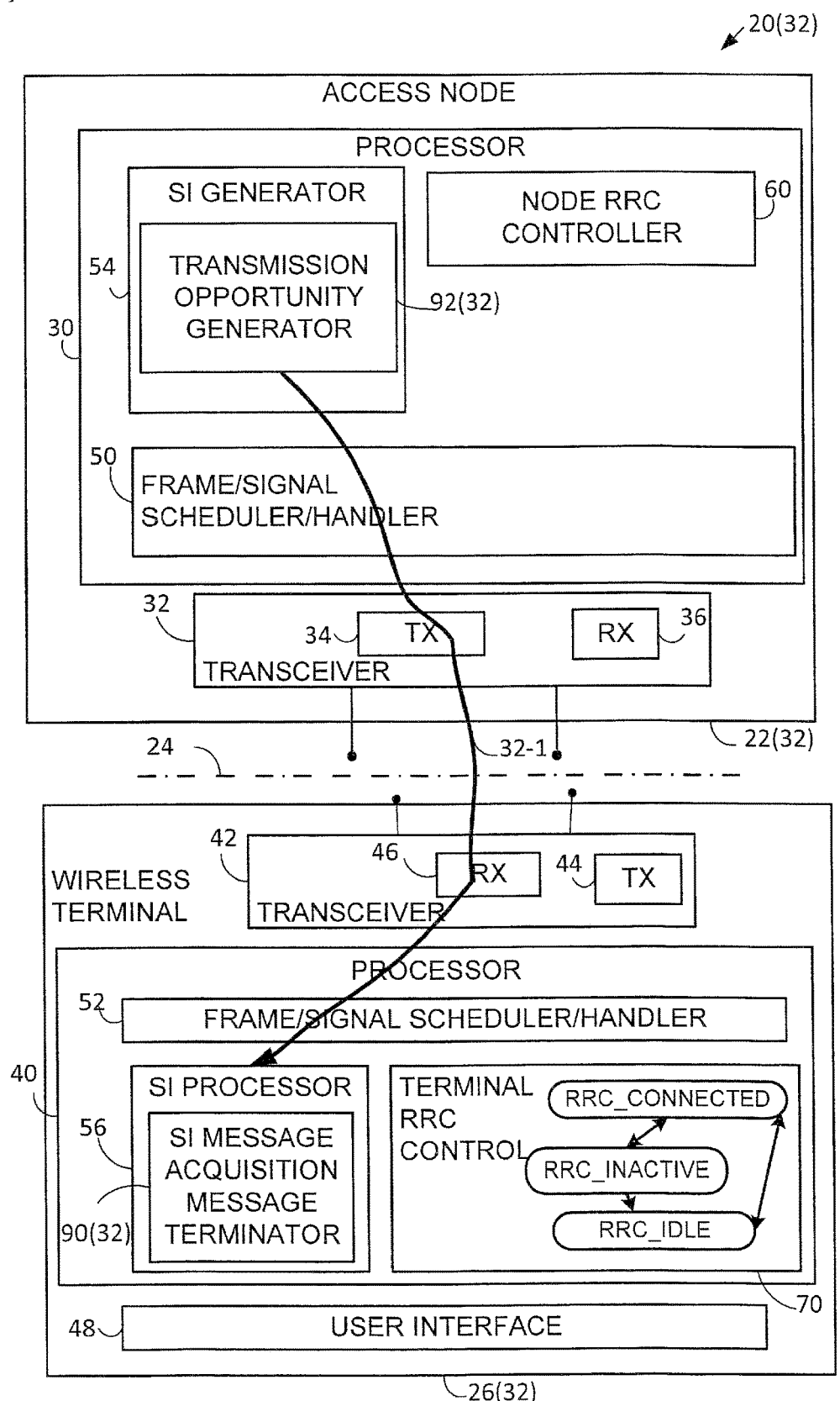
FIG. 32 is a schematic view showing an example communications system comprising a radio access node and a wireless terminal, wherein the wireless terminal terminates a SI message acquisition process based on a number of transmission opportunities.

Limiting Duration of System Information Message Acquisition by Number of Transmission Opportunities FIG. 32 shows an example communications system 20(32) comprising wireless terminal 26(32) configured to limit duration of system information message acquisition based on a number of transmission opportunities. The number of transmission opportunities may mean the number of transmission opportunities that the access node is scheduling for transmission of a certain system information (SI) message. The number of transmission opportunities may be expressed in terms of any appropriate unit or event(s), such as system information windows or modification periods, for example, and may express the transmission opportunities with reference to timing of a certain network event or action of the wireless terminal.

The elements of access node 22(32) and wireless terminal 26(32) of FIG. 32 are essentially identical to the corresponding elements respective access node 22 and wireless terminal 26 of FIG. 2 that have same base reference numbers, except as otherwise indicated herein. In terms of likeness, for example, the radio access node 22(32) comprises node processor 30 and node transceiver circuitry 32, with the node processor 30 comprising, e.g., node frame/signal scheduler/handler 50, system information (SI) generator 54, and node RRC controller 60. Similarly, the wireless terminal 26(32)

comprises terminal processor 40, terminal transceiver circuitry 42, with terminal processor 40 comprising terminal frame/signal scheduler/handler 52, system information (SI) processor 56, and terminal RRC controller 70.

FIG. 32 also shows that wireless terminal 26(32) comprises system information message acquisition terminator 90(32). The terminal processor 40, and particularly SI processor 56, may comprise or constitute the system information message acquisition terminator 90(32). The SI processor 56 performs an SI message acquisition process to acquire the system information transmitted from the network, e.g., from access node 22(32). The system information message acquisition terminator 90(32) is configured to terminate the SI message acquisition process after attempting SI message acquisition for a prescribed number of transmission opportunities. The prescribed number of transmission opportunities may be in time reference, e.g., occur after, a prescribed event such as a network event or an action by the wireless terminal 26(32). Thus, the system information message acquisition terminator 90(32) essentially serves as and/or comprises a counter for counting up to a prescribed number of transmission opportunities as criteria for determining when to end the SI message acquisition process.

The number of transmission opportunities may be obtained by any appropriate manner, and preferably is configured at the wireless terminal 26(32) by access node 22(32). For example, the node SI generator 54 may comprise transmission opportunity generator 92(32), which generates a number of transmission opportunities which is sent to and used by wireless terminal 26(32) for determining when to terminate the SI message acquisition process. For example, FIG. 32 shows by arrow 32-1 transmission of an indication of the transmission opportunities number of transmission opportunities to wireless terminal 26(32). Alternatively, the number of transmission opportunities may be pre-configured at the wireless terminal 26(32), e.g., stored in memory of wireless terminal 26(32) via input other from the radio access network such as through user interface 48 upon programming of wireless terminal 26(32).

Figure 33:
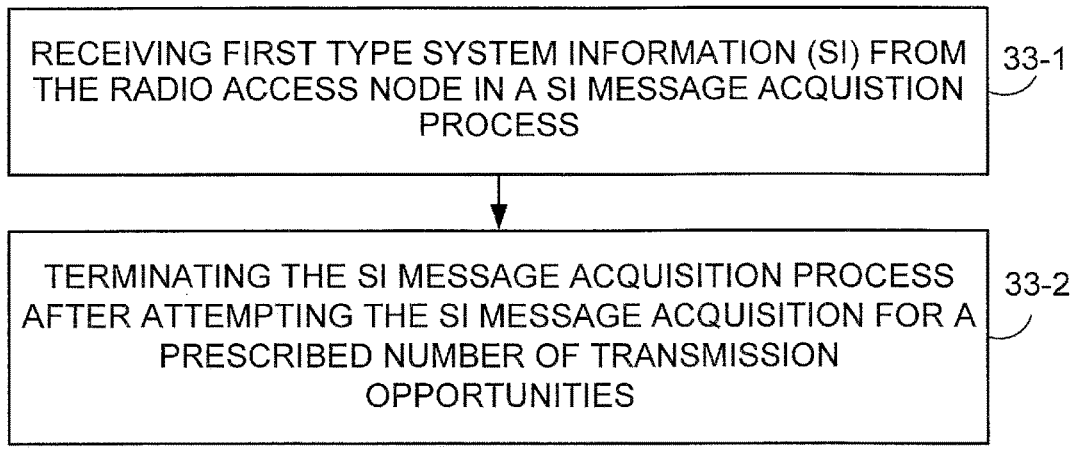
FIG. 33 is a flowchart showing basic, representative, example acts or steps performed by the wireless terminal of FIG. 32.

FIG. 33 is a flowchart showing basic, representative, example acts or steps performed by the wireless terminal of FIG. 32. Act 33-1 comprises the wireless terminal 26(32) e.g., via terminal receiver 46, receiving first type system information (SI) from the radio access node in a SI message acquisition process. Act 33-2 comprises terminating the SI message acquisition process after attempting the SI message acquisition for a prescribed number of transmission opportunities. Act 33-2 may be performed by system information message acquisition terminator 90(32), which may be realized by SI processor 56.

Figure 34:
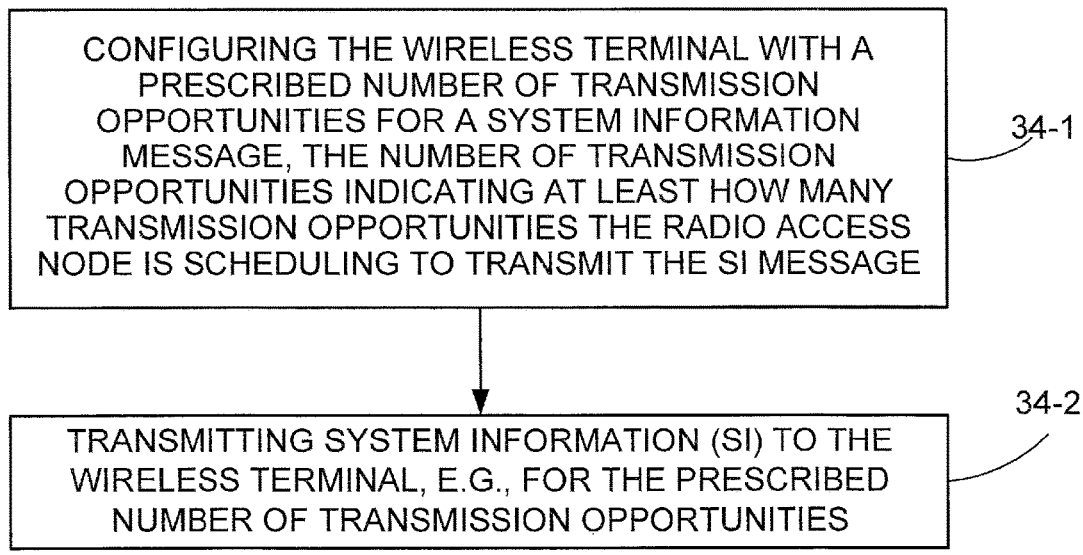
FIG. 34 is a flowchart showing basic, representative, example acts or steps performed by the access node of FIG. 32.

FIG. 34 is a flowchart showing basic, representative, example acts or steps performed by the access node of FIG. 32. Act 34-1 comprises configuring the wireless terminal with a prescribed number of transmission opportunities for a system information message, the number of transmission opportunities indicating at least how many transmission opportunities the radio access node is scheduling to transmit the SI message. Act 34-1 may be performed by transmission opportunity generator 92(32), and transmission of the number of transmission opportunities from access node 22(32) to wireless terminal 26(32) may be shown by arrow 32-1 in FIG. 32. Act 34-2 comprises transmitting system information (SI) to the wireless terminal, e.g., for the prescribed number of transmission opportunities.

Figure 35:
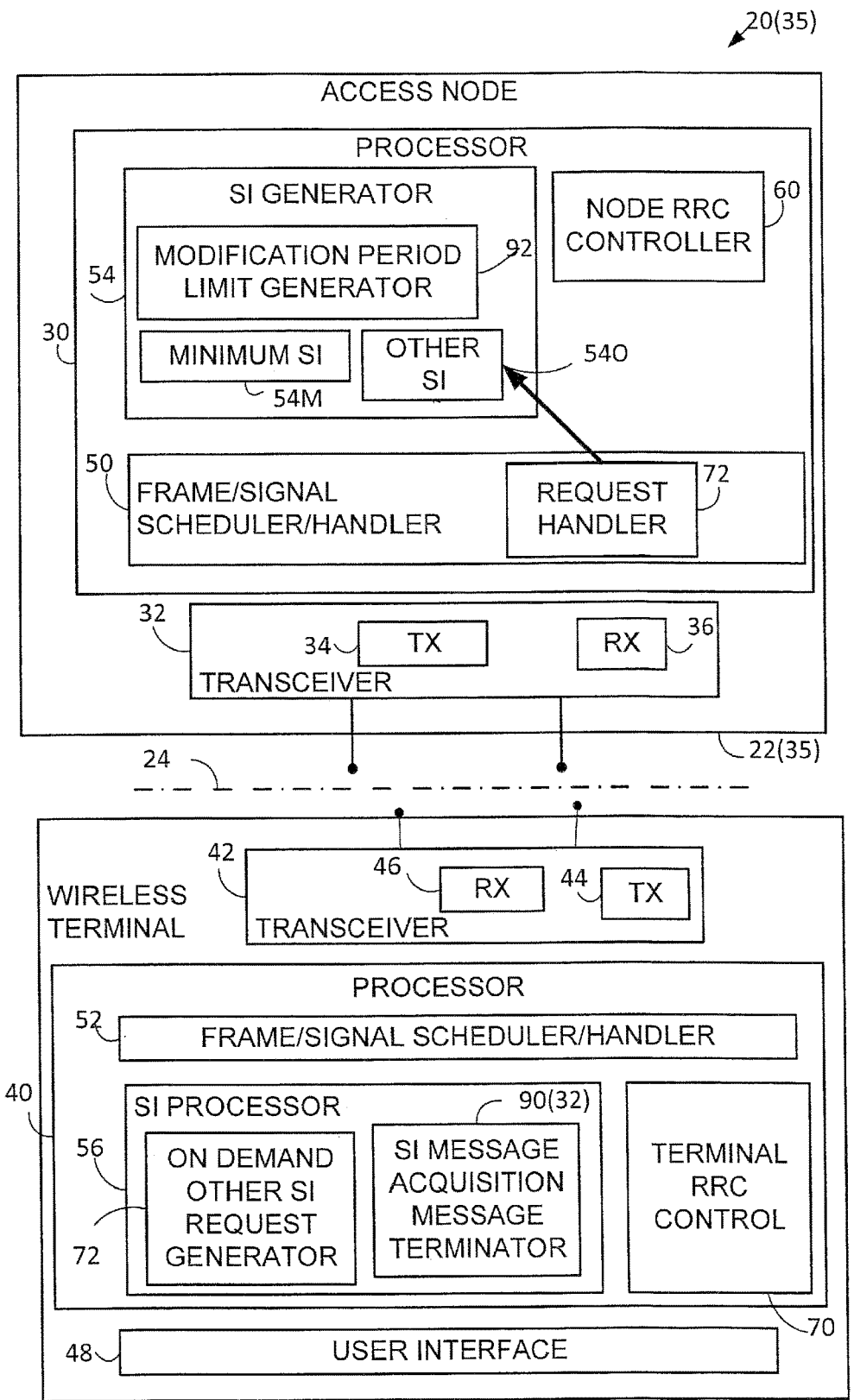
FIG. 35 is a schematic view showing an example communications system which is a special case of the system of FIG. 32.

The example embodiment and mode of FIG. 35 is a special case of the example embodiment and mode of FIG. 32 in which the system information takes the form of first type system information and second type system information, as previously discussed in conjunction with other example embodiments and modes. The elements of access node 22(35) and wireless terminal 26(35) of FIG. 35 are essentially identical to the corresponding elements respective access node 22 and wireless terminal 26 of FIG. 2 that have same reference numbers, except as otherwise indicated herein. In terms of likeness, for example, the radio access node 22(35) comprises node processor 30 and node transceiver circuitry 32, with the node processor 30 comprising, e.g., node frame/signal scheduler/handler 50, system information (SI) generator 54, and node RRC controller 60. Similarly, the wireless terminal 26(35) comprises terminal processor 40, terminal transceiver circuitry 42, with terminal processor 40 comprising terminal frame/signal scheduler/handler 52, system information (SI) processor 56, and terminal RRC controller 70. Further, like the example embodiment and mode of FIG. 32, the wireless terminal 26(35) of FIG. 35 comprises system information message acquisition terminator 90(32) and the access node 22(35) of FIG. 35 comprises the transmission opportunity generator 92(32). The system information message acquisition terminator 90 of wireless terminal 26(35) is likewise configured to terminate the SI message acquisition process after attempting SI message acquisition for a prescribed number of transmission opportunities.

The node processor 30 of radio access node 22(35) includes a system information (SI) generator 54 similar to that of the example embodiment and mode of FIG. 2 wherein at least some of the system information generated and provided by the system information (SI) generator 54 is Minimum System Information (Minimum SI), also known as first type system information, represented by Minimum SI handler 54M. Some of the system information may be Other system information (Other SI), also known as second type system information, represented by Other SI handler 54O in FIG. 2. The wireless terminal 26(35) of FIG. 35 may use the system information (SI) generated by radio access node 22(35), and some of the Minimum SI may inform the wireless terminal 26 of the availability of the Other IS.

In the example embodiment and mode of FIG. 35, the terminal receiver 46 is configured to receive first type system information (SI) from the radio access node. As understood herein, for the example embodiment and mode of FIG. 35 the first type SI comprises (1) availability of SI messages, (2) an indication of a delivery mode for each of the SI messages, and (3) the prescribed number of transmission opportunities for the SI messages. Each of the SI messages comprises at least one second type system information block (SIB). The delivery mode is either broadcast or on-demand basis. Further, in the example embodiment and mode of FIG. 27, like the embodiment and mode of FIG. 2, the terminal receiver 46 is configured to transmit an SI request message to request at least one SI message indicated as on-demand delivery in a case where the delivery mode of the SI message is on-demand. Such SI request message is understood with reference to arrow 2-2 of the embodiment and mode of FIG. 2 and discussion thereof. Thus, in the embodiment and mode of FIG. 35, the prescribed number of transmission opportunities for at least one SI message indicating at least how many transmission opportunities the radio access node is scheduling to transmit the SI message from the time of the transmission of the first type SI.

Thus, in the example embodiment and mode of FIG. 35, in access node 22(35) the transmitter circuitry 34 is configured to transmit first type system information (SI) for the FIG. 35 embodiment and mode to the wireless terminal. The node receiver circuitry 36 configured to receive an SI request message to request at least one SI message. The node processor circuitry 30 and transmission opportunity generator 92(32) configures the wireless terminal, e.g., via the first type SI, with the prescribed number of transmission opportunities for at least one SI message. As explained previously, in the FIG. 35 embodiment and mode the prescribed number of transmission opportunities indicates at least how many transmission opportunities the radio access node is scheduling to transmit the second type SI message from the time of the transmission of the first type system information In the FIG. 35 example embodiment and mode, the minimum system information may indicate, for each SI message, the number of transmission opportunities that the access node is scheduling for transmission. For an SI message that is currently broadcasted, the number of transmission opportunities may indicate how many of the prescribed number of transmission opportunities are still remaining at the time of transmission for the minimum system information. Meanwhile, for an SI message that is NOT currently broadcasted (to be requested on-demand), the number of transmission opportunities may indicate at least how many transmission opportunities that the access node will use for the SI message once it is requested. In one example implementation of the FIG. 35 example embodiment and mode, one transmission opportunity may be an SI window. In another example implementation of the FIG. 35 example embodiment and mode, one transmission opportunity may be a modification period.

Figure 36A:
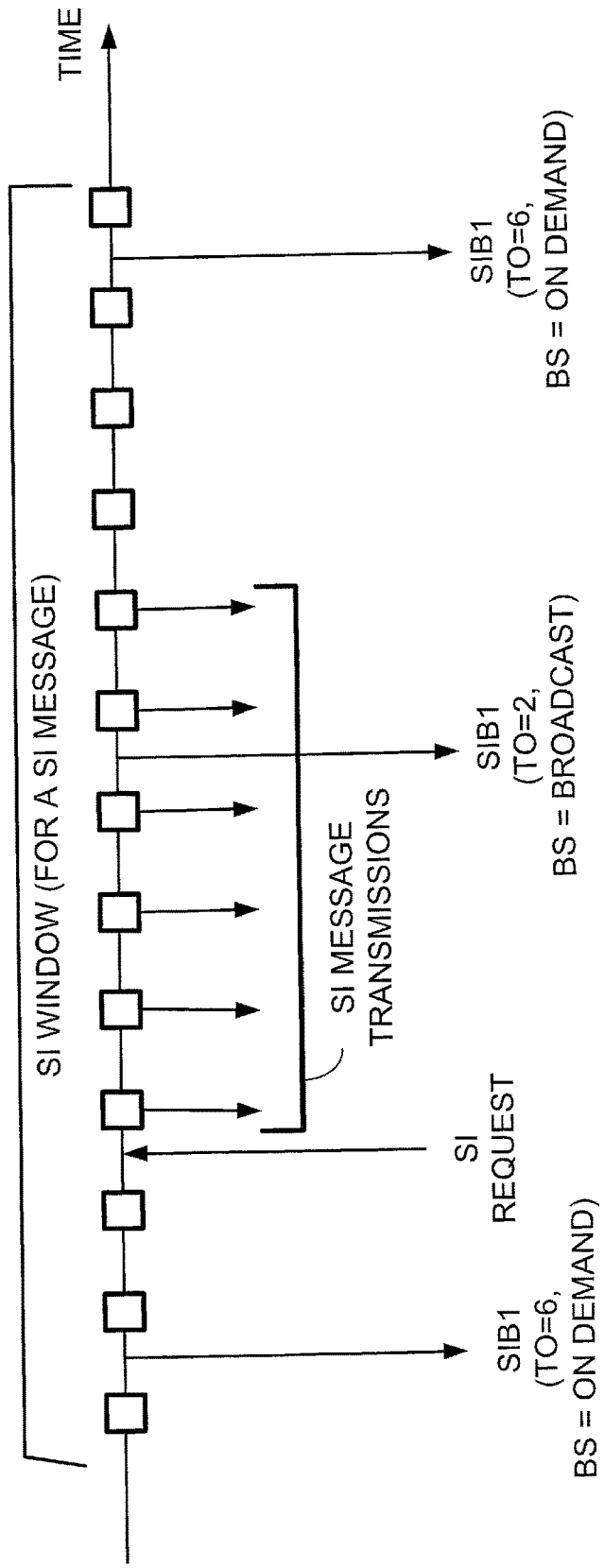
FIG. 36A is a diagrammatic view showing example scenarios of performing a system information message acquisition process when transmission opportunities are system information windows.

FIG. 36A illustrates one exemplary operation scenario of the example embodiment and mode of FIG. 35 for the case or example implementation in which the transmission opportunities are SI windows. The first SIB1 transmission in FIG. 36A indicates that the broadcast status (BS) (e.g. si-BroadcastStatus) of the SI message of concern is onDemand. Furthermore, the SIB1 also indicates that the number of transmission opportunities (TOs) is 6, meaning that six transmission opportunities (i.e., six SI windows) will be used to transmit the SI message once the SI message is requested. After the wireless terminal sends an SI request, the access node 22(35) starts transmitting the SI message on the six subsequent SI windows. In the scenario of FIG. 36A, the second SIB1 transmission, occurring after the fourth SI window, indicates two remaining TOs for the SI message that is being broadcasted (BS=broadcast). After consuming these six TOs, the TO indicated in the third SIB1 transmission goes back to 6, whereas BS becomes onDemand.

In the scenario of FIG. 36A, after the successful completion of the SI request procedure, the wireless terminal 26(35) may perform the SI message acquisition until it successfully receives the SI message or until it consumes the number of SI windows specified by the TO value received in the first SIB 1. Furthermore, the wireless terminal 26(35) may not attempt to receive the second SIB1 transmission (since not required to receive it). However, the second SIB1 transmission may possibly be received by another wireless terminal, which may attempt to receive the SI message in the next two subsequent SI windows.

Figure 36B:
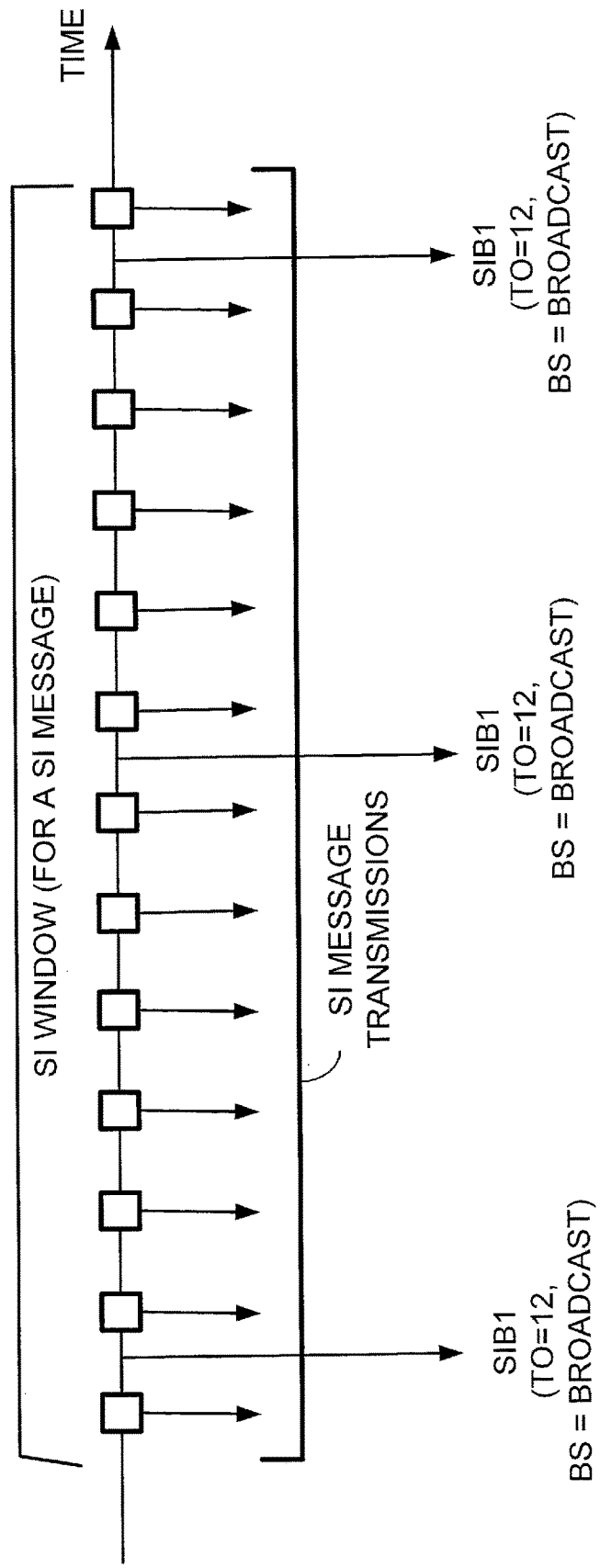
FIG. 36B is a diagrammatic view showing example scenarios of performing a system information message acquisition process when transmission opportunities are system information windows.

In addition, when combined with BS=broadcast, the transmission opportunities (TOs) in SIB1 may be also used to provide the wireless terminal 26(35) the maximum SI windows allowed in an SI message acquisition. For example, as illustrated in FIG. 36B, the wireless terminal 26(35) may receive the first SIB1 transmission where TO=12 and BS=broadcast. The wireless terminal 26(35), if desired, may start the SI message acquisition in up to the 12 subsequent SI windows of the SI message. After consuming all these SI windows without successful SI message acquisition, the wireless terminal 26(35) may reacquire SIB1, as disclosed in the previous embodiments. It should be noted that the access node 22(35) may choose to continue transmitting the SI message after 12 SI windows, as TO in SIB1 in this case is used only in sake of the wireless terminal 26(35) to provide the maximum attempts (in units of SI windows) before the SIB1 reacquisition.

Figure 37:
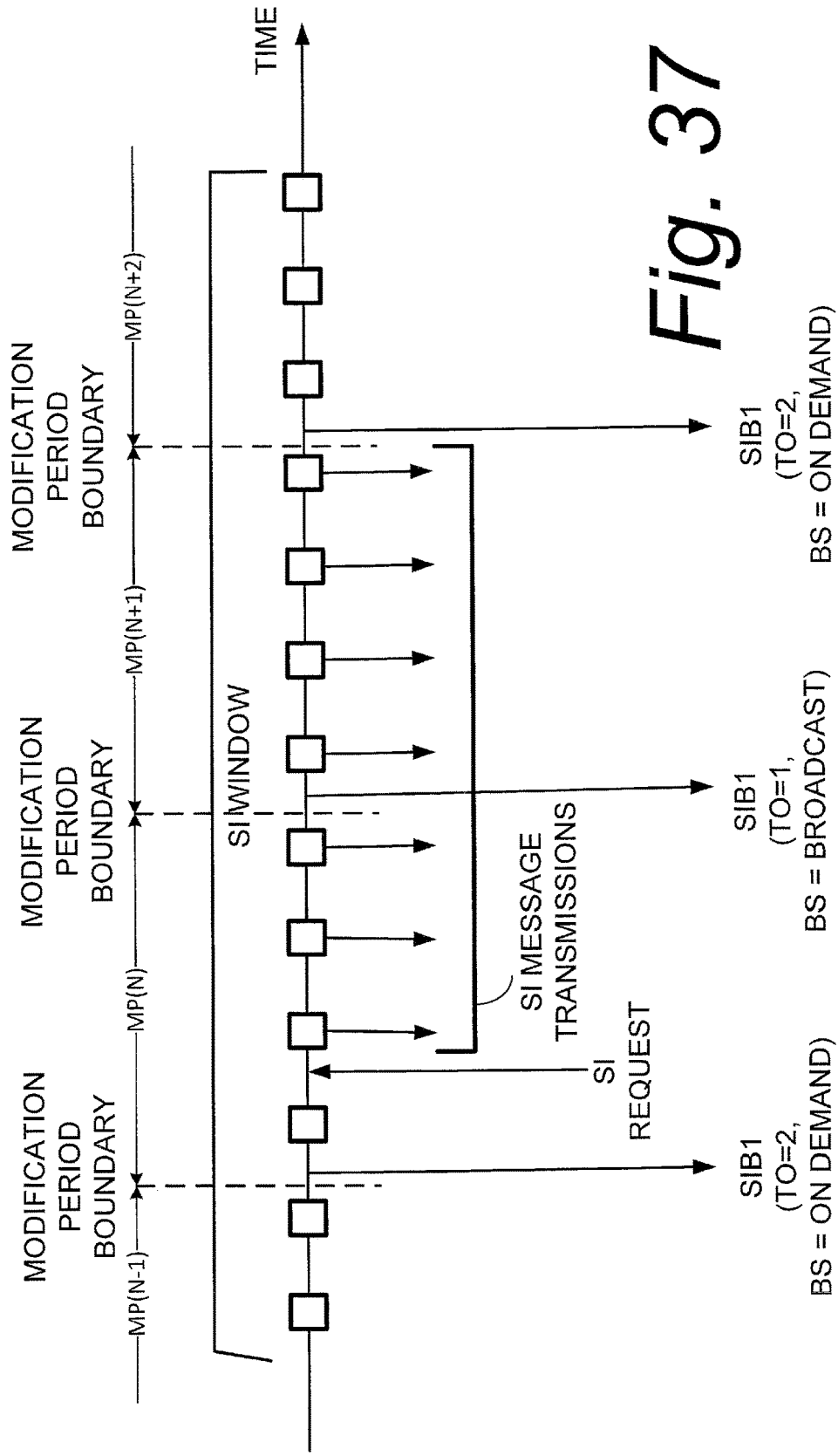
FIG. 37 is a diagrammatic view showing an example scenario of performing a system information message acquisition process when transmission opportunities are modification periods.

FIG. 37 is another exemplary scenario where the transmission opportunities (TOs) are configured in units of modification periods. The first SIB1 transmission in Modification Period N (MP(N)) indicates two TOs (i.e., two modification periods) will be used for the transmission of a SI message. In the first modification period a SI request for the SI message is sent from the wireless terminal 26(35), followed by the transmission of the SI message from access node 22(35) in the subsequent designated SI windows, for the duration of two modification periods. In one configuration, as shown in FIG. 37, the configured TOs may include the modification period where the SI request occurs (MP(N)). In this case, as shown in FIG. 37, TO in the SIB1 transmitted in MP(N+1) may be decremented by one (i.e. TO=1). In another configuration, TO in the SIB1 may not include the modification period where the SI request occurs (MP(N)). In this case, TO=2 in MP(N+1), TO=1 in MP(N+2), and the SI message transmission may continue until the end of MP(N+2).

Listing 6 shows an example format and coding of SIB1 for the example embodiment and mode of FIG. 35, where si-NumTransmissionOpportunities provide the number of TOs disclosed above, in units of SI-windows (or alternatively in units of modification periods).

LISTING 6

```
-- ASN1START
-- TAG-OTHER-SI-INFO-START
SI-SchedulingInfo ::=            SEQUENCE {
    schedulingInfoList SEQUENCE (SIZE (1..maxSI-Message)) OF SchedulingInfo,
    si-WindowLength              ENUMERATED {ms1, ms2, ms5, ms10, ms15, ms20,
                                     ms40},
    si-Request-Config            SI-Request-Config OPTIONAL,   -- Cond MSG-1
    systemInformationAreaID      BIT STRING (SIZE (24))
        OPTIONAL,
    -- First entry is SIB2
    sib ValueTagList             SEQUENCE (SIZE (1..maxSIB-1)) OF SIBValueTag,
    systemInfoAreaScope          SystemInfoAreaScope OPTIONAL, -- Cond AREA-ID,
    ...
}
```

-continued

LISTING 6

```
SchedulingInfo ::= SEQUENCE {
si-BroadcastStatus            ENUMERATED {broadcast, onDemand},
si-Periodicity                ENUMERATED }
                                  rf8, rf16, rf32, rf64, rf128, rf256, rf512},
sib-MappingInfo               SIB-Mapping,
si-NumTransmissionOpportunities        INTEGER(0..31) -- number of remaining TOs for this
SI message
}
SIB-Mapping ::= SEQUENCE (SIZE (0..maxSIB-1)) OF SIB-Type
SIB-Type ::=                  ENUMERATED {
                                  sibType2, sibType3, sibType4, sibType5,
                                  sibType6, sibType7, sibType8, sibType9,
                                  spare8, spare7, spare6, spare5,
                                  spare4, spare3, spare2, spare1,
                                  ... }
-- Value TAG per SIB.
SIBValueTag ::=               INTEGER (0..31)
```

Acquisition of on-Demand Based System Information in RRC_CONNECTED State

FIG. 38-FIG. 41 disclose operations and modes for acquisition of on-demand based system information in RRC_CONNECTED state. In the example embodiment and mode of FIG. 38-FIG. 41, the wireless terminal may send to the access node a request for on-demand delivery of one or more SIBs or SI messages, and the wireless terminal may receive the requested SIBs/SI messages via a message, e.g., a RRC message, dedicated to the wireless terminal, e.g., specific to the wireless terminal.

Figure 38:
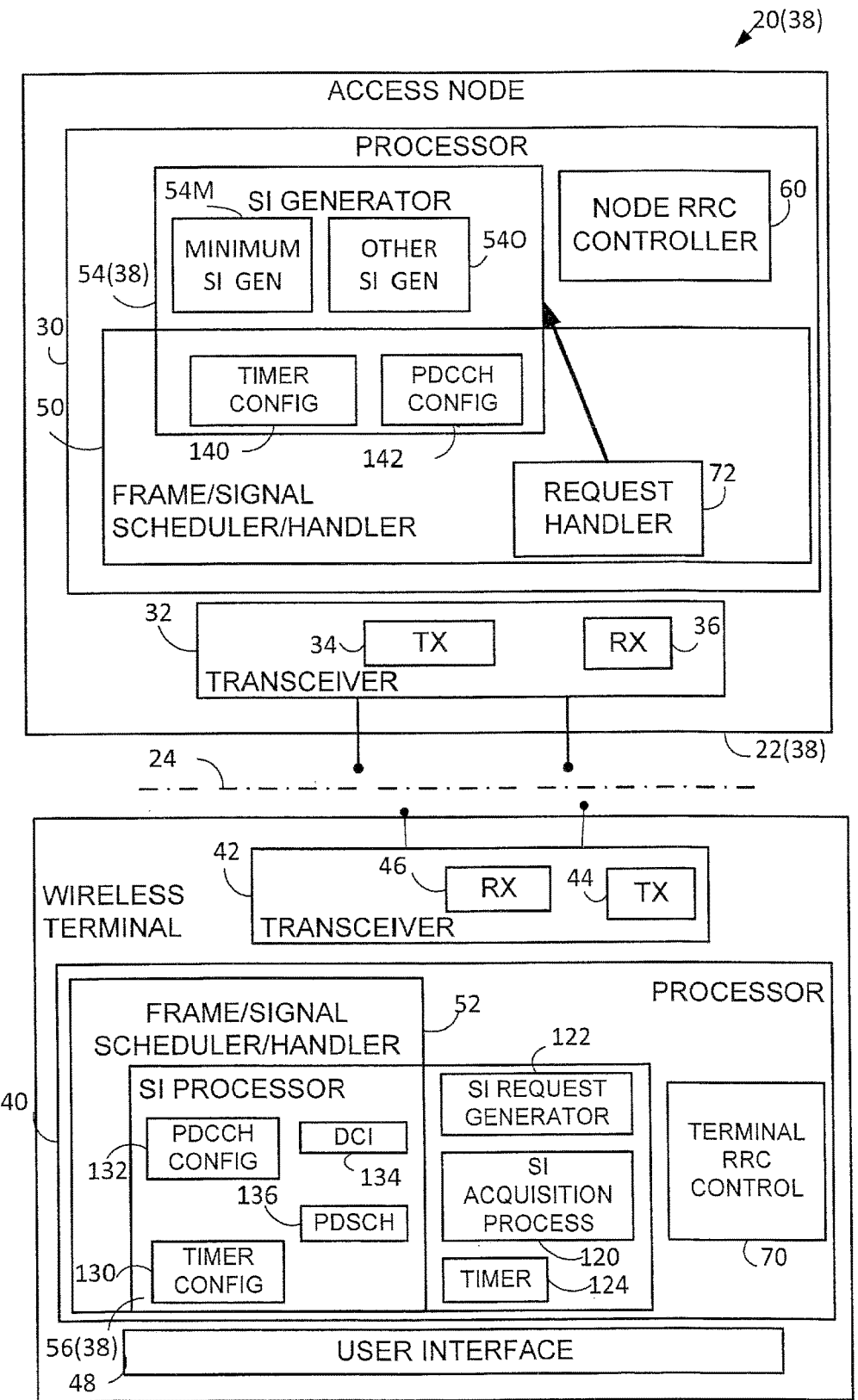
FIG. 38 is a schematic view showing an example communications system comprising a radio access node and a wireless terminal, wherein the wireless terminal requests on-demand system information in connected state.

FIG. 38 shows example communications system 20(38) as comprising access node 22(38) and wireless terminal 26(38). The elements of access node 22(38) and wireless terminal 26(38) of FIG. 38 are essentially identical to the corresponding elements respective access node 22 and wireless terminal 26 of FIG. 2 and other example embodiments that have same base reference numbers, except as otherwise indicated herein.

In terms of likeness, for example, the radio access node 22(38) comprises node processor 30 and node transceiver circuitry 32. The node transceiver circuitry 32 comprises node transmitter or node transmitting circuitry 34 and node receiver or node receiving circuitry 36. Node processor 30 comprises, e.g., node frame/signal scheduler/handler 50, system information (SI) generator 54(38), and node RRC controller 60. As described above, at least some of the system information generated and provided by the system information (SI) generator 54(38) may be Minimum System Information (Minimum SI), also known as first type system information, represented by Minimum SI handler 54M. Some of the system information may be Other system information (Other SI), also known as second type system information, represented by Other SI handler 54O in FIG. 38.

Also in terms of likeness, wireless terminal 26(38) comprises terminal processor 40 and terminal transceiver circuitry 42. The terminal transceiver circuitry 42 comprises terminal transmitter or terminal transmitting circuitry 44 and terminal receiver or terminal receiving circuitry 46. Terminal processor 40 comprises, e.g., terminal frame/signal scheduler/handler 52, system information (SI) processor 56(38), and terminal RRC controller 70.

FIG. 38 also shows that system information (SI) processor 56(38) of wireless terminal 26(38) comprises system information message acquisition processor 120; system information request generator 122; and system information acquisition timer 124. The system information (SI) processor 56(38) may operate in conjunction with information received from access node 22(38), such as timer configuration information; configuration for Physical Downlink Control Channel (PDCCH) monitoring; Downlink Control Information (DCI) on PDCCH; and information obtained from a Physical Downlink Shared Channel (PDSCH). Accordingly and correspondingly FIG. 38 shows wireless terminal 26(38) as comprising a memory or storage location for timer configuration 130; PDCCH configuration 132; Downlink Control Information (DCI) 134; and Physical Downlink Shared Channel (PDSCH) 136. The terminal processor 40 may comprise or constitute the aforementioned aspects or units of system information (SI) processor 56(38). Moreover, since at least some and preferably all of the information comprising timer configuration 130, PDCCH configuration 132, Downlink Control Information (DCI) 134, and Physical Downlink Shared Channel (PDSCH) 136 is received through terminal frame/signal scheduler/handler 52, FIG. 38 shows that functionality and structure of system information (SI) processor 56(38) may, in an example embodiment and mode, overlap with terminal frame/signal scheduler/handler 52, as may occur in the case in which both terminal frame/signal scheduler/handler 52 and system information (SI) generator 54(38) are realized by terminal processor 40.

In the example embodiment and mode of FIG. 38 access node 22(38) may generate information such as timer configuration and PDCCH configuration for wireless terminal 26(38). Accordingly, FIG. 38 shows system information (SI) generator 54(38) of access node 22(38) as comprising timer configuration generator 140 and a configuration for Physical Downlink Control Channel (PDCCH) monitoring, e.g., PDCCH configuration generator 142. As in the situation with wireless terminal 26(38), that functionality and structure of system information (SI) generator 54(38) may, in an example embodiment and mode, overlap with node frame/signal scheduler/handler 50, as may occur in the case in which both node frame/signal scheduler/handler 50 and system information (SI) generator 54(38) are realized by node processor 30.

Figure 39A:
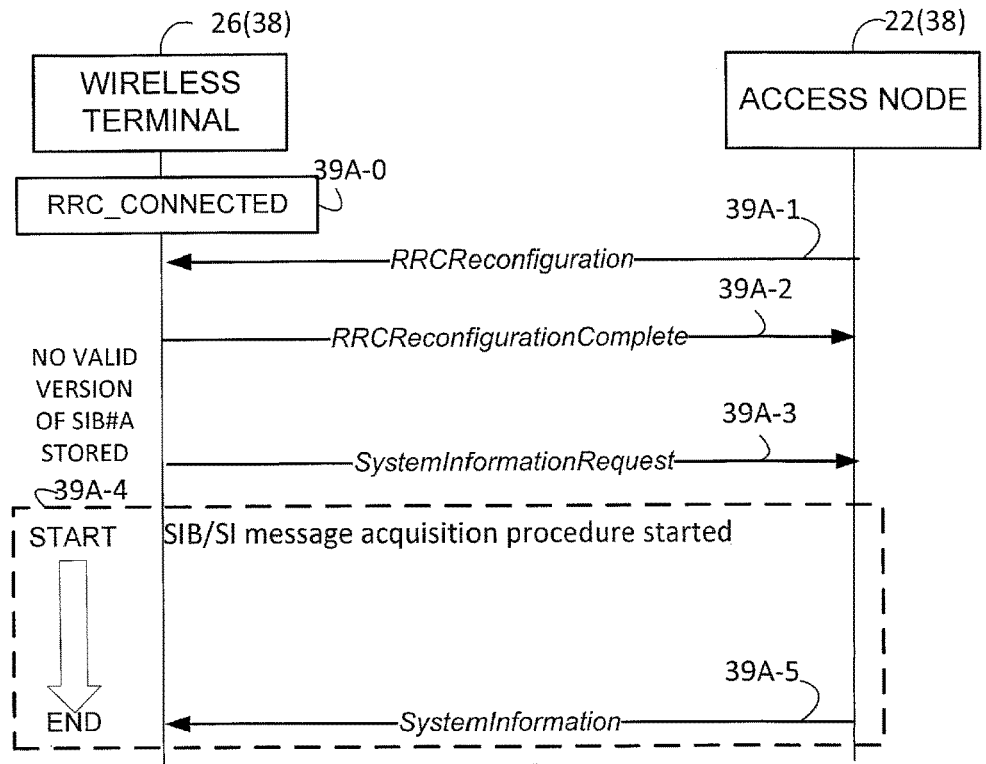
FIG. 39A is a diagrammatic view of actions which may occur in an example scenario performed by the system of FIG. 38 wherein on-demand system information is successfully acquired.
Figure 39B:
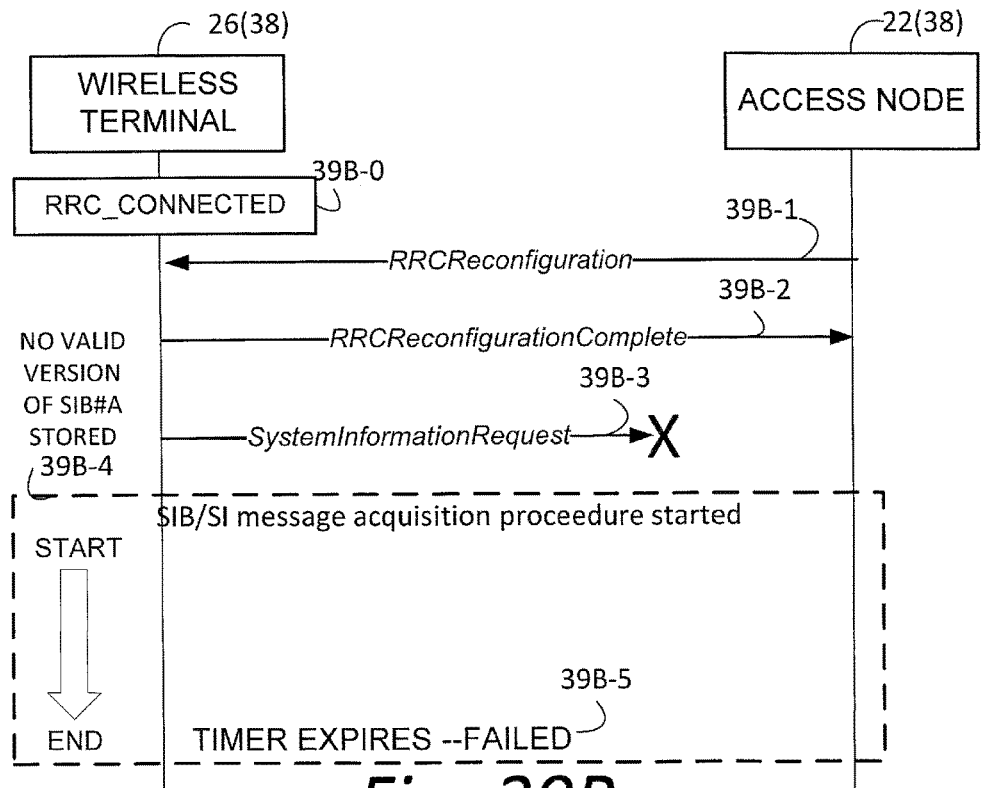
FIG. 39B is a diagrammatic view of actions which may occur in an example scenario performed by the system of FIG. 38 wherein on-demand system information is not successfully acquired.

FIG. 39A and FIG. 39B illustrate an exemplary scenario for the embodiment of FIG. 38. FIG. 39A describes a scenario in which system information is successfully acquired in response to a request message from the wireless terminal 26(38) when wireless terminal 26(38) is in connected mode; FIG. 39B describes a scenario in which a request message from the wireless terminal 26(38) in connected mode fails to obtain requested system information.

Act 39A-0 of FIG. 39A shows wireless terminal 26(38) entered RRC_Connected state. After entering the RRC_CONNECTED state, wireless terminal 26(38) may receive one or more configuration messages via dedicated signaling(s), as reflected by act 39A-1. The one or more configuration messages, which may be, e.g. RRCReconfiguration message(s), may comprise configuration parameter(s) used for requesting and acquiring on-demand SIBs/SI messages. In one example configuration, the configuration parameter(s) may configure a timer, e.g. timer Txyz also shown as system information acquisition timer 124 in FIG. 38, with a timer value to be used in the acquisition procedure of requested SIBs/SI messages in RRC_CONNECTED. Such timer configuration parameter(s) may indicate how long the system information acquisition timer 124 may run before it expires, e.g., either count up or count down, and may be stored in timer configuration memory 130. Another configuration parameter that may be obtained in act 39A-1 is a configuration for Physical Downlink Control Channel (PDCCH) monitoring, which may be stored in PDCCH configuration memory 132. Upon successful receipt of the configuration parameter(s) and the RRCReconfiguration message of act 39A-1 in particular, as act 39A-2 the wireless terminal 26(38) may send a RRCReconfigurationComplete message to access node 22(38).

In this example scenario of FIG. 39A, the wireless terminal 26(38) desires to acquire SIB #A or the SI message containing SIB #A, since it is assumed in the scenario of FIG. 39A that there is no valid version of SIB #A stored in the wireless terminal. In view of lack of a valid version of SIB #A, as act 39A-3 wireless terminal 26(38) may transmit a SystemInformationRequest message to the access node 22(38). The SystemInformationRequest message of act 39A-3 indicates SIB(s) or SI message(s) that the wireless terminal 26(38) desires to receive. In the particular case under discussion, the wireless terminal 26(38) desires to receive SIB #A. Upon transmitting the SystemInformationRequest message of act 39A-3, the wireless terminal 26(38) may initiate a SIB/SI message acquisition procedure 39A-4. In the SIB/SI message acquisition procedure 39A-4, which may be performed by system information message acquisition processor 120 of FIG. 38, the wireless terminal may start the timer 124 and attempt to receive the requested SIB(s)/SI message(s). As shown in FIG. 39A, if the wireless terminal 26(38) receives a SystemInformation message such as that depicted by act 39A-5, and if the message contains the requested SIB(s)/SI message(s), the wireless terminal 26(38) may consider that the SIB/SI message acquisition procedure is successful, and accordingly may stop the timer 124 and end the SIB/SI message acquisition procedure 39A-4.

Acts 39B-0 through 39B-2 of the scenario of FIG. 39B are similar to acts 39A-0 through 39A-2 of the scenario of FIG. 39A. Thereafter the scenario of FIG. 39B contrasts with the scenario of FIG. 39A. Whereas FIG. 39A shows a scenario of successful SIB acquisition, FIG. 39B shows a scenario of unsuccessful SIB acquisition. In the scenario of FIG. 39B, there is no valid version of SIB #A stored in the wireless terminal. In view of lack of a valid version of SIB #A, as act 39B_3 of FIG. 39B, the wireless terminal 26(38) may transmit a SystemInformationRequest message to access node 22(38). Upon transmitting the SystemInformationRequest message of act 39B-3, as in the scenario of FIG. 39A the wireless terminal 26(38) may initiate a SIB/SI message acquisition procedure, e.g., SIB/SI message acquisition procedure 39A-4 and starts the system information acquisition timer 124 using the timer configuration parameters stored in memory 130. FIG. 39B further shows that, for whatever reason, the SystemInformationRequest message of act 39B-3 either does not reach access node 22(38) or is not handled by access node 22(38) to generate the requested system information. As a result, if the timer 124 expires, i.e., the wireless terminal 26(38) concludes that access node 22(38) has failed to receive or correctly process the SystemInformation message of act 39B-3 comprising the requested SIB(s)/SI message(s) during the SIB/SI message acquisition procedure 39B-4. Consequently, the wireless terminal 26(38) may consider that the SIB/SI message acquisition procedure 39B-4 of FIG. 39B ends unsuccessfully. The wireless terminal 26(38) may re-transmit SystemInformationRequest. For example, the wireless terminal may re-transmit SystemInformationRequest, e.g., repeat act 39B-3, in a case that a retransmission for the transmission is indicated.

Thus, the wireless terminal 26(38) of FIG. 38 comprises receiver circuitry, transmitter circuitry, and processor circuitry. The receiver circuitry, such as terminal receiving circuitry 46, is configured to receive, in a radio resource control (RRC) connected state, one or more configuration messages via dedicated signaling(s), such as the message(s) of act 39A-1 or 39B-1 of FIG. 39A and FIG. 3940 B. The one or more configuration messages may comprise a timer configuration for a timer, e.g., stored in timer configuration memory 130, and a configuration for Physical Downlink Control Channel (PDCCH) monitoring stored, e.g., in PDCCH configuration memory 132. The transmitter circuitry, such as terminal transmitting circuitry 44, is configured to transmit, in the RRC connected state, a system information (SI) request message to request at least one system information block (SIB). Such system information (SI) request message, such as the SystemInformationRequest message of act 39A-3, may be generated by system information request generator 122 of FIG. 38. The terminal processor circuitry, e.g., terminal processor 40, is configured to start the timer 124 based on the timer configuration and to perform an SI acquisition process such as that indicated by act 39A-4 in FIG. 39A and act 39B-4 in FIG. 39B. In an example embodiment and mode, the SI acquisition process comprises reception of Downlink Control Information (DCI) on PDCCH based on the configuration for PDCCH monitoring, and reception of Physical Downlink Shared Channel (PDSCH) scheduled by using the DCI. The SI acquisition process continues until the at least one SIB is successfully received, as reflected by act 39A-5 in FIG. 39A, or the timer expires, as reflected by act 39B-5 in FIG. 39B.

The access node 22(38) of FIG. 38 comprises transmitter circuitry, receiver circuitry, and processor circuitry. The transmitter circuitry, such as transmitter circuitry 34 of FIG. 38, is configured to transmit, to a wireless terminal in a radio resource control (RRC) connected state, one or more configuration messages via dedicated signaling(s). The one or more configuration messages may comprise (1) a timer configuration for a timer, generated by timer configuration generator 140, and (2) a configuration for Physical Downlink Control Channel (PDCCH) monitoring generated by PDCCH configuration generator 142. The receiver circuitry, receiver circuitry 36 of FIG. 38, is configured to receive, in the RRC connected state, a system information (SI) request message to request at least one system information block (SIB). The system information (SI) request message may be processed by request handler 72. The processor circuitry, e.g., node processor 30, is configured to perform an SI delivery process. The SI delivery process comprises: (1) transmission of Downlink Control Information (DCI) on PDCCH based on the configuration for PDCCH monitoring, and transmission of Physical Downlink Shared Channel (PDSCH) scheduled by using the DCI. The timer is configured for the wireless terminal to terminate acquisition of the at least one SIB in a case that the acquisition is unsuccessful In an example implementation the SystemInformationRequest message may be mapped to Uplink Shared Channel (UL-SCH). UL-SCH may be mapped to Physical Uplink Shared Channel (PUSCH). Namely, in an example embodiment and mode the SystemInformationRequest message may be mapped to UL-SCH, and transmitted by using PUSCH. Additionally or alternatively, the SystemInformationRequest message may be mapped to PUSCH, and transmitted by using the PUSCH. For example, Downlink Control information (DCI) used for scheduling of PUSCH may be defined. Here, the DCI used for scheduling of PUSCH may be transmitted on Physical Downlink Control Channel (PDCCH).

Upon or after the transmission of the message by using PUSCH, the wireless terminal may start monitoring Physical Downlink Control Channel (PDCCH) that carries DCI used for scheduling of PDSCH. In order for the access node to encode a DCI, and in order for the wireless terminal to decode the DCI, in one configuration, Cell Radio Network Temporary Identifier (C-RNTI) may be used. In another configuration, System Information RNTI (SI-RNTI) may be used to encode/decode the DCI. In yet another configuration, another RNTI (e.g. a new RNTI designated/defined for acquisition of on-demand SIB(s)/SI message(s) in RRC_CONNECTED) may be used to encode/decode the DCI. Namely, RNTI(s) may be configured, e.g., by the access node, to the wireless terminal for DCI transmission, e.g. the DCI used for scheduling of PDSCH. In one example configuration, how the access node encodes the DCI may be realized by attaching Cyclic Redundancy Check parity bits, also referred to simply as CRC, to the DCI, and scrambling the CRC parity bits by RNTI(s). In this example configuration, the wireless terminal may attempt to decode, e.g., blind decoding, a received DCI by de-scrambling the attached CRC parity bits using RNTI(s) and then computing the validity of the CRC parity bits. Accordingly, the wireless terminal may attempt to decode DCI with CRC scrambled by RNTI(s), i.e., attempt to decode PDCCH for DCI with CRC scrambled by RNTI(s). In other words, the wireless terminal may attempt to decode PDCCH transmission addressed to RNTI(s).

ps described above, RNTI(s) may include C-RNTI, SI-RNTI, and/or the new RNTI. If the DCI is successfully decoded, e.g., a valid CRC, then the wireless terminal may proceed to receiving the time-frequency resource(s) on Physical Downlink Shared Channel (PDSCH) scheduled by the DCI. The wireless terminal may consider successful decoding of the PDCCH scheduled according to this DCI as a response for the request of SIB(s)/SI message(s). Namely, after the transmission of the SystemInformationRequest message, the wireless terminal may start monitoring PDCCH for DCI, e.g., with C-RNTI, SI-RNTI, and/or the new RNTI, used for scheduling of PDSCH.

If the time-frequency resource(s) on PDSCH scheduled by the DCI comprises the SystemInformation message with the requested SIB(s)/SI message(s), the wireless terminal may stop monitoring the PDCCH for DCI used for scheduling of PDSCH, as has been illustrated above by FIG. 39A, for example. In this context, "the resource(s)" refers to the time frequency resource(s) on PDSCH that is/are indicated by a DCI which is decodable by the wireless terminal 26(38). If the received DCI cannot be decoded with the aforementioned RNTI, or the resource(s) on PDSCH does not have the SystemInformation message with the requested SIB(s)/SI message(s), the wireless terminal may continue monitoring the PDCCH until the timer expires, as has been illustrated above by FIG. 39B, for example.

In an example embodiment and mode wireless terminal 26(38) may be configured by the access node with a PDCCH configuration, e.g., a configuration for PDCCH monitoring, e.g., search space configuration, for the DCI disclosed above. The PDCCH configuration information may be stored in PDCCH configuration memory 132 of FIG. 38. The PDCCH configuration may comprise information used for configuring an index of a Control Resource Set, CORESET, where the wireless terminal attempts to decode PDCCH for the DCI. The PDCCH configuration may comprise information indicating monitoring occasion(s) of PDCCH, such as a periodicity and/or offset(s) (of slot(s) and/or symbol(s)) where the wireless terminal attempts to decode PDCCH for the DCI. The PDCCH configuration may comprise information used for a search space, e.g., a wireless terminal-specific search space and/or a common search space, where the wireless terminal attempt to decode PDCCH for the DCI.

For example, the wireless terminal may attempt to decode PDCCH for the DCI used for scheduling of PDSCH only in a specific CORESET, e.g., CORESET with an index "Y" or CORESET "Y", with C-RNTI, SI-RNTI, and/or new RNTI. More specifically, the wireless terminal may attempt to decode the PDCCH for the DCI in a search space with an index "X" in CORESET "Y" with C-RNTI, SI-RNTI, and/or new RNTI. This search space may be a type-0 common search space (CSS). Attempting to decode PDCCH may be also referred to monitoring PDCCH candidates.

In one configuration, the search space with index "X" of CORESET "Y" may be a search space, e.g. a common search space (CSS), commonly used for monitoring SIBs/SI messages other than SIB1. In another configuration, the search space with index "X" of CORESET "Y" may be a search space specific to the wireless terminal, e.g. a wireless terminal-specific search space, or a UE-specific search space (USS). In either configuration, the search space may be configured by the PDCCH configuration. The PDCCH configuration may be a part of the aforementioned one or more configuration messages. In addition, or alternatively, the PDCCH configuration is configured by broadcasted system information, e.g. SIB 1.

It should be understood that the operation and mode for the on-demand based SIB/SI message acquisition procedure may be RRC state dependent. That is, when in RRC_CONNECTED, the wireless terminal may follow the operation and mode disclosed in the example embodiment and mode of FIG. 38. Whereas, when in RRC_IDLE or RRC_INACTIVE, the wireless terminal may perform one or a combination of previously disclosed embodiments. For example, in RRC_IDLE or RRC_INACTIVE, the wireless terminal may send a request for on-demand delivery of SIB(s)/SI message(s) based on the procedure illustrated in FIG. 9A or FIG. 9B, then attempt to acquire the requested SIB(s)/SI message(s) at SI-windows during the designated number of modification periods.

It should be also understood that before sending SystemInformationRequest message in the RRC_CONNECTED state, the wireless terminal may have to know (1) if the SIB(s)/SI message(s) to request is(are) available via on-demand by the cell served by the access node, and (2) if the wireless terminal does not have a valid version of the SIB(s)/SI message(s). In order to do this, the wireless terminal may need to possess the minimum system information (e.g. SIB1) of the cell. In one example configuration, RRCReconfiguration shown in FIG. 39A or FIG. 39B may comprise SIB1 with previously disclosed SI-Scheduling-Info. In another example configuration, if the SIB1 received and stored in RRC_IDLE/RRC_INACTIVE is still valid, the wireless terminal may use the stored SIB1. In yet another example configuration, in a case that the wireless terminal was handed over to the current cell from a previous cell, SIB1 to be used in the current cell may have been provided by the previous cell via the handover command, e.g. RRCReconfiguration. In yet another example configuration, the wireless terminal may receive broadcasted SIB1 in RRC_CONNECTED.

Figure 40:
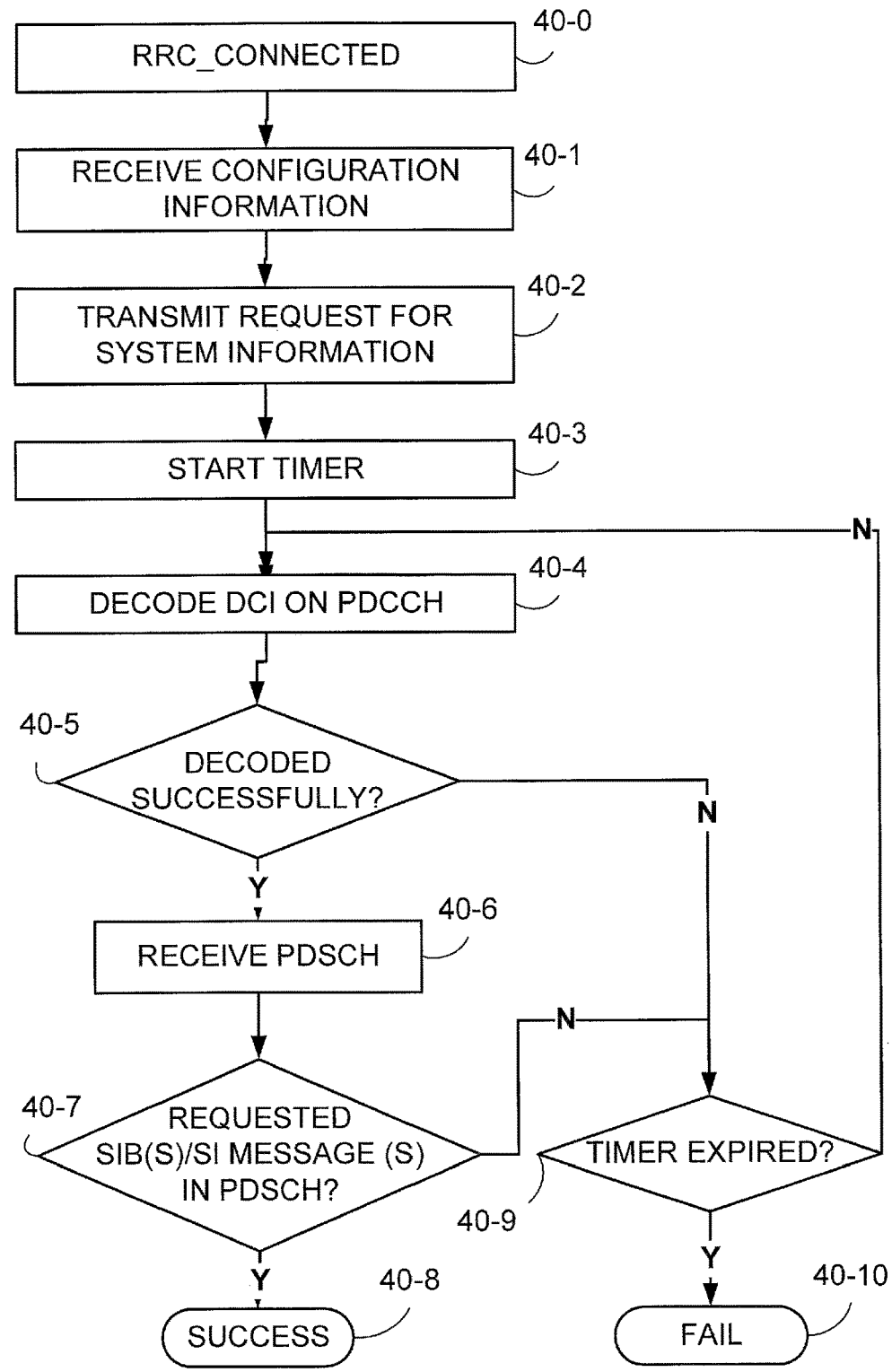
FIG. 40 shows representative, basic acts or steps performed by a wireless terminal of FIG. 38 in an on-demand based SIB/SI message delivery procedure in RRC_CONNECTED state.

FIG. 40 shows an example flow diagram of the on-demand based SIB/SI message acquisition procedure in RRC_CONNECTED for the wireless terminal of the example embodiment and mode of FIG. 38. Act 40-0 shows wireless terminal 26(38) entered the RRC_CONNECTED state. After entering RRC_CONNECTED state, as act 40-1 the wireless terminal 28(36) may receive the one or more configuration messages. Knowing that some SIB(s)/SI message(s) is/are necessary to acquire, the wireless terminal 28(36) may then as act 40-2 send a SystemInformationRequest message to the access node 22(38). As act 40-3 wireless terminal 26(38) may start the timer Txyz, e.g., system information acquisition timer 124, which has been configured by the one or more configuration messages of act 40-1. Thereafter as act 40-4 the wireless terminal 26(38) may monitor PDCCH to decode DCI with the aforementioned RNTI. If the wireless terminal 26(38) determines as act 40-5 that a PDCCH is successfully decoded, as act 40-6 the wireless terminal 28(36) may receive PDSCH resource(s) scheduled by the decoded DCI. If it is determined as act 40-7 that the PDSCH resource(s) contain(s) the requested SIB(s)/SI message(s), the on-demand based SIB/SI message acquisition process is successfully completed as reflected by act 40-8. If it is determined at act 40-5 that the DCI is not successfully decoded, or if it is determined as act 40-7 that the PDSCH resource(s) does not contain the requested SIB(s)/SI message(s), as act 40-9 the wireless terminal 28(36) may check if the timer Txyz, e.g., system information acquisition timer 124, has expired. If the check of act 40-9 is positive, e.g., if the system information acquisition timer 124 has expired, as act 40-10 the wireless terminal 28(36) may consider that the on-demand based SIB/SI message acquisition process has ended unsuccessfully. Otherwise, the wireless terminal 28(36) may continue monitoring PDCCH.

Figure 41:
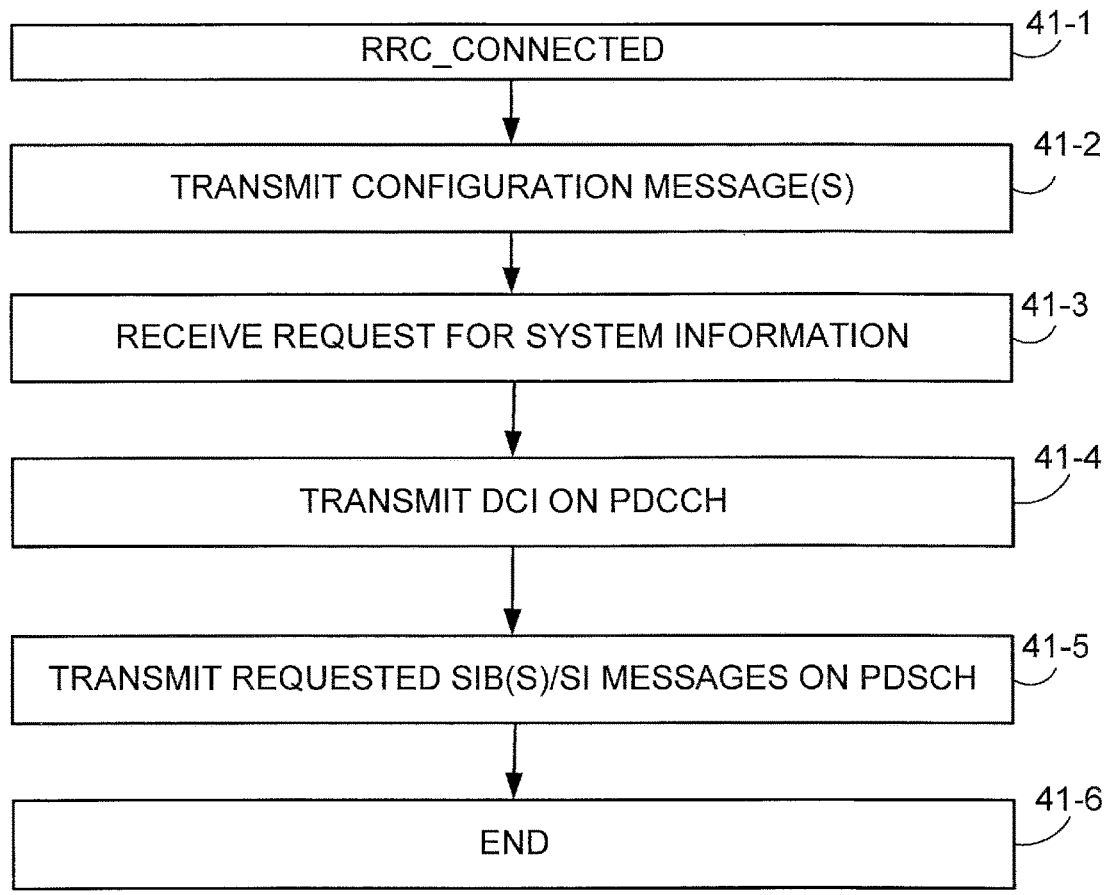
FIG. 41 shows representative, basic acts or steps performed by an access node of FIG. 38 in an on-demand based SIB/SI message delivery procedure in RRC_CONNECTED state.

FIG. 41 shows representative, basic acts or steps performed by the access node 22(38) of FIG. 38 in an on-demand based SIB/SI message delivery procedure in RRC_CONNECTED. Act 41-0 depicts the access node 22(38) entering or being in RRC_CONNECTED state. After access node 22(38) has entered RRC_CONNECTED with the wireless terminal, as act 41-2 the access node 22(38) may transmit the one or more configuration messages to the wireless terminal via dedicated signaling(s). Subsequently as act 41-3 access node 22(38) may then receive from the wireless terminal a SystemInformationRequest message which serves to request on-demand delivery of SIB(s)/SI message(s). As act 41-4 the access node may transmit, on PDCCH, DCI encoded with any appropriate encoding such as the aforementioned RNTI. The DCI enables the wireless terminal 26(38) to locate the resources, e.g., resources of PDSCH, on which the access node 22(38) will transmit the requested system information. As act 41-5 access node 22(38) may transmit the requested SIB(s)/SI message(s) on the resource(s) which was appointed by the encoded DCI in act 41-4. In one example implementation, as act 41-6 the access node 22(38) may then end the on-demand based SIB/SI message delivery process. In another example implementation, the access node 22(38) may repeat act 41-3 and act 41-4 for multiple times.

Features from each of the example embodiments and modes described herein, including the example embodiments and modes of FIG. 2, FIG. 23, FIG. 27, FIG. 28, FIG. 32, and FIG. 35 may be combined with one another. Further, features of the "Example Embodiments" enumerated hereinafter may also be used in conjunction with one another.

Figure 42:
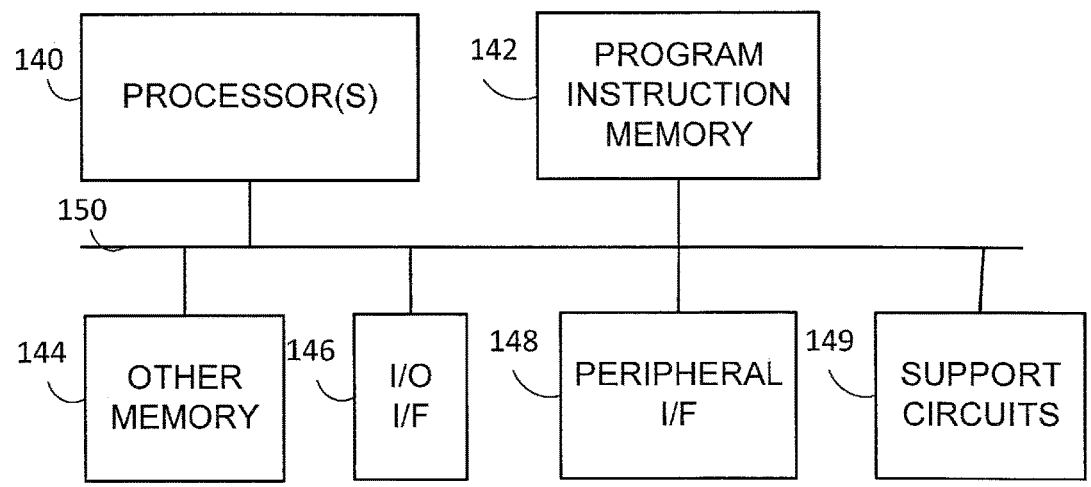
FIG. 42 is a diagrammatic view showing example electronic machinery which may comprise node electronic machinery or terminal electronic machinery.

Certain units and functionalities of node 22, node 22-12, node 22-19, node 22(23), node 22(27), node 22(28), node 22(32), node 22(35), and node 22(38), wireless terminal 26, wireless terminal 26-14, wireless terminal 26-19, wireless terminal 22(23), wireless terminal 22(27), wireless terminal 22(28), wireless terminal 22(32), wireless terminal 22(35), and wireless terminal 22(38), are, in example embodiments, implemented by electronic machinery, computer, and/or circuitry. For example, the node processors 30 and terminal processors 40 of the example embodiments herein described and/or encompassed may be comprised by the computer circuitry of FIG. 42. FIG. 42 shows an example of such electronic machinery or circuitry, whether node or terminal, as comprising one or more processor(s) circuits 190, program instruction memory 192; other memory 194 (e.g., RAM, cache, etc.); input/output interfaces 196; peripheral interfaces 198; support circuits 199; and busses 200 for communication between the aforementioned units.

The program instruction memory 192 may comprise coded instructions which, when executed by the processor(s), perform acts including but not limited to those described herein. Thus, it is understood that each of node processor 30 and terminal processor 40, for example, comprise memory in which non-transient instructions are stored for execution.

The memory 194, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 199 are coupled to the processors 190 for supporting the processor in a conventional manner. These circuits include cache, power supplies, clock circuits, input/output circuitry and subsystems, and the like.

Further, it should be understood that, when a processor or processor circuitry is mentioned in conjunction with any of the preceding example embodiments and modes, it should be understood that the device hosting the processor, whether wireless terminal or access node, may comprise at least one processor and at least one memory including computer program code, the memory and the computer program code being configured to, working with the at least one processor, to cause the host device to perform the functions aforedescribed.

Thus, the technology disclosed herein solves problems in the field of telecommunications, including problems in telecommunications nodes such wireless terminals and access nodes, as well as computers/processors and hardware comprising such nodes. System information is of utmost importance to the operation of telecommunication nodes, so that each node can obtain the necessary network information to coordinate and communicate with other nodes and to perform its desired functions. The system information is quite extensive and complex, and may be changeable/updateable due to network and operating conditions, for example. Efficiently obtaining and using the system information is challenging, particularly in view of numerous other telecommunications functions that may be simultaneously on-going based on the system information. The technology disclosed herein solves problem that may occur when system information is requested by a wireless terminal in RRC_CONNECTED state. The technology disclosed herein thus avoids waste of time and undue expenditure of processing resources.

Various example embodiments and modes of the technology disclosed herein proposes resource efficient methods of distributing system information by the following examples:

A radio access network which transmits a set of configuration parameters for termination conditions in order for a wireless terminal to terminate acquisition procedure of on-demand system information messages in case of unsuccess acquisition.

A wireless terminal configured to reacquire a minimum system information in the case where the configured termination conditions are met.

The terminal conditions may include a number of modification periods consumed during the SI message acquisition.

The minimum system information further configures a waiting time for UE to wait before starting the SI message acquisition.

The minimum system information further indicates remaining number of transmission opportunities for an SI message.

A wireless terminal in RRC_CONNECTED state may send an on-demand SI request to the access node and monitors dedicated signaling for SI acquisition based on the configuration provided by the access node.

A timer may be configured to the wireless terminal to terminate the SI acquisition in a case that the acquisition is unsuccessful.

One or more of the following documents may be pertinent to one or more aspects of the technology disclosed herein, all such documents being incorporated herein by reference in their entireties:

| | |
|---|---|
| R2-1806720 | Open issues of the on demand SI Acquirement CATT |
| R2-1806839 | SI Period Monitoring for On Demand SI Samsung Electronics Co., Ltd |
| R2-1806920 | Issue of simultaneously trigging multiple RRC procedures ASUSTeK |
| R2-1807073 | Reception of on-demand SI Spreadtrum Communications |
| R2-1807099 | Details of RRC SI request Ericsson |
| R2-1807161 | Remaining issues on the MSG3 based on-demand SI request PANASONIC R&D Center Germany |
| R2-1807205 | Duration of on-demand SI broadcast Ericsson |
| R2-1807269 | Acquisition of Essential SIBs Lenovo, Motorola Mobility |
| R2-1807319 | Further consideration on the RACH resource and SI request mapping ZTE Corporation |
| R2-1807328 | Considerations on Acquisition of an SI Message Sharp Corporation |
| R2-1807371 | Remaining issues on on-demand SI Intel Corporation |
| R2-1807615 | Details of SI Message Reception after Successful SI Request vivo |
| R2-1807645 | RACH resources allocation for Msg1 based SI request CATT |
| R2-1807673 | Further issues relates to on-demand SI Xiaomi Communications |
| R2-1807690 | Email discussion_101bis#43_RA resources for MSG1 on demand request Samsung Electronics Co., Ltd |
| R2-1808198 | Consideration on Indication for On-demand SI Broadcast Huawei, HiSilicon |
| R2-1808433 | When to start SI monitoring after SI request LG Electronics Inc. |
| R2-1808437 | Clarification of broadcast indicator in SIB1 LG Electronics Inc. |
| R2-1808438 | Acknowledgement for MSG3 based SI request from MAC layer LG Electronics Inc. |
| R2-1809110 | Offline Discussion #67 - RA resources for MSG1 on demand request ZTE Corporation |

The technology of this application thus encompasses but is not limited to the following example embodiments, example features, and example advantages: Example Embodiment 1: A wireless terminal A wireless terminal that communicates over a radio interface with a radio access node of a radio access network (RAN), the wireless terminal comprising: receiver circuitry configured to receive, in a radio resource control (RRC) connected state, one or more configuration messages via dedicated signaling(s), the one or more configuration messages comprising: a timer configuration for a timer, and; a configuration for Physical Downlink Control Channel (PDCCH) monitoring; transmitter circuitry configured to transmit, in the RRC connected state, a system information (SI) request message to request at least one system information block (SIB); processor circuitry configured to: start the timer based on the timer configuration, and; perform an SI acquisition process, wherein; the SI acquisition process comprises: reception of Downlink Control Information (DCI) on PDCCH based on the configuration for PDCCH monitoring, and reception of Physical Downlink Shared Channel (PDSCH) scheduled by using the DCI, and; the acquisition process continues until the at least one SIB is successfully received or the timer expires.

Example Embodiment 2: The wireless terminal of Example Embodiment 1, wherein a Cell Radio Network Temporary Identifier (C-RNTI) is used for scrambling Cyclic Redundancy Check (CRC) parity bits attached to the DCI.

Example Embodiment 3: The wireless terminal of Example Embodiment 1, wherein a System Information RNTI (SI-RNTI) is used for scrambling Cyclic Redundancy Check (CRC) parity bits attached to the DCI.

Example Embodiment 4: The wireless terminal of Example Embodiment 1, wherein a RNTI designated for acquisition of the requested at least one SIB is used for scrambling Cyclic Redundancy Check (CRC) parity bits attached to the DCI.

Example Embodiment 5: The wireless terminal of Example Embodiment 1, wherein the configuration for PDCCH monitoring comprises an index of a Control Resource Set (CORESET).

Example Embodiment 6: The wireless terminal of Example Embodiment 1, wherein the configuration for PDCCH monitoring comprises monitoring occasion(s).

Example Embodiment 7: An access node of a radio access network (RAN), the access node comprising: transmitter circuitry configured to transmit, to a wireless terminal in a radio resource control (RRC) connected state, one or more configuration messages via dedicated signaling(s), the one or more configuration messages comprising: a timer configuration for a timer, and; a configuration for Physical Downlink Control Channel (PDCCH) monitoring; receiver circuitry configured to receive, in the RRC connected state, a system information (SI) request message to request at least one system information block (SIB); processor circuitry configured to perform an SI delivery process, wherein; the SI delivery process comprises: transmission of Downlink Control Information (DCI) on PDCCH based on the configuration for PDCCH monitoring, and transmission of Physical Downlink Shared Channel (PDSCH) scheduled by using the DCI, and; the timer is configured for the wireless terminal to terminate acquisition of the at least one SIB in a case that the acquisition is unsuccessful.

Example Embodiment 8: The access node of Example Embodiment 7, wherein a Cell Radio Network Temporary Identifier (C-RNTI) is used for scrambling Cyclic Redundancy Check (CRC) parity bits attached to the DCI.

Example Embodiment 9: The access node of Example Embodiment 7, wherein a System Information RNTI (SI-RNTI) is used for scrambling Cyclic Redundancy Check (CRC) parity bits attached to the DCI.

Example Embodiment 10: The access node of Example Embodiment 7, wherein a RNTI designated for acquisition of the requested at least one SIB is used for scrambling Cyclic Redundancy Check (CRC) parity bits attached to the DCI.

Example Embodiment 11: The access node of Example Embodiment 7, wherein the configuration for PDCCH monitoring comprises information used for configuring an index of Control Resource Set (CORESET).

Example Embodiment 12: The access node of Example Embodiment 7, wherein the configuration for PDCCH monitoring comprises monitoring occasion(s).

Example Embodiment 13: A method for a wireless terminal that communicates over a radio interface with a radio access node of a radio access network (RAN), comprising: receiving, in a radio resource control (RRC) connected state, one or more configuration messages via dedicated signaling(s), the one or more configuration messages comprising: a timer configuration for a timer, and; a configuration for Physical Downlink Control Channel (PDCCH) monitoring; transmitting, in the RRC connected state, a system information (SI) request message to request at least one system information block (SIB); starting the timer based on the timer configuration, and; performing an SI acquisition process, wherein; the SI acquisition process comprises: reception of Downlink Control Information (DCI) on PDCCH based on the configuration for PDCCH monitoring, and reception of Physical Downlink Shared Channel (PDSCH) scheduled by using the DCI, and; the acquisition process continues until the at least one SIB is successfully received or the timer expires.

Example Embodiment 14: The method of Example Embodiment 13, wherein a Cell Radio Network Temporary Identifier (C-RNTI) is used for scrambling Cyclic Redundancy Check (CRC) parity bits attached to the DCI.

Example Embodiment 15: The method of Example Embodiment 13, wherein a System Information RNTI (SI-RNTI) is used for scrambling Cyclic Redundancy Check (CRC) parity bits attached to the DCI.

Example Embodiment 16: The method of Example Embodiment 13, wherein a RNTI designated for acquisition of the requested at least one SIB is used for scrambling Cyclic Redundancy Check (CRC) parity bits attached to the DCI.

Example Embodiment 17: The method of Example Embodiment 13, wherein the configuration for PDCCH monitoring comprises an index of a Control Resource Set (CORESET).

Example Embodiment 18: The method of Example Embodiment 13, wherein the configuration for PDCCH monitoring comprises monitoring occasion(s).

Example Embodiment 19: A method for an access node of a radio access network (RAN), the method comprising: transmitting, to a wireless terminal in a radio resource control (RRC) connected state, one or more configuration messages via dedicated signaling(s), the one or more configuration messages comprising: a timer configuration for a timer, and; a configuration for Physical Downlink Control Channel (PDCCH) monitoring; receiving, in the RRC connected state, a system information (SI) request message to request at least one system information block (SIB); performing an SI delivery process, wherein; the SI delivery process comprises transmission of Downlink Control Information (DCI) on PDCCH based on the configuration for PDCCH monitoring, and transmission of Physical Downlink Shared Channel (PDSCH) scheduled by using the DCI, and; the timer is configured for the wireless terminal to terminate acquisition of the at least one SIB in a case that the acquisition is unsuccessful.

Example Embodiment 20: The method of Example Embodiment 19, wherein a Cell Radio Network Temporary Identifier (C-RNTI) is used for scrambling Cyclic Redundancy Check (CRC) parity bits attached to the DCI.

Example Embodiment 21: The method of Example Embodiment 19, wherein a System Information RNTI (SI-RNTI) is used for scrambling Cyclic Redundancy Check (CRC) parity bits attached to the DCI.

Example Embodiment 22: The method of Example Embodiment 19, wherein a RNTI designated for acquisition of the requested at least one SIB is used for scrambling Cyclic Redundancy Check (CRC) parity bits attached to the DCI.

Example Embodiment 23: The method of Example Embodiment 19, wherein the configuration for PDCCH monitoring comprises information used for configuring an index of Control Resource Set (CORESET).

Example Embodiment 24: The method of Example Embodiment 19, wherein the configuration for PDCCH monitoring comprises monitoring occasion(s).

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture. The instructions of such software are stored on non-transient computer readable media.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively by prudent use of radio resources.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

<Summary>

In one example, a wireless terminal that communicates over a radio interface with a radio access node of a radio access network (RAN), the wireless terminal comprising: receiver circuitry configured to receive, in a radio resource control (RRC) connected state, one or more configuration messages via dedicated signaling(s), the one or more configuration messages comprising: a timer configuration for a timer, and; a configuration for Physical Downlink Control Channel (PDCCH) monitoring; transmitter circuitry configured to transmit, in the RRC connected state, a system information (SI) request message to request at least one system information block (SIB); processor circuitry configured to: start the timer based on the timer configuration, and; perform an SI acquisition process, wherein; the SI acquisition process comprises: reception of Downlink Control Information (DCI) on PDCCH based on the configuration for PDCCH monitoring, and reception of Physical Downlink Shared Channel (PDSCH) scheduled by using the DCI, and; the acquisition process continues until the at least one SIB is successfully received or the timer expires.

In one example, the wireless terminal, wherein a Cell Radio Network Temporary Identifier (C-RNTI) is used for scrambling Cyclic Redundancy Check (CRC) parity bits attached to the DCI.

In one example, the wireless terminal, wherein a System Information RNTI (SI-RNTI) is used for scrambling Cyclic Redundancy Check (CRC) parity bits attached to the DCI.

In one example, the wireless terminal, wherein a RNTI designated for acquisition of the requested at least one SIB is used for scrambling Cyclic Redundancy Check (CRC) parity bits attached to the DCI.

In one example, the wireless terminal, wherein the configuration for PDCCH monitoring comprises an index of a Control Resource Set (CORESET).

In one example, the wireless terminal, wherein the configuration for PDCCH monitoring comprises monitoring occasion(s).

In one example, an access node of a radio access network (RAN), the access node comprising: transmitter circuitry configured to transmit, to a wireless terminal in a radio resource control (RRC) connected state, one or more configuration messages via dedicated signaling(s), the one or more configuration messages comprising: a timer configuration for a timer, and; a configuration for Physical Downlink Control Channel (PDCCH) monitoring; receiver circuitry configured to receive, in the RRC connected state, a system information (SI) request message to request at least one system information block (SIB); processor circuitry configured to perform an SI delivery process, wherein; the SI delivery process comprises: transmission of Downlink Control Information (DCI) on PDCCH based on the configuration for PDCCH monitoring, and transmission of Physical Downlink Shared Channel (PDSCH) scheduled by using the DCI, and; the timer is configured for the wireless terminal to terminate acquisition of the at least one SIB in a case that the acquisition is unsuccessful.

In one example, the access node, wherein a Cell Radio Network Temporary Identifier (C-RNTI) is used for scrambling Cyclic Redundancy Check (CRC) parity bits attached to the DCI.

In one example, the access node, wherein a System Information RNTI (SI-RNTI) is used for scrambling Cyclic Redundancy Check (CRC) parity bits attached to the DCI.

In one example, the access node, wherein a RNTI designated for acquisition of the requested at least one SIB is used for scrambling Cyclic Redundancy Check (CRC) parity bits attached to the DCI.

In one example, the access node, wherein the configuration for PDCCH monitoring comprises information used for configuring an index of Control Resource Set (CORESET).

In one example, the access node, wherein the configuration for PDCCH monitoring comprises monitoring occasion(s).

In one example, a method for a wireless terminal that communicates over a radio interface with a radio access node of a radio access network (RAN), comprising: receiving, in a radio resource control (RRC) connected state, one or more configuration messages via dedicated signaling(s), the one or more configuration messages comprising: a timer configuration for a timer, and; a configuration for Physical Downlink Control Channel (PDCCH) monitoring; transmitting, in the RRC connected state, a system information (SI) request message to request at least one system information block (SIB); starting the timer based on the timer configuration, and; performing an SI acquisition process, wherein; the SI acquisition process comprises: reception of Downlink Control Information (DCI) on PDCCH based on the configuration for PDCCH monitoring, and reception of Physical Downlink Shared Channel (PDSCH) scheduled by using the DCI, and; the acquisition process continues until the at least one SIB is successfully received or the timer expires.

In one example, the method, wherein a Cell Radio Network Temporary Identifier (C-RNTI) is used for scrambling Cyclic Redundancy Check (CRC) parity bits attached to the DCI.

In one example, the method, wherein a System Information RNTI (SI-RNTI) is used for scrambling Cyclic Redundancy Check (CRC) parity bits attached to the DCI.

In one example, the method, wherein a RNTI designated for acquisition of the requested at least one SIB is used for scrambling Cyclic Redundancy Check (CRC) parity bits attached to the DCI.

In one example, the method, wherein the configuration for PDCCH monitoring comprises an index of a Control Resource Set (CORESET).

In one example, the method, wherein the configuration for PDCCH monitoring comprises monitoring occasion(s).

In one example, a method for an access node of a radio access network (RAN), the method comprising: transmitting, to a wireless terminal in a radio resource control (RRC) connected state, one or more configuration messages via dedicated signaling(s), the one or more configuration messages comprising: a timer configuration for a timer, and; a configuration for Physical Downlink Control Channel (PDCCH) monitoring; receiving, in the RRC connected state, a system information (SI) request message to request at least one system information block (SIB); performing an SI delivery process, wherein; the SI delivery process comprises transmission of Downlink Control Information (DCI) on PDCCH based on the configuration for PDCCH monitoring, and transmission of Physical Downlink Shared Channel (PDSCH) scheduled by using the DCI, and; the timer is configured for the wireless terminal to terminate acquisition of the at least one SIB in a case that the acquisition is unsuccessful.

In one example, the method, wherein a Cell Radio Network Temporary Identifier (C-RNTI) is used for scrambling Cyclic Redundancy Check (CRC) parity bits attached to the DCI.

In one example, the method, wherein a System Information RNTI (SI-RNTI) is used for scrambling Cyclic Redundancy Check (CRC) parity bits attached to the DCI.

In one example, the method, wherein a RNTI designated for acquisition of the requested at least one SIB is used for scrambling Cyclic Redundancy Check (CRC) parity bits attached to the DCI.

In one example, the method, wherein the configuration for PDCCH monitoring comprises information used for configuring an index of Control Resource Set (CORESET).

In one example, the method, wherein the configuration for PDCCH monitoring comprises monitoring occasion(s).

What is claimed is:

1. A wireless terminal that communicates over a radio interface with a radio access node of a radio access network (RAN), the wireless terminal comprising:
   receiver circuitry configured to receive, in a radio resource control (RRC) connected state, one or more configuration messages via dedicated signaling(s), the one or more configuration messages comprising:
   a timer configuration for a timer, and;
   a configuration for Physical Downlink Control Channel (PDCCH) monitoring;
   transmitter circuitry configured to transmit, in the RRC connected state, a system information (SI) request message to request at least one system information block (SIB);
   processor circuitry configured to: start the timer based on the timer configuration, and;
   perform an SI acquisition process, wherein;
   the SI acquisition process comprises:
   reception of Downlink Control Information (DCI) on PDCCH based on the configuration for PDCCH monitoring, and reception of Physical Downlink Shared Channel (PDSCH) scheduled by using the DCI, and;
   the acquisition process continues until the at least one SIB is successfully received or the timer expires;
   wherein a RNTI designated for the acquisition of the requested the at least one SIB is used for scrambling Cyclic Redundancy Check (CRC) parity bits attached to the DCI.

2. The wireless terminal of claim 1, wherein a Cell Radio Network Temporary Identifier (C-RNTI) is used for scrambling Cyclic Redundancy Check (CRC) parity bits attached to the DCI.

3. The wireless terminal of claim 1, wherein a System Information RNTI (SI-RNTI) is used for scrambling Cyclic Redundancy Check (CRC) parity bits attached to the DCI.

4. The wireless terminal of claim 1, wherein the configuration for PDCCH monitoring comprises an index of a Control Resource Set (CORESET).

5. An access node of a radio access network (RAN), the access node comprising:
   transmitter circuitry configured to transmit, to a wireless terminal in a radio resource control (RRC) connected state, one or more configuration messages via dedicated signaling(s), the one or more configuration messages comprising:
   a timer configuration for a timer, and;
   a configuration for Physical Downlink Control Channel (PDCCH) monitoring;

receiver circuitry configured to receive, in the RRC connected state, a system information (SI) request message to request at least one system information block (SIB);

processor circuitry configured to perform an SI delivery process, wherein;

the SI delivery process comprises:

transmission of Downlink Control Information (DCI) on PDCCH based on the configuration for PDCCH monitoring, and transmission of Physical Downlink Shared Channel (PDSCH) scheduled by using the DCI, and;

the timer is configured for the wireless terminal to terminate acquisition of the at least one SIB in a case that the acquisition is unsuccessful;

wherein a RNTI designated for the acquisition of the requested the at least one SIB is used for scrambling Cyclic Redundancy Check (CRC) parity bits attached to the DCI.

6. The access node of claim 5, wherein a Cell Radio Network Temporary Identifier (C-RNTI) is used for scrambling Cyclic Redundancy Check (CRC) parity bits attached to the DCI.

7. The access node of claim 5, wherein a System Information RNTI (SI-RNTI) is used for scrambling Cyclic Redundancy Check (CRC) parity bits attached to the DCI.

8. The access node of claim 5, wherein the configuration for PDCCH monitoring comprises information used for configuring an index of Control Resource Set (CORESET).

9. A method for a wireless terminal that communicates over a radio interface with a radio access node of a radio access network (RAN), comprising:

receiving, in a radio resource control (RRC) connected state, one or more configuration messages via dedicated signaling(s), the one or more configuration messages comprising:

a timer configuration for a timer, and;

a configuration for Physical Downlink Control Channel (PDCCH) monitoring; transmitting, in the RRC connected state, a system information (SI) request message to request at least one system information block (SIB);

starting the timer based on the timer configuration, and;

performing an SI acquisition process, wherein;

the SI acquisition process comprises: reception of Downlink Control Information (DCI) on PDCCH based on the configuration for PDCCH monitoring, and reception of Physical Downlink Shared Channel (PDSCH) scheduled by using the DCI, and; the acquisition process continues until the at least one SIB is successfully received or the timer expires;

wherein a RNTI designated for the acquisition of the requested the at least one SIB is used for scrambling Cyclic Redundancy Check (CRC) parity bits attached to the DCI.

* * * * *